(12) United States Patent
Tamura et al.

(10) Patent No.: US 9,083,014 B2
(45) Date of Patent: Jul. 14, 2015

(54) FUEL CELL SYSTEM FOR PERFORMING NORMAL AND ABNORMAL SHUT-DOWN PROCESSES

(75) Inventors: Yoshio Tamura, Hyogo (JP); Yoshikazu Tanaka, Shiga (JP); Kiyoshi Taguchi, Osaka (JP); Shigeki Yasuda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 665 days.

(21) Appl. No.: 12/863,546

(22) PCT Filed: Nov. 20, 2009

(86) PCT No.: PCT/JP2009/006292
§ 371 (c)(1),
(2), (4) Date: Jul. 19, 2010

(87) PCT Pub. No.: WO2010/058604
PCT Pub. Date: May 27, 2010

(65) Prior Publication Data
US 2010/0291451 A1   Nov. 18, 2010

(30) Foreign Application Priority Data
Nov. 20, 2008 (JP) .................. 2008-296968
Feb. 2, 2009 (JP) .................. 2009-021339

(51) Int. Cl.
*H01M 8/04* (2006.01)

(52) U.S. Cl.
CPC ...... *H01M 8/04029* (2013.01); *H01M 8/04007* (2013.01); *H01M 8/04223* (2013.01);
(Continued)

(58) Field of Classification Search
CPC ....... H01M 8/04708–8/04731; H01M 8/04664
See application file for complete search history.

(56) References Cited

U.S. PATENT DOCUMENTS 4,741,978 A * 5/1988 Takabayashi .............. 429/430
6,551,731 B1 * 4/2003 Berg et al. ................. 429/433
(Continued)

FOREIGN PATENT DOCUMENTS

| CN | 1409428 A | 4/2003 |
|---|---|---|
| JP | 02-132770 A | 5/1990 |

(Continued)

OTHER PUBLICATIONS

Machine translation of JP 2002-352839, Okura Kazuma, Dec. 6, 2002.*

(Continued)

*Primary Examiner* — Maria J Laios
*Assistant Examiner* — Robert S Carrico
(74) *Attorney, Agent, or Firm* — McDermott Will & Emery LLP

(57) ABSTRACT

A fuel cell system of the present invention comprises a fuel cell (101); a first heat medium path through which a first heat medium for cooling the fuel cell (101) flows; a first flow control device (107) configured to flow the first heat medium in the first heat medium path; an abnormality detector configured to detect an abnormality; and a controller (110) configured to control the first flow control device (107) such that the fuel cell (101) after shut-down of power generation is cooled with a higher rate in an abnormal shut-down process performed after the abnormality detector detects the abnormality, than in a normal shut-down process.

39 Claims, 25 Drawing Sheets

(52) U.S. Cl.
CPC ...... *H01M8/04664* (2013.01); *H01M 8/04686* (2013.01); *H01M 8/04768* (2013.01); *H01M 8/04955* (2013.01); *H01M 8/0432* (2013.01); *H01M 8/04052* (2013.01); *H01M 8/04231* (2013.01); *Y02E 60/50* (2013.01)

(56) References Cited

U.S. PATENT DOCUMENTS

| | | | |
|---|---|---|---|
| 7,052,790 | B2 | 5/2006 | Nakamura et al. |
| 7,687,035 | B2 | 3/2010 | Terada et al. |
| 2002/0159928 | A1 | 10/2002 | Naka et al. |
| 2003/0068540 | A1 | 4/2003 | Ueda et al. |
| 2003/0162065 | A1 | 8/2003 | Miyauchi et al. |
| 2004/0058230 | A1 | 3/2004 | Hsu |
| 2004/0131540 | A1 | 7/2004 | Fujii et al. |
| 2004/0229097 | A1 | 11/2004 | Hirakata et al. |
| 2005/0129997 | A1 | 6/2005 | Maenishi et al. |
| 2005/0132649 | A1 | 6/2005 | Tamura et al. |
| 2005/0175870 | A1 | 8/2005 | Hagan et al. |
| 2005/0202294 | A1* | 9/2005 | Gallagher et al. ............ 429/26 |
| 2005/0244765 | A1 | 11/2005 | Okada et al. |
| 2006/0005557 | A1* | 1/2006 | Takano et al. ............. 62/238.6 |
| 2006/0216562 | A1 | 9/2006 | Edlund et al. |
| 2006/0246325 | A1 | 11/2006 | Miyauchi et al. |
| 2007/0101647 | A1 | 5/2007 | Miyauchi et al. |
| 2007/0148063 | A1 | 6/2007 | Terada et al. |
| 2008/0026271 | A1 | 1/2008 | Ueda et al. |
| 2008/0081231 | A1 | 4/2008 | Kurita et al. |
| 2008/0160361 | A1 | 7/2008 | Ohara et al. |
| 2008/0166284 | A1 | 7/2008 | Son et al. |
| 2009/0087701 | A1 | 4/2009 | Kuwaba |
| 2009/0092883 | A1 | 4/2009 | Ozeki et al. |
| 2009/0176138 | A1 | 7/2009 | Miyauchi et al. |
| 2009/0181271 | A1* | 7/2009 | Yasuda et al. ................ 429/24 |
| 2009/0317678 | A1 | 12/2009 | Bono |
| 2010/0047636 | A1* | 2/2010 | Tamura et al. ................ 429/17 |
| 2010/0062294 | A1 | 3/2010 | Tamura |
| 2010/0092814 | A1 | 4/2010 | Dutta et al. |
| 2010/0285377 | A1 | 11/2010 | Tamura et al. |
| 2011/0014528 | A1 | 1/2011 | Kani et al. |
| 2011/0223099 | A1 | 9/2011 | Nakamura et al. |

FOREIGN PATENT DOCUMENTS

| | | | |
|---|---|---|---|
| JP | 2002-352839 | | 12/2002 |
| JP | 2002-367646 | | 12/2002 |
| JP | 2003-002605 | A | 1/2003 |
| JP | 2004-0062177 | A | 1/2004 |
| JP | 2004-247084 | A | 9/2004 |
| JP | 2004-296102 | A | 10/2004 |
| JP | 2004-307236 | A | 11/2004 |
| JP | 2005-041709 | A | 2/2005 |
| JP | 2005-251603 | | 9/2005 |
| JP | 2005-259663 | A | 9/2005 |
| JP | 2007-103035 | A | 4/2007 |
| JP | 2007-132612 | A | 5/2007 |
| JP | 2007-141787 | | 6/2007 |
| JP | 2007-169116 | A | 7/2007 |
| JP | 2007-175587 | A | 7/2007 |
| JP | 2007-254251 | A | 10/2007 |
| JP | 2008-152999 | A | 7/2008 |
| JP | 2008-266118 | A | 11/2008 |
| JP | 2009-004346 | | 1/2009 |
| JP | 2009-224115 | A | 10/2009 |
| JP | 2012-256606 | A | 12/2012 |
| WO | WO 2006/088077 | A1 | 8/2006 |
| WO | 2007/145321 | A1 | 12/2007 |
| WO | WO 2007/142278 | * | 12/2007 .............. H01M 8/04 |
| WO | WO 2007/142278 | A1 | 12/2007 |
| WO | WO 2008/035776 | * | 3/2008 ................ C01B 3/38 |
| WO | 2008/126686 | A1 | 10/2008 |
| WO | 2010/058604 | A1 | 5/2010 |

OTHER PUBLICATIONS

Machine translation of JP 2009-004346, Kato et al., Jan. 8, 2009.*
Machine translation of JP 2008-152999, Uchiyama Wataru, Jul. 3, 2008.*
Chinese Office Action, and partial English translation thereof, issued in Chinese Patent Application No. 200980102593.X dated Jul. 30, 2012.
Extended European Search Report issued in European Patent Application No. 09827383.2 mailed Nov. 26, 2012.
Japanese Office Action issued in Japanese Patent Application No. 2009-091105 mailed Jul. 16, 2013.
Chinese Office Action with Full English Translation issued in Chinese Patent Application No. 200980146102.1 mailed Sep. 4, 2013.
Japanese Office Action issued in Japanese Patent Application No. 2012-177075 mailed Dec. 17, 2013.

* cited by examiner

| FIRST ABNORMALITY | COOLING WATER TEMPERATURE ABNORMALITY | |
|---|---|---|
| | FIRST PUMP ABNORMALITY | |
| SECOND ABNORMALITY | ABNORMALITIES OF COMPONENTS | FAILURE OF COOLING WATER TANK WATER LEVEL DETECTOR |
| | | FAILURE OF CONDENSED WATER TANK WATER LEVEL DETECTOR |
| | | FAILURE OF FLOW DETECTOR |
| | | FAILURE OF TEMPERATURE DETECTOR |
| | | FAILURE OF VOLTAGE TRANSDUCER |
| | | FAILURE OF VENTILATION FAN |
| | GAS LEAKAGE ABNORMALITY | FUEL GAS PASSAGE PRESSURE ABNORMALITY |
| | | OXIDIZING GAS PASSAGE PRESSURE ABNORMALITY |
| | | COMBUSTIBLE GAS CONCENTRATION ABNORMALITY |
| | CONTROLLER TEMPERATURE INCREASE ABNORMALITY | — |

Fig. 6

| FIRST ABNORMALITY | BURNER FLAME EXTINGUISHMENT ABNORMALITY | |
|---|---|---|
| SECOND ABNORMALITY | ABNORMALITIES OF COMPONENTS | FAILURE OF TEMPERATURE DETECTOR |
| | | FAILURE OF CO SENSOR |
| | | FAILURE OF COMBUSTION AIR SUPPLIER |
| | GAS LEAKAGE ABNORMALITY | — |
| | DETECTED TEMPERATURE ABNORMALITY | — |

Fig. 18

FUEL CELL SYSTEM FOR PERFORMING NORMAL AND ABNORMAL SHUT-DOWN PROCESSES

RELATED APPLICATIONS

This application is the U.S. National Phase under 35 U.S.C. §371 of International Application No. PCT/JP2009/006292, filed on Nov. 20, 2009, which in turn claims the benefit of Japanese Application No. 2008-296968, filed on Nov. 20, 2008 and Japanese Application No. 2009-021339, filed on Feb. 2, 2009 the disclosures of which Applications are incorporated by reference herein.

TECHNICAL FIELD

The present invention relates to a fuel cell system configured to generate electric power using a hydrogen-rich gas containing hydrogen and an oxidizing gas containing oxygen. Particularly, the present invention relates to a fuel cell system configured to perform a shut-down operation when an abnormality of the fuel cell system is detected.

BACKGROUND ART

Conventionally, application of fuel cells using a fuel gas containing hydrogen and an oxidizing gas to automobile and so on has been studied, because the fuel cells are environmentally friendly and clean power generators which generate only water by power generation. In addition, application of the fuel cells to a cogeneration system which can achieve a high-energy utilization energy by recovering exhaust heat generated in power generation, by storing the heat in a heat accumulator, and by supplying the heat to a hot water load and the like as well as by supplying the electric power generated in the power generation to a specified power load has been studied.

By the way, when the operation of the fuel cell system is shut down, the fuel cell keeps a predetermined temperature (e.g., about 70 degrees C.) for some time after the fuel cell shut-downs power generation. A fuel cell system is known, which is aimed at efficiently making use of heat kept in the fuel cell after the power generation terminates (see Patent document 1).

In the fuel cell system disclosed in Patent document 1, after supply of a fuel gas to a fuel cell and supply of an oxidizing gas to the fuel cell are stopped when the power generation of the fuel cell is shut down, a heat medium circulating means (pump) is operated to recover heat of the fuel cell with a heat medium if a temperature of the heat medium (cooling water) outflowing from the fuel cell, which is detected by a temperature detector, is higher than a predetermined threshold (e.g., about 60 degrees C.), and the operation of the heat medium circulating means is stopped if the temperature of the heat medium is lower than the predetermined threshold.

PRIOR ART DOCUMENTS

Patent Documents

Patent document 1: Japanese Laid-Open Patent Application Publication No. 2002-367646

SUMMARY OF THE INVENTION

Problems to be Solved by the Invention

When the system shut-downs abnormally, a maintenance operation is in some cases required thereafter. In that case, it is necessary to lower the temperature quickly to a temperature at which a maintenance operator will not get burnt, etc. However, the cooling operation during the shut-down process in the fuel cell system disclosed in the above Patent document 1 does not meet this requirement.

The present invention has been developed in view of the above circumstances, and an object of the present invention is to provide a fuel cell system in which a cooling operation of a fuel cell is performed according to a state in a case where a shut-down process is performed.

Means for Solving the Problem

To solve the above described problem, a fuel cell system of the invention comprises a fuel cell; a first heat medium path through which a first heat medium for cooling the fuel cell flows; a first flow control device configured to flow the first heat medium in the first heat medium path; an abnormality detector configured to detect an abnormality; and a controller configured to control the first flow control device such that the fuel cell after shut-down of power generation is cooled with a higher amount in an abnormal shut-down process performed after the abnormality detector detects the abnormality, than in a normal shut-down process.

Thereby, since the fuel cell is cooled with a higher amount when an abnormality occurs in the fuel cell system than in the normal shut-down process, the temperature of the fuel cell is lowered at a higher pace, and shifting to the maintenance operation is facilitated.

In the fuel cell system of the present invention, the controller may be configured to control at least one of an operation time and an operation amount of the first flow control device such that the fuel cell is cooled with a higher amount in the abnormal shut-down process than in the normal shut-down process.

In the fuel cell system of the present invention, the controller may be configured to permit the fuel cell system to start an operation under a higher-temperature condition of the fuel cell, in the normal shut-down process than in the abnormal shut-down process.

In the fuel cell system of the present invention, the controller may be configured to forcibly cause an operation amount of the first flow control device to be larger than a predetermined value regardless of a temperature of the fuel cell, in the abnormal shut-down process.

In the fuel cell system of the present invention, the controller may be configured to cool the fuel cell by controlling the operation amount of the first flow control device based on the temperature of the fuel cell in the normal shut-down process; and wherein the controller may be configured to forcibly cause the operation amount of the first flow control device to be larger than a predetermined value regardless of a temperature of the fuel cell, in the abnormal shut-down process.

In the fuel cell system of the present invention, the controller may be configured to perform a first cooling step of controlling the operation amount of the first flow control device based on the temperature of the fuel cell and a second cooling step of forcibly causing the operation amount of the first flow control device to be larger than the predetermined value regardless of the temperature of the fuel cell, in the abnormal shut-down process.

The fuel cell system of the present invention may further comprise a hydrogen generator configured to supply a hydrogen-containing gas supplied to the fuel cell, using a raw material; wherein the controller may be configured to continue a cooling operation of the fuel cell in the abnormal shut-down process at least until a raw material purge process of the hydrogen generator terminates.

The fuel cell system of the present invention may be configured to perform a pressure compensation operation for supplying a gas to a reactant gas path in the fuel cell sealed, a pressure in the reactant gas path having been decreased, after the shut-down of the power generation of the fuel cell; and the controller may be configured to set the number of times of the pressure compensation operation more in the abnormal shut-down process than in the normal shut-down process.

The fuel cell system may further comprise a heat accumulator configured to store a second heat medium for recovering exhaust heat from the fuel cell; a second heat medium path through which the second heat medium flows; and a bypass path through which the second heat medium which has recovered the exhaust heat from the fuel cell flows so as to bypass the heat accumulator; and the controller may be configured to switch to the bypass path through which the second heat medium flows so as to bypass the heat accumulator, in a cooling operation of the fuel cell in the abnormal shut-down process.

In the fuel cell system of the present invention, the controller may be configured to control the first flow control device such that the fuel cell after the shut-down of the power generation is cooled with a higher amount, when the abnormality detector detects a component failure or a gas leakage abnormality, than in the normal shut-down process.

In the fuel cell system of the present invention, the controller may be configured to control the first flow control device such that the fuel cell is cooled with a higher amount in an abnormal shut-down process performed after the abnormality detector detects a second abnormality which requires a maintenance operation, than in an abnormal shut-down process performed after the abnormality detector detects a first abnormality which does not require the maintenance operation.

Thereby, the cooling operation is carried out appropriately according to the content of the abnormality, shifting to the maintenance operation is facilitated, and the facilitating of the start-up of the fuel cell system is not impeded.

In the fuel cell system of the present invention, the controller may be configured to permit the fuel cell system to start an operation under a higher-temperature condition of the fuel cell in the abnormal shut-down process associated with the first abnormality than in the abnormal shut-down process associated with the second abnormality.

In the fuel cell system of the present invention, the controller may be configured to forcibly cause the operation amount of the first flow control device to be larger than a predetermined value, regardless of a temperature of the fuel cell, in the abnormal shut-down process associated with the second abnormality.

In the fuel cell system of the present invention, the controller may be configured to cool the fuel cell by controlling the operation amount of the first flow control device based on a temperature of the fuel cell in the abnormal shut-down process associated with the first abnormality; and the controller may be configured to forcibly cause the operation amount of the first flow control device to be larger than the predetermined value regardless of the temperature of the fuel cell, in the abnormal shut-down process associated with the second abnormality.

In the fuel cell system of the present invention, the controller may be configured to perform a first cooling step of controlling the operation amount of the first flow control device based on the temperature of the fuel cell, in the abnormal shut-down process associated with the second abnormality, and a second cooling step of forcibly causing the operation amount of the first flow control device to be larger than the predetermined value regardless of the temperature of the fuel cell, in the abnormal shut-down process associated with the second abnormality.

The fuel cell system of the present invention may further comprise: a hydrogen generator configured to generate a hydrogen-containing gas supplied to the fuel cell, using a raw material; and the controller may be configured to continue a cooling operation of the fuel cell in the abnormal shut-down process associated with the second abnormality at least until a material purge process of the hydrogen generator terminates.

The fuel cell system of the present invention may be configured to perform a pressure compensation operation for supplying a gas to a reactant gas path in the fuel cell sealed, a pressure in the reactant gas path having been decreased, after the shut-down of the power generation of the fuel cell; and the controller may be configured to set the number of times of the pressure compensation operation more in the abnormal shut-down process associated with the second abnormality than in the abnormal shut-down process associated with the first abnormality.

The fuel cell system of the present invention may further comprise: a heat accumulator configured to store a second heat medium for recovering exhaust heat from the fuel cell; a second heat medium path through which the second heat medium flows; and a bypass path through which the second heat medium which has recovered the exhaust heat from the fuel cell flows so as to bypass the heat accumulator. The controller may be configured to switch to the bypass path through which the second heat medium flows so as to bypass the heat accumulator, in a cooling operation of the fuel cell in the abnormal shut-down process associated with the second abnormality.

In the fuel cell system of the present invention, the first abnormality may be at least one of a temperature abnormality of the first heat medium and an abnormality of the first flow control device.

In the fuel cell system of the present invention, the second abnormality may be one or more of a component failure, a gas leakage abnormality and an excessive temperature increase abnormality of the controller.

The fuel cell system of the present invention may further comprise: a hydrogen generator including a reformer configured to generate a hydrogen-containing gas through a reforming reaction using a raw material, a combustor configured to heat the reformer, and a combustion air supplier configured to supply combustion air to the combustor; and the controller may be configured to control the first flow control device such that the fuel cell is cooled with a higher amount than in the normal shut-down process and control the combustion air supplier such that the reformer is cooled with an amount equal to an amount of cooling in the normal shut-down process, in an abnormal shut-down process performed after the abnormality detector detects an abnormality which is associated with the fuel cell and is other than an abnormality associated with the hydrogen generator.

In the fuel cell system of the present invention, the controller may be configured to control the combustion air supplier and the first flow control device such that the reformer and the fuel cell are cooled with an amount equal to an amount of cooling in the normal shut-down process, in an abnormal shut-down process performed after the abnormality detector detects a first abnormality which does not require the maintenance operation, is associated with the fuel cell and is other than the abnormality associated with the hydrogen generator; and the controller may be configured to control the first flow control device such that the fuel cell is cooled with a higher amount than in the normal shut-down process and control the combustion air supplier such that the reformer is cooled with an amount equal to an amount of cooling in the normal shut-down process, in an abnormal shut-down process performed after the abnormality detector detects a second abnormality which requires the maintenance operation, is associated with the fuel cell and is other than the abnormality associated with the hydrogen generator.

The fuel cell system of the present invention may further comprises a hydrogen generator including a reformer configured to generate a hydrogen-containing gas through a reforming reaction using a raw material, a combustor configured to heat the reformer, and a combustion air supplier configured to supply combustion air to the combustor; and the controller may be configured to control the combustion air supplier such that the reformer is cooled with a higher amount than in the normal shut-down process and control the first flow control device such that the fuel cell is cooled with an amount equal to an amount of cooling in the normal shut-down process, when the abnormality detector detects the abnormality associated with the hydrogen generator.

In the fuel cell system of the present invention, the controller may be configured to control the combustion air supplier and the first flow control device such that the reformer and the fuel cell are cooled with an amount equal to an amount of cooling in the normal shut-down process, in an abnormal shut-down process performed after the abnormality detector detects a first abnormality which does not require the maintenance operation and is associated with the hydrogen generator; and the controller may be configured to control the first flow control device such that the reformer is cooled with a higher amount than in the normal shut-down process and control the first flow control device such that the fuel cell is cooled with an amount equal to an amount of cooling in the normal shut-down process, in an abnormal shut-down process performed after the abnormality detector detects a second abnormality which requires the maintenance operation and is associated with the hydrogen generator.

The above and further objects and features of the present invention will more fully be apparent from the following detailed description with accompanying drawings.

Effects of the Invention

In accordance with the fuel cell system of the present invention, the fuel cell is cooled with a higher amount when an abnormality occurs in the fuel cell system than in a normal shut-down process. Therefore, the temperature of the fuel cell is lowered at a higher pace, and shifting to a maintenance operation is facilitated.

BRIEF DESCRIPTION OF THE DRAWINGS

FIG. 6 is a table showing examples of abnormality which is followed by the shut-down operation of the fuel cell system of the present invention.

FIG. 18 is a table showing examples of abnormality associated with the hydrogen generator of the present invention.

BEST MODE FOR CARRYING OUT THE INVENTION

Figure 1:
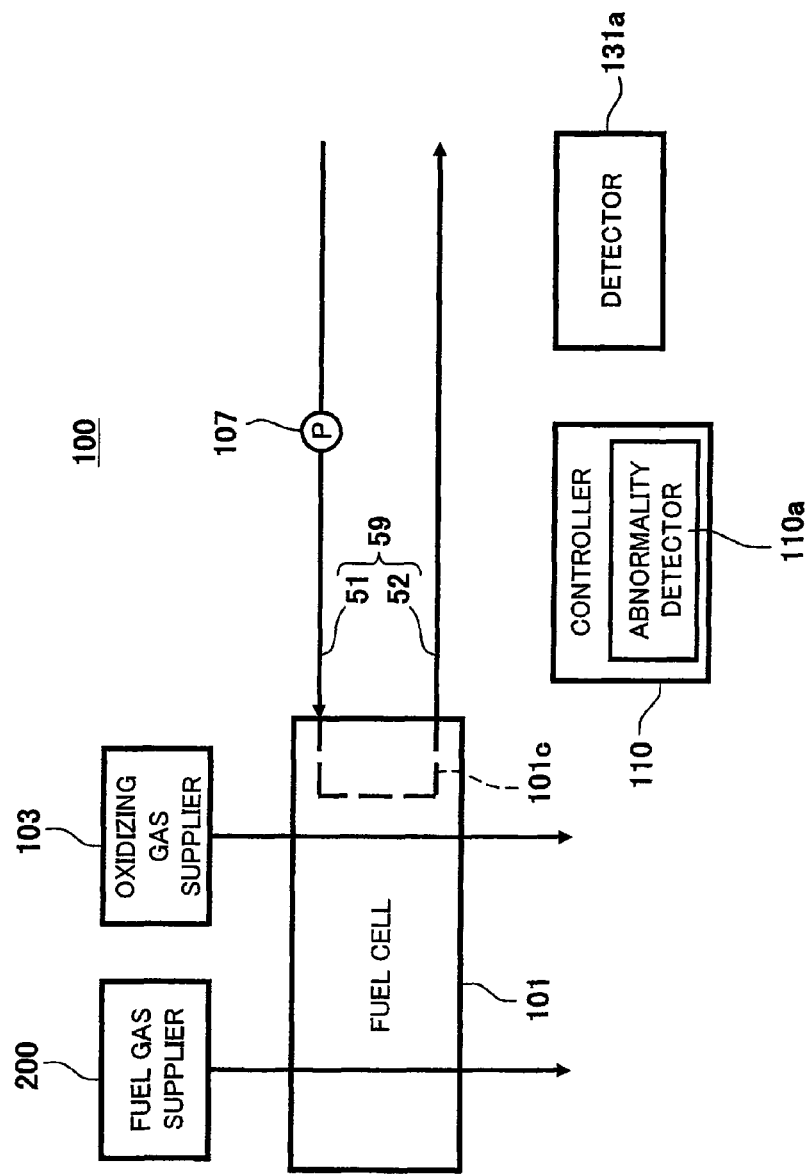
FIG. 1 is a view showing a schematic configuration of a fuel cell system according to Embodiment 1 of the present invention.

Hereinafter, preferred embodiments of the present invention will be described with reference to the drawings. Throughout the drawings, the same or corresponding constituents are designated by the same reference characters and will not be described repetitively. Also, throughout the drawings, only the constituents required to explain the present invention are extracted and illustrated, and other constituents are omitted. Furthermore, the present invention is not limited to the embodiments described below.

Embodiment 1

[Configuration of Fuel Cell System]

FIG. 1 is a view showing a schematic configuration of a fuel cell system according to Embodiment 1 of the present invention.

As shown in FIG. 1, a fuel cell system 100 according to Embodiment 1 of the present invention includes a fuel cell 101, a first heat medium path 59 through which a first heat medium for cooling the fuel cell 101 flows, a first flow control device 107 for flowing the first heat medium in the first heat medium path 59, an abnormality detector 110a configured to detect an abnormality, and a controller 110 configured to control the first flow control device 107 such that the fuel cell 101 after shut-down of power generation is cooled with a higher amount in an abnormal shut-down process performed after the abnormality detector 110a detects an abnormality than in a normal shut-down process. As used herein, the normal shut-down process refers to a shut-down process which is different from a shut-down process (abnormal shut-down process) performed when the abnormality detector detects an abnormality, during a power generation operation of the fuel cell system 100. For example, the normal shut-down process refers to a shut-down process which is performed when a power demand of a power load which is not shown decreases to a value which is not more than a predetermined threshold at which the power generation operation is unnecessary, or a shut-down process or the like which is performed at a preset shut-down time.

Thereby, the fuel cell 101 is cooled with a higher amount when an abnormality occurs in the fuel cell system 100 than in the normal shut-down process. Therefore, a decrease in the temperature of the fuel cell 101 is facilitated, and shifting to a maintenance operation quickly takes place.

As the fuel cell 101, a polymer electrolyte fuel cell, a solid oxide fuel cell, a phosphoric acid fuel cell, a molten carbonate fuel cell, etc may be used. Inside the fuel cell 101, there is provided a first heat medium passage 101c through which the first heat medium which has recovered heat generated in the fuel cell 101 to cool the fuel cell 101 flows. A first heat medium supply path 51 is connected to an inlet (not shown) of the first heat medium passage 101c, while a first heat medium discharge path 52 is connected to an outlet (not shown) of the first heat medium passage 101c. Although in Embodiment 1, a first heat medium path 59 is composed of the first heat medium supply path 51 and the first heat medium discharge path 52, it may include a path (pipe) other than the first heat medium supply path 51 and the first heat medium discharge path 52.

As the first flow control device 107, for example, a pump which outputs the first heat medium and is capable of controlling the flow rate of the first heat medium flowing through the first heat medium path 59, may be used, or a flow control unit including a combination of the pump which outputs the first heat medium and the flow control valve to control the flow rate may be used.

The detector 130a is a sensor which is configured to detect a physical amount relating to a state of the fuel cell 101. For example, the detector 130a includes a temperature detector of the first heat medium flowing through the first heat medium path, a water level detector of a tank for storing the first heat medium, a fuel gas flow rate meter for measuring the flow rate of a fuel gas, an oxidizing gas flow rate meter for measuring the flow rate of an oxidizing gas, a combustible gas sensor inside a casing of the fuel cell system 100, etc.

The abnormality determiner 110a constituents an abnormality detector of the present invention, and is configured to determine abnormalities based on detected values of the detector 140a. For the failure of the detector, among the abnormalities of the fuel cell system 100, the abnormality determiner 110a operates as an abnormality detector, while for abnormalities different from the failure of the detector, the abnormality determiner 110a and a detector for outputting a detected value used to determine whether or not there is an abnormality, operate as the abnormality detector.

In the fuel cell system of this embodiment, the controller 110 may be configured to control at least one of the operation time and the operation amount of the first flow control device 107 so that the fuel cell 101 is cooled with a higher amount, in the abnormal shut-down process than in the normal shut-down process.

Embodiment 2

A fuel cell system according to Embodiment 2 of the present invention is an example in which the controller is configured to control at least one of the operation time and the operation amount of the first flow control device such that the fuel cell is cooled with a higher amount in the abnormal shut-down process than in the normal shut-down process.

[Configuration of Fuel Cell System]

Figure 2:
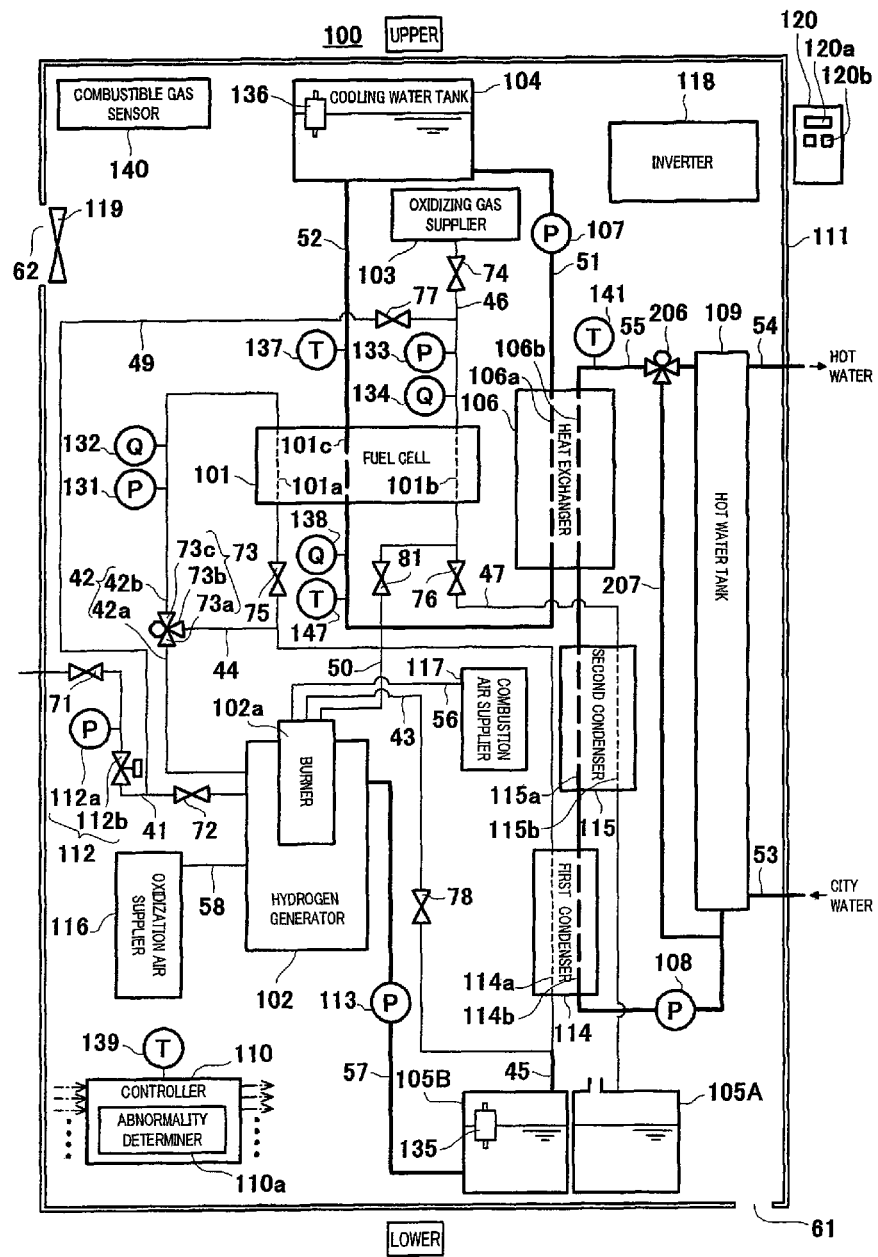
FIG. 2 is a view showing a schematic configuration of a fuel cell system according to Embodiment 2 of the present invention.

FIG. 2 is a view showing a schematic configuration of a fuel cell system according to Embodiment 1 of the present invention. In FIG. 2, the upper and lower sides of the fuel cell system are expressed as upper and lower sides in FIG. 2.

As shown in FIG. 2, a fuel cell system 100 of the present invention includes the fuel cell 101, a hydrogen generator 102, an oxidizing gas supplier 103, a cooling water tank 104, a first condensed water tank 105A, a second condensed water tank 105B, a heat exchanger (heat radiator) 106, a first pump (first flow control device) 107, a second pump (second output device) 108, a hot water tank (heat accumulator) 109, the controller 110, the abnormality determiner 110a, a remote control device 120, a package 111 formed by a housing, and detectors 131~140. A user operates the remote control device 120 to start and shut-down the operation of the fuel cell system 100. In this embodiment, the package 111 extends vertically, and in the interior of the package 111, components such as the fuel cell 101 are accommodated.

The abnormality determiner 110a constitutes the abnormality of the present invention and is configured to determine whether or not there is an abnormality based on the detected values of the detectors 130~140. The heat exchanger 106 is an exemplary heat radiator. The heat exchanger 106 may be replaced by a configuration in which cooling water in the fuel cell 101 is air-cooled. In this case, the amount with which the cooling water is cooled is controlled according to at least one of the flow rate of the cooling water flowing into the heat radiator and the operation amount of an air-cooling fan.

The hydrogen generator 102 includes a reformer, a shift converter, a purifier (not shown), and a burner (combustor) 102a. The downstream end of a material gas supply path 41 is connected to a material gas supply inlet of the reformer of the hydrogen generator 102. In this Embodiment, as a material gas, a city gas containing methane as a major component is used. The upstream end of the material gas supply path 41 is connected to a pipe (not shown) of the city gas. The material gas supply path 41 is provided with a first on-off valve 71, a booster pump 112a, a flow control valve 112b, and a second on-off valve 72 which are arranged in this order from the upstream side. The first on-off valve 71 and the second on-off valve 72 are configured to permit/inhibit the flow of the material gas flowing through the material gas supply path 41. As these valves, electromagnetic valves may be used, for example. The booster pump 112a is configured to increase the pressure of the material gas flowing through the material gas supply path 41. The flow control valve 112b is configured to control the flow rate of the material gas flowing through the material gas supply path 41. The material gas supplier 112 is constituted by the booster pump 112a and the flow control valve 112b. Although the material gas supplier 112 is constituted by the booster pump 112a and the flow control valve 112b, it may consist of the booster pump 112a. In other words, the booster pump 112a may be configured to increase the pressure of the material gas and control the flow rate of the material gas.

The downstream end of an off-fuel-gas path 43 is connected to the burner 102a so that an extra fuel gas remaining unconsumed in the fuel cell 101 is supplied as an off-gas to the burner 101a. In addition, the downstream end of a cathode purge gas exhaust path 50 is connected to the burner 102a so that a gas (hereinafter referred to as a cathode purge gas) staying in an oxidizing gas passage 101b purged by a cathode purge process in the fuel cell 101 performed in a start-up process or an operation-shut-down process of the fuel cell system 100 as described later, is supplied to the burner 102b. The downstream end of a combustion air supply path 56 is connected to the burner 102b, while a combustion air supplier 117 is connected to the upstream end of the combustion air supply path 56.

Thereby, the burner 102a is configured to combust the material gas supplied through a passage which is not shown (or off-gas supplied from the fuel cell 101 through the off-fuel-gas path 43 or the cathode purge gas supplied from the fuel cell 101 through the cathode purge gas exhaust path 50), with combustion air supplied from the combustion air supplier 117 through the combustion air supply path 56. As the combustion air supplier 117, for example, a blower or a fan such as a sirocco fan may be used.

The downstream end of a reforming water supply path 57 is connected to a water supply inlet (not shown) of the reformer of the hydrogen generator 102, while the upstream end of the reforming water supply path 57 is connected to the lower portion of a second condensed water tank 105B. A third pump 113 is provided in the reforming water supply path 57 to control the flow rate of the reforming water (condensed water) flowing through the reforming water supply path 57. Although the condensed water is directly supplied from the second condensed water tank 105B to the reformer of the hydrogen generator 102, the present invention is not limited to this. The condensed water may be directly supplied from the first condensed water tank 105A to the reformer of the hydrogen generator 102, or the condensed water stored in the second condensed water tank 105B may be supplied to the cooling water tank 104 and may be supplied to the reformer of the hydrogen generator 102 together with the cooling water stored in the cooling water tank 104.

The upstream end of an oxidization air supply passage 58 is connected to the purifier of the hydrogen generator 102, while the downstream end of the oxidization air supply passage 58 is connected to the oxidization air supplier 116. The oxidization air supplier 116 is configured to supply air used in an oxidization reaction in the purifier. As the oxidization air supplier 116, for example, a bower or fan such as a sirocco fan may be used.

In the reformer, a reforming reaction between a material gas (methane) supplied from the material gas supplier 112 via the material gas supply path 41 and the condensed water supplied from the first condensed water tank 105A proceeds by utilizing heat transmission of a combustion exhaust gas generated in the burner 102a, to generate a hydrogen-rich reformed gas. In the shift converter, a shift reaction using the reformed gas generated in the reformer occurs to reduce carbon monoxide contained in the reformed gas. In the purifier, carbon monoxide in the reformed gas, carbon monoxide of which has been reduced in the shift converter reacts with an oxidization air supplied from the oxidization air supplier 116 via the oxidization air supply passage 58, to generate a fuel gas, carbon monoxide of which has been reduced to 10 ppm or lower. Although in this embodiment, methane is used as the material gas, a gas containing an organic compound composed of at least carbon and hydrogen which is represented by a gas containing hydrocarbon such as ethane or propane, or a gas containing a gaseous alcohol, may be used. In addition, although the hydrogen generator 102 is configured to include the shift converter and the purifier in this embodiment, they may be omitted.

The upstream end of a fuel gas supply path 42 is connected to the outlet of the purifier of the hydrogen generator 102. A first switch 73 including a three-way valve is provided in an intermediate position of the fuel gas supply path 42. The downstream end of the fuel gas supply path 42 is connected to the upstream end of the fuel gas passage 101a of the fuel cell 101. To be specific, the fuel gas supply path 42 consists of a first fuel gas supply path 42a and a second fuel gas supply path 42b. The upstream end of the fuel gas supply path 42a is connected to the outlet of the purifier of the hydrogen generator 102, while the downstream end of the fuel gas supply path 42a is connected to a first port 73a of the first switch 73. The upstream end of the second fuel gas supply path 42b is connected to a third port 73c of the first switch 73, while the downstream end of the second fuel gas supply path 42b is connected to the upstream end of the fuel gas passage 101a of the fuel cell 101. The upstream end of a fuel cell bypass path 44 is connected to a second port 73b of the first switch 73, while the downstream end of the fuel cell bypass path 44 is connected to an intermediate position of the off-fuel-gas path 43.

A first pressure detector 131 configured to detect a pressure in a pipe constituting the second fuel gas supply path 42b and a first flow detector 132 configured to detect the flow rate of the fuel gas and the like flowing through the second fuel gas supply path 42b are provided at proper positions of the second fuel gas supply path 42b of the fuel gas supply path 42. The first pressure detector 131 outputs the detected pressure value to the abnormality determiner 110a in the controller 110, while the first flow detector 132 outputs the detected flow rate to the abnormality determiner 110a. As the first pressure detector 131, a known pressure detector (e.g., diaphragm pressure sensor, etc) may be used. As the first flow detector 132, a known flow detector (e.g., hot wire flow sensor, etc) may be used.

The upstream end of the off-fuel-gas path 43 is connected to the downstream end of the fuel gas passage 101a of the fuel cell 101, while the downstream end of the off-fuel-gas path 43 is connected to the burner 102a of the hydrogen generator 102. A fourth on-off valve 75 is provided in the off-fuel-gas path 43 in a location which is upstream of a point where the off-fuel-gas path 43 is connected to the fuel cell bypass path 44 and configured to permit/inhibit the flow of the fuel gas or the like flowing through the off-fuel-gas path 43. A first condenser 114 is provided at the off-fuel-gas path 43 in a location which is downstream of a point where the off-fuel-gas path 43 is connected to the fuel cell bypass path 44. The off-fuel-gas path 43 is connected to a primary passage 114a of the first condenser 114. The first condenser 114 is configured to condense a steam into water to separate an unreacted fuel gas from water. The upstream end of the first condensed water path 45 extending vertically is connected to the off-fuel-gas path 43 in a location downstream of the first condenser 114, while the downstream end of the first condensed water path 45 is connected to the upper portion (upper end surface) of the second condensed water tank 105B. Further, a seventh on-off valve 78 is provided at the off-fuel-gas path 43 in a location which is downstream of a point where the off-fuel-gas path 43 is connected to the fuel cell bypass path 44.

In this configuration, the fuel gas generated in the hydrogen generator 102 is supplied to the fuel gas passage 101a of the fuel cell 101. The fuel gas supplied to the fuel gas passage 101a is supplied to an anode (not shown) of each cell and is used in an electrical chemical reaction while flowing through the fuel gas passage 101a. An extra fuel gas remaining unconsumed in the fuel cell 101 flows into the off-fuel-gas path 43 as an off-gas. The steam contained in the extra fuel gas which has flowed into the off-fuel-gas path 43 is condensed into water while flowing through the primary passage 114a of the first condenser 114. The extra fuel gas which has been separated in the first condenser 114 is supplied to the burner 102a as the off-gas and is combusted in the burner 102a as described above. The water which has been separated in the first condenser 114 is supplied to the second condensed water tank 105B via the first condensed water path 45.

The water level detector 135 is provided inside the second condensed water tank 105B. The water level detector 135 is configured to detect a water level of water stored in the tank and output the detected water level to the controller 110.

The oxidizing gas supplier 103 is configured to supply an oxidizing gas (in this embodiment air) to the oxidizing gas passage 101b of the fuel cell 101. As the oxidizing gas supplier 103, for example, a blower or a fan such as a sirocco fan may be used. The upstream end of the oxidizing gas supply path 46 is connected to the oxidizing gas supplier 103, while the downstream end of the oxidizing gas supply path 46 is connected to the oxidizing gas passage 101b of the fuel cell 101.

The oxidizing gas supply path 46 is provided with a third on-off valve 74, a second pressure detector 133 configured to detect a pressure in a pipe constituting the oxidizing gas supply path 46, and a second flow detector 134 configured to detect the flow rate of the oxidizing gas or the like flowing through the oxidizing gas supply path 46, in this order from the upstream side. The third on-off valve 74 is configured to open and close the oxidizing gas supply path 46, and may be an electromagnetic valve or the like. The second pressure detector 133 outputs the detected pressure value to the abnormality determiner 110a in the controller 110, while the second flow detector 134 outputs the detected flow rate to the abnormality determiner 110a. As the second pressure detector 133, a known pressure detector (e.g., diaphragm pressure sensor, etc) may be used. As the second flow detector 134, a known flow detector (e.g., hot wire flow sensor, etc) may be used.

The downstream end of a purge gas supply path 49 is connected to the oxidizing gas supply path 46 in a location between the third on-off valve 74 and the second pressure detector 133, while the upstream end thereof is connected to the material gas supply path 41 in a location between the flow control valve 112b and the second on-off valve 72. The purge gas supply path 49 is configured to flow a material gas such as a purge gas or a pressure-compensation gas and is provided with a sixth on-off valve 77. The sixth on-off valve 77 is configured to open and close the purge gas supply path 49, and may be, for example, an electromagnetic valve or the like.

The upstream end of an off-oxidizing-gas path 47 is connected to the downstream end of the oxidizing gas passage 101b of the fuel cell 101, while the downstream end thereof opens outside the fuel cell system 100. A fifth on-off valve 76 is provided in the off-oxidizing-gas path 47 and configured to open and close the off-oxidizing-gas path 47. The upstream end of a cathode purge gas exhaust path 50 is connected to the off-oxidizing-gas path 47 in a location between the upstream end of the off-oxidizing-gas path 47 and the fifth on-off valve 76, while the downstream end of the cathode purge gas exhaust path 50 is connected to the burner 102a of the hydrogen generator 102 as described above. A ninth on-off valve 81 is provided in the cathode purge gas exhaust path 50.

A second condenser 115 is provided at the off-oxidizing-gas path 47 in a location downstream of the fifth on-off valve 76. The off-oxidizing-gas path 47 is connected to the primary passage 115a of the second condenser 115. The second condenser 115 is configured to condense a steam in an off-oxidizing-gas flowing through the off-oxidizing-gas path 47 to generate water so that an extra off-oxidizing-gas remaining unconsumed in the fuel cell 101 is separated from water. A portion of the off-oxidizing-gas path 47 which is downstream of the second condenser 115 extends vertically and is connected to the first condensed water tank 105A.

In this configuration, the oxidizing gas is supplied from the oxidizing gas supplier 103 to the oxidizing gas passage 101b of the fuel cell 101 via the oxidizing gas supply path 46. Then, the oxidizing gas supplied to the oxidizing gas passage 101b is supplied to a cathode (not shown) of each cell and is consumed in an electrochemical reaction while flowing through the oxidizing gas passage 101b. An extra oxidizing gas remaining unconsumed in the electrochemical reaction in the fuel cell 101 flows into the off-oxidizing-gas path 47, together with the water generated through the electrochemical reaction. The steam contained in the extra oxidizing gas which has flowed into the off-oxidizing-gas path 47 is condensed into water while flowing through the secondary passage 115b of the second condenser 115. The extra oxidizing gas which has been exhausted from the second condenser 115 is guided to the first condensed water tank 105A via the off-oxidizing-gas path 47. After that, the extra oxidizing gas is exhausted through an exhaust outlet provided at the first condensed water tank 105A and finally outside the fuel cell system 100 (outside the package 111). The water separated in the second condenser 115 is supplied to the first condensed water tank 105A. The water supplied to the first condensed water tank 105A is supplied to the second condensed water tank 105B at a time point when the amount of the water stored in the first condensed water tank 105A reaches a predetermined amount.

In the fuel cell 101, the fuel gas supplied to the anode of each cell through the fuel gas passage 101a and the oxidizing gas supplied to the cathode of each cell through the oxidizing gas passage 101b electrochemically react with each other to generate electricity and heat. An extra fuel gas remaining unconsumed in the electrochemical reaction in the fuel cell 101 flows through the off-fuel-gas path 43 and is stored in the second condensed water tank 105B.

The fuel cell 101 is provided with a cooling water passage 101c through which cooling water (first heat medium) for recovering the heat generated through the electrochemical reaction between the fuel gas and the oxidizing gas to cool the fuel cell 101 flows. The downstream end of the cooling water supply path 51 is connected to the upstream end of the cooling water passage 101c, while the upstream end of the cooling water supply path 51 is connected to the lower portion of the cooling water tank 104 for storing the cooling water. The upstream end of a cooling water discharge path 52 is connected to the downstream end of the cooling water passage 101c, while the downstream end of the cooling water discharge path 52 is connected to the lower end surface of the cooling water tank 104. A water level detector 136 is provided inside the cooling water tank 104. The water level detector 136 is configured to detect the level of the water stored in the tank and output the detected water level to the controller 110. The cooling water is an example of the first heat medium for cooling the fuel cell 101. As the first heat medium, other heat medium which is represented by an anti-freezing liquid (e.g., ethylene-glycol containing liquid) or the like may be used.

A heat exchanger 106 is provided at a proper position of a cooling water path (first heat medium path), for example, at a portion of the cooling water path which is other than the cooling water passage 101c within the fuel cell 101. A primary passage 106a of the heat exchanger 106 is connected to the cooling water supply path 51. In this embodiment, for example, the heat exchanger 106 is provided at the cooling water supply path 51. The heat exchanger 106 is configured to exchange heat between the cooling water flowing through the primary passage 106a and the hot water (second heat medium) flowing through a secondary passage 106b as described later. The cooling water supply path 51, the primary passage 106a of the heat exchanger 106, the cooling water passage 101c of the fuel cell 101, and the cooling water discharge path 52 constitute the cooling water path (first heat medium path).

A water temperature 137 is provided in the vicinity of the upstream end of the cooling water discharge path 52. The temperature detector 137 is configured to detect the temperature of the cooling water flowing through the cooling water path and output the detected temperature to the controller 110. In this embodiment, the temperature detector 137 is provided at the cooling water supply path 51 in a location downstream of the heat exchanger 106 and is configured to detect the temperature of the cooling water which has flowed into the fuel cell 101 and has been discharged through the cooling water passage 101c. The temperature detector 137 is configured to output the detected temperature to the controller 110. The temperature detector for detecting the temperature of the cooling water is not limited to the above configuration, but may be either one of the temperature detector 137 and the temperature detector 137, or may be provided at any location on the cooling water path (first heat medium path).

The first pump (first flow control device) 107 configured to control the flow rate of the cooling water flowing through the cooling water path and a third flow detector 138 configured to detect the flow rate of the cooling water flowing through the cooling water path are provided at proper locations of the cooling water path (in this embodiment, cooling water supply path 51). As the third flow detector 138, a known flow detector (e.g., hot wire flow sensor, etc) may be used.

Figure 3:
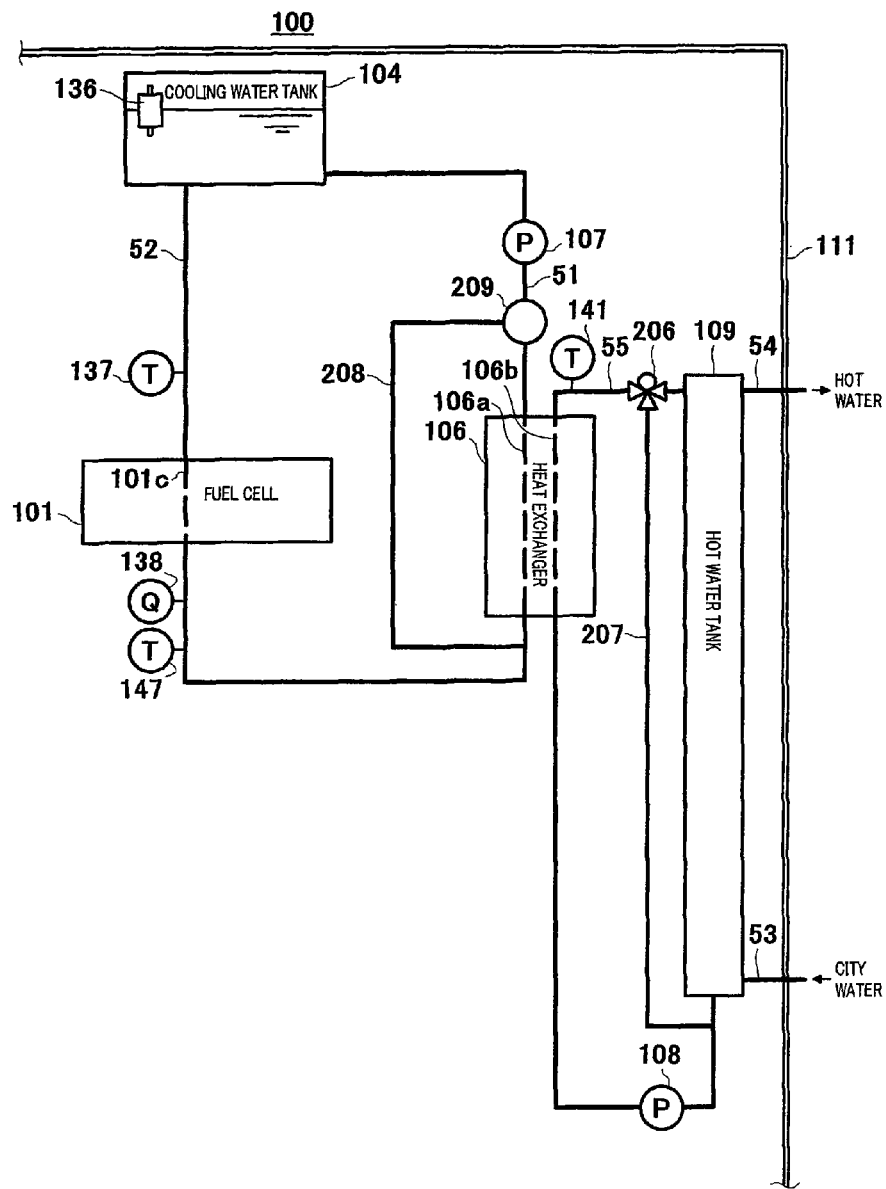
FIG. 3 is a schematic view showing another configuration of the fuel cell system of FIG. 2.

Although a pump capable of controlling the flow rate is used as the first flow control device of the present invention, the present invention is not limited to this, but the first flow control device may be configured as shown in FIG. 3. FIG. 3 is a schematic view showing another configuration of the fuel cell system 100 of FIG. 2. In FIG. 3, a part of the configuration is omitted.

As shown in FIG. 3, a heat exchanger bypass path 208 which branches from the cooling water path (in this embodiment, cooling water discharge path 52) and bypasses the heat exchanger 106 may be provided, and a flow control device (e.g., mixing valve 209) configured to control the flow rate of the cooling water which has flowed through the fuel cell 101 and then flows into the heat exchanger bypass path 208 or into the heat exchanger 106, may be combined with a pump to control the flow rate of the cooling water flowing through the heat exchanger 106, as the first flow control device of the present invention.

The cooling water flowing through the cooling water supply path 51 exchanges heat with the hot water flowing through the secondary passage 106b of the heat exchanger 106 and is thereby cooled while flowing through the primary passage 106a of the heat exchanger 106. The cooling water which has been cooled is supplied to the cooling water passage 101c of the fuel cell 101. The cooling water supplied to the cooling water passage 101c recovers the heat generated in the fuel cell 101 to cool the fuel cell 101. Then, the cooling water which has recovered the exhaust heat from the fuel cell 101 is supplied to the cooling water tank 101.

The hot water tank 109 extends vertically. A water supply path 53 through which city water is supplied is connected to the lower portion of the hot water tank 109. A hot water supply path 54 through which hot water is supplied to a user is connected to the upper portion of the hot water tank 109. A heat load (not shown) which utilizes hot water is connected to the hot water supply path 54. As the heat load, for example, there are a hot water device, a heating device, an air conditioner, etc.

The upstream end of the hot water path 55 is connected to the lower end surface of the hot water tank 109, while the downstream end of the hot water path 55 is connected to the upper portion of the hot water tank 109. The hot water path 55 is provided with the second pump (second output unit) 108, the first condenser 114, the second condenser 115, and the heat exchanger 106 which are arranged in this order from the upstream side. The hot water path 55 is connected to the secondary passage 114b of the first condenser 114, the secondary passage 115b of the second condenser 115 and the secondary passage 106b of the heat exchanger 106.

Thereby, the hot water (second heat medium) flowing through the hot water path 55 exchanges heat with an off-gas flowing through the primary passage 114a of the first condenser 114 and is thereby heated while flowing through the secondary passage 114b of the first condenser 114. Then, the hot water exchanges heat with the oxidizing gas flowing though the primary passage 11a of the second condenser 115 and is thereby heated while flowing through the secondary passage 115b of the second condenser 115. Then, the hot water which has flowed through the secondary passage 115b of the second condenser 115 exchanges heat with the cooling water flowing through the primary passage 106a of the heat exchanger 106 and is thereby heated while flowing though the secondary passage 106a of the heat exchanger 106. The heated hot water flows through the hot water path 55 and is supplied to the upper end portion of the hot water tank 109. In such a configuration, the hot water tank 109 is so-called a layered hot water tank in which water with a temperature which is as low as the temperature of the city water is stored in the lower portion of the hot water tank 109 and the heat medium with a temperature raised by the heat exchanger 106 or the like is stored in the upper portion thereof.

The fuel cell system 100 includes a temperature detector 141 configured to detect the temperature of the hot water which has flowed through the heat exchanger 105, on the hot water path 55, a hot water bypass path (second heat medium bypass path) 207 which bypasses the hot water tank 109 and is connected to the hot water path 55 in a location upstream of the first condenser 114, at the hot water path 55 in a location which is downstream of the temperature detector 141, and a second heat medium switch 206 which is configured to switch a destination of the hot water which has flowed through the heat exchanger 106 between the hot water tank 109 and the hot water bypass path 207. An inverter 118 is electrically connected to the fuel cell 101 via a suitable wire and is configured to convert a DC generated in the fuel cell 101 into an AC, which is supplied to a power load outside the fuel cell system 100. A system power supply is connected (not shown) to an electric path through which the current output from the inverter 118 flows, via a system interconnection point. In other words, the electric power output from the fuel cell 101 and the electric power output from the system electric power supply are interconnected at the system/interconnection point.

The package 111 is provided with an air inlet 61 and an air outlet 62 at suitable locations. The air inlet 61 and the air outlet 62 are desirably distant from each other as far as possible so that outside air flows through the inside of the entire package 111. The air outlet 62 is provided at the upper portion of the package 11 where a combustible gas such as a city gas containing methane as a major component or hydrogen, which is lighter than oxygen, tends to be stagnant. A ventilation fan 119 is provided in the vicinity of the air outlet 62. As the ventilation fan 119, a fan such as a sirocco fan may be used.

Thus, outside air is suctioned through the air inlet 61 by the ventilation fan 119 and the suctioned outside air is exhausted through the air outlet 62.

Within the package 111 of the fuel cell system 100, a combustible gas sensor 140 is provided. The combustible gas sensor 140 is configured to detect a leakage (concentration) of a combustible gas (e.g., material gas or hydrogen gas) within the fuel cell system 100 (package 111) and output the detected combustible gas concentration to the controller 110. In this Embodiment, the combustible gas sensor 140 is provided at the upper portion of the package 111 where a combustible gas such as a city gas containing methane as a major component or hydrogen, which is lighter than oxygen, tends to be stagnant, and in the vicinity of the ventilation fan 119.

Within the package 111, a temperature detector 139 is provided and configured to detect the temperature of a control board or the like of the controller 110. The temperature detector 139 is configured to output the detected temperature to the controller 110.

The controller 110 is constituted by a computer such as a microcomputer, and includes a calculation section constituted by a CPU, a memory section constituted by a memory or the like, a communication section, and a timer section having a calendar function (not shown). The calculation section is configured to read out a predetermined control program stored in the memory section and run the program to control the fuel cell system 100. The calculation section is configured to process data stored in the memory section and data input from the operation input section. Particularly, the calculation section also serves as the abnormality determiner 110a configured to determine whether or not abnormality which is followed by the shut-down of the fuel cell system 100 has occurred, based on an abnormality determination program which is read out from the memory section and data (physical amount) received from the detectors 131~140 as inputs. If the abnormality determiner 110a determines that the abnormality has occurred, a shut-down process of the fuel cell system 101 is performed as described later.

As used herein, the term "controller" encompasses not only a single controller but also a controller group in which a plurality of controllers cooperate to control the fuel cell system 100. Therefore, the controller 110 need not be constituted by a single controller but may be a plurality of controllers which are distributed and are configured to cooperate with each other to control the fuel cell system 100.

Although the abnormality determiner 110a determines whether or not there is an abnormality (abnormality has occurred), based on data (physical amount) received from the detectors 131~140 as inputs, the present invention is not limited to this. The detectors 131~140 may include calculators such as microcomputers to determine whether or not there is an abnormality based on the detected physical amounts (detect whether or not an abnormality ahs occurred).

The remote control device 120 includes a control section (not shown) constituted by a microcomputer, a communication section (not shown), a display section 120a and a key operation section 120b. The control section controls the communication section, and others. In the remote control device 120, the communication section receives a control signal and the control section processes the control signal and transmits it to the display section 120a. An operation signal is input with the key operation section 120b of the remote control device 120 and is sent to the controller 110 via the control section and the communication section of the remote control device 120 and is received in the communication section of the controller 110. Hereinafter, for easier explanation, it is assumed that signals are sent between the controller 110 and the remote control device 120 without communication between communication sections of the controller 110 and the remote control device 120 and processing in the control section in the remote control device 120.

[Operation of Fuel Cell System]

Next, a start-up process (start-up operation) of the fuel cell system 100 of Embodiment 2 will be described with reference to FIG. 2. Upon the user operating the remote control device 120, the controller 110 starts controlling the fuel cell system 100, to carry out the following operation.

Initially, at the start of the start-up process, the third on-off valve 74, the fifth on-off valve 76 and the sixth on-off valve 77 maintain their closed states so that the material gas and the oxidizing gas do not flow through the oxidizing gas supply path 46. The first switch 73 connects the first port 73a to the second port 73b and disconnects the third port 73c so that a fuel gas, carbon monoxide of which has not been sufficiently reduced is not supplied to the fuel gas passage 101a of the fuel cell 101. Then, the first on-off valve 71 opens, so that the material gas is supplied to the material gas supply path 41.

Then, the second on-off valve 72 opens. Thereby, the material gas is supplied to the burner 102a from the material gas supplier 112 to the burner 102a via a passage which is not shown so as to bypass the hydrogen generator 102. Combustion air is supplied from the combustion air supplier 117 to the burner 102a via the combustion air supply path 56. The burner 102a combusts the supplied material gas by the combustion air to generate a combustion exhaust gas. The generated combustion exhaust gas flows through a combustion exhaust gas path (not shown) provided within the hydrogen generator 102, heats the reformer, the shift converter and the purifier, and is thereafter exhausted to outside the fuel cell system 100 (package 111). In this case, the reformer, the shift converter and the purifier of the hydrogen generator 102 are heated by the heat transmitted from the combustion exhaust gas.

Then, the material gas is supplied from the material gas supplier 112 to the reformer of the hydrogen generator 102 via the material gas supply path 41, and the reforming water (condensed water) is supplied from the first condensed water tank 105A to the reformer via the reforming water supply path 57. The supplied water is heated to generate a steam. The material gas and the steam react with each other to generate a reformed gas containing hydrogen. The generated reformed gas flows through the shift converter and the purifier of the hydrogen generator 102, and is output from the hydrogen generator 102 as a fuel gas, carbon monoxide of which has been reduced. The output fuel gas is guided to the first fuel gas supply path 42a through the outlet of the purifier of the hydrogen generator 102.

The fuel gas which has been guided to the first fuel gas supply path 42a flows through the first fuel gas supply path 42a, the fuel cell bypass path 44 and the off-fuel-gas path 43 (to be precise, a portion of the off-fuel-gas path 43 which is downstream of a joint between the fuel cell bypass path 44 and the off-fuel-gas path 43) and is then supplied to the burner 102a. Upon the start of the supply of the fuel gas to the burner 102a, the direct supply of the material gas from the material gas supplier 112 to the burner 102a by bypassing the hydrogen generator 100 is stopped.

When the temperature detected by the temperature detector (not shown) attached to the reformer of the hydrogen generator 102 reaches a predetermined temperature (e.g., 500 degrees C.), the sixth on-off valve 77 and the ninth on-off valve 91 are opened, so that the material gas flows through the purge gas supply path 49 and the oxidizing gas supply path 46 (to be specific, a portion of the oxidizing gas supply path 46 which is downstream of the third on-off valve 74) and is supplied to the oxidizing gas passage 101b of the fuel cell 101, to purge hydrogen which has entered the oxidizing gas passage 101b from the fuel gas passage 10a via an electrolyte during a shut-down period of the fuel cell system 100 (cathode purge process in start-up process of the fuel cell system 100). By the cathode purge process, the exhausted cathode purge gas and material gas are supplied to the burner 10a via the cathode purge gas exhaust path 50 and is combusted therein. When the material gas which is more than an amount required to purge to the burner 102b, at least the gas sealed in the oxidizing gas passage 101b has been supplied, before the start of the cathode purge process, the sixth on-off valve 77 and the ninth on-off valve 81 are closed and the cathode purge gas process terminates.

When the temperature detector (not shown) attached to the reformer in the hydrogen generator 102, the temperature detector (not shown) attached to the shift converter in the hydrogen generator 102, and the temperature detector (not shown) attached to the purifier in the hydrogen generator 102 detect predetermined temperatures (e.g., the temperature of the reformer is 600~650 degrees C., the temperature of the shift converter is 200~250 degrees C., and the temperature of the purifier is 130~170 degrees C.), the start-up process of the fuel cell system 100 terminates and a power generation process (power generation operation) starts.

Next, the power generation process (power generation operation) of the fuel cell system 100 of Embodiment 1 will be described.

Initially, when the temperature detected by the temperature detector attached to the reformer in the hydrogen generator 102, the temperature detected by the temperature detector attached to the shift converter in the hydrogen generator 102, and the temperature detected by the temperature detector attached to the purifier in the hydrogen generator 102 reach the associated predetermined temperatures (e.g., the temperature of the reformer is a predetermined temperature in a range of 600~650 degrees C., the temperature of the shift converter is in a range of 200~250 degrees C., and the temperature of the purifier is in a range of 130~170 degrees C.), the controller 110 determines that carbon monoxide has been sufficiently reduced in the shift converter and the purifier and outputs a power generation start signal.

Thereupon, the third on-off valve 74, the fourth on-off valve 75 and the fifth on-off valve 76 are opened. In addition, the first switch 73 connects the first port 73a to the third port 73c, disconnects the second port 73b, and starts the operation of the oxidizing gas supplier 103.

Thereby, the fuel gas generated in the hydrogen generator 102 flows through the first fuel gas supply path 42a and the second fuel gas supply path 42b (i.e., fuel gas supply path 42) and is supplied to the fuel gas passage 101a of the fuel cell 101. The oxidizing gas is supplied from the oxidizing gas supplier 103 to the oxidizing gas passage 10b of the fuel cell 101 via the oxidizing gas supply path 46. In this case, the first flow detector 132 detects the flow rate of the fuel gas flowing through the second fuel gas supply path 42b and outputs the detected flow rate to the controller 110, while the second flow detector 134 detects the flow rate of oxidizing gas flowing through the oxidizing gas supply path 46 and outputs the detected flow rate to the controller 110.

The fuel gas supplied to the fuel gas passage 101a of the fuel cell 101 is supplied to the anode of each cell and the oxidizing gas supplied to the oxidizing gas passage 101b of the fuel cell 101 is supplied to the cathode of each cell. The fuel gas and the oxidizing gas electrochemically react with each other to generate water, electricity and heat. The generated electricity is supplied to a power load outside the fuel cell system 100 after a DC has been converted into an AC by the inverter 118.

An extra fuel gas remaining unconsumed in the fuel cell 101 is supplied as an off-gas to the off-fuel-gas path 43. A steam contained in the extra fuel gas supplied to the off-fuel-gas path 43 is condensed into water while flowing through the primary passage 114a of the first condenser 43. The extra fuel gas which has flowed through the first condenser 114 is supplied to the burner 102a as an off-gas and is combusted in the burner 102a as described above. The water separated in the first condenser 114 is supplied to the second condensed water tank 105B via the off-fuel-gas path 43.

An extra oxidizing gas remaining unconsumed in the electrochemical reaction in the fuel cell 101 is supplied to the off-oxidizing-gas path 47. A steam contained in the extra oxidizing gas supplied to the off-oxidizing-gas path 47 is condensed into water while flowing through the primary passage 115a of the second condenser 115. The extra oxidizing gas which has flowed through the second condenser 115 is finally exhausted outside the fuel cell system 100 via an exhaust outlet of the first condensed water tank 105A. The water separated in the second condenser 115 is supplied to the first condensed water tank 105A via the off-oxidizing-gas path 47.

Further, by operating the first pump 107, the cooling water is supplied from the cooling water tank 104 to the cooling water passage 101c of the fuel cell 101 via the cooling water path (to be precise, cooling water supply path 51). To be specific, the cooling water is supplied from the cooling water tank 104 to the primary passage 106a of the heat exchanger 106 via the cooling water supply path 51. The cooling water which has been supplied to the primary passage 106a of the heat exchanger 106, exchanges heat with the hot water flowing through the secondary passage 106b of the heat exchanger 106, and is thereby cooled while flowing through the primary passage 106a of the heat exchanger 106. The cooling water which has been cooled is supplied to the cooling water passage 101c of the fuel cell 101 via the cooling water supply path 51. The cooling water which has been supplied to the cooling water passage 101c recovers heat generated in the fuel cell 101 to cool the fuel cell 101. The cooling water which has recovered exhaust heat from the fuel cell 101 is supplied to the cooling water tank 104 via the cooling water discharge path 52.

The hot water supplied from the lower portion (herein, lower end surface) of the hot water tank 109 to the hot water path 55 exchanges heat with the extra fuel gas and the extra oxidizing gas flowing through the primary passage 114a of the first condenser 114 and the primary passage 115a of the second condenser 115, respectively, and thereby is heated, while flowing through the secondary passage 114b of the first condenser 114 and the secondary passage 115ab of the second condenser 115. The heated hot water is supplied to the secondary passage 106b of the heat exchanger 106 and exchanges heat with the cooling water flowing through the primary passage 106a of the heat exchanger 106 and is further heated while flowing through the secondary passage 106b of the heat exchanger 106. The heated hot water is supplied to the upper portion of the hot water tank 109 via the hot water path 55 and then is supplied to the heat load via the hot water supply path 54.

Next, a normal shut-down process (shut-down operation) of the fuel cell system 100 according to Embodiment 2 will be described. As used herein, the normal shut-down process refers to a shut-down process which is different from a shut-down process (abnormal shut-down process) performed when the abnormality detector detects an abnormality during the power generation operation of the fuel cell system 100. For example, the normal shut-down process refers to a shut-down process which is performed when a power demand of a power load has decreased to a value which is not more than a predetermined threshold at which a power generation operation is unnecessary, a shut-down process performed at a preset shut-down time, etc.

In the present invention, the shut-down process (shut-down operation) is defined as an operation performed from when the controller 110 outputs a shut-down command until the fuel cell system 100 has terminated the shut-down process. After the fuel cell system 100 terminates the shut-down process, the controller 110 is operating and the components other than the controller 110 are in a stopped state. If a start-up request is generated, the controller 110 outputs a start-up command, and the fuel cell system 100 quickly shifts to a stand-by mode in which the fuel cell system 100 can start the start-up process.

The controller 110 outputs a shut-down command, when the user operates a shut-down button attached on the remote control device 120 to enter a shut-down command, or the power demand of the power load reaches a value which is not more than a predetermined threshold (a power demand of a load power which is detected by a load power detector (not shown) reaches a value which is not more than a predetermined threshold). The shut-down of power generation of the fuel cell 101 is performed in such a manner that the output of the inverter 118 is set to zero, and an electric path at an exit side of the inverter 118 is electrically disconnected.

Figure 4A:
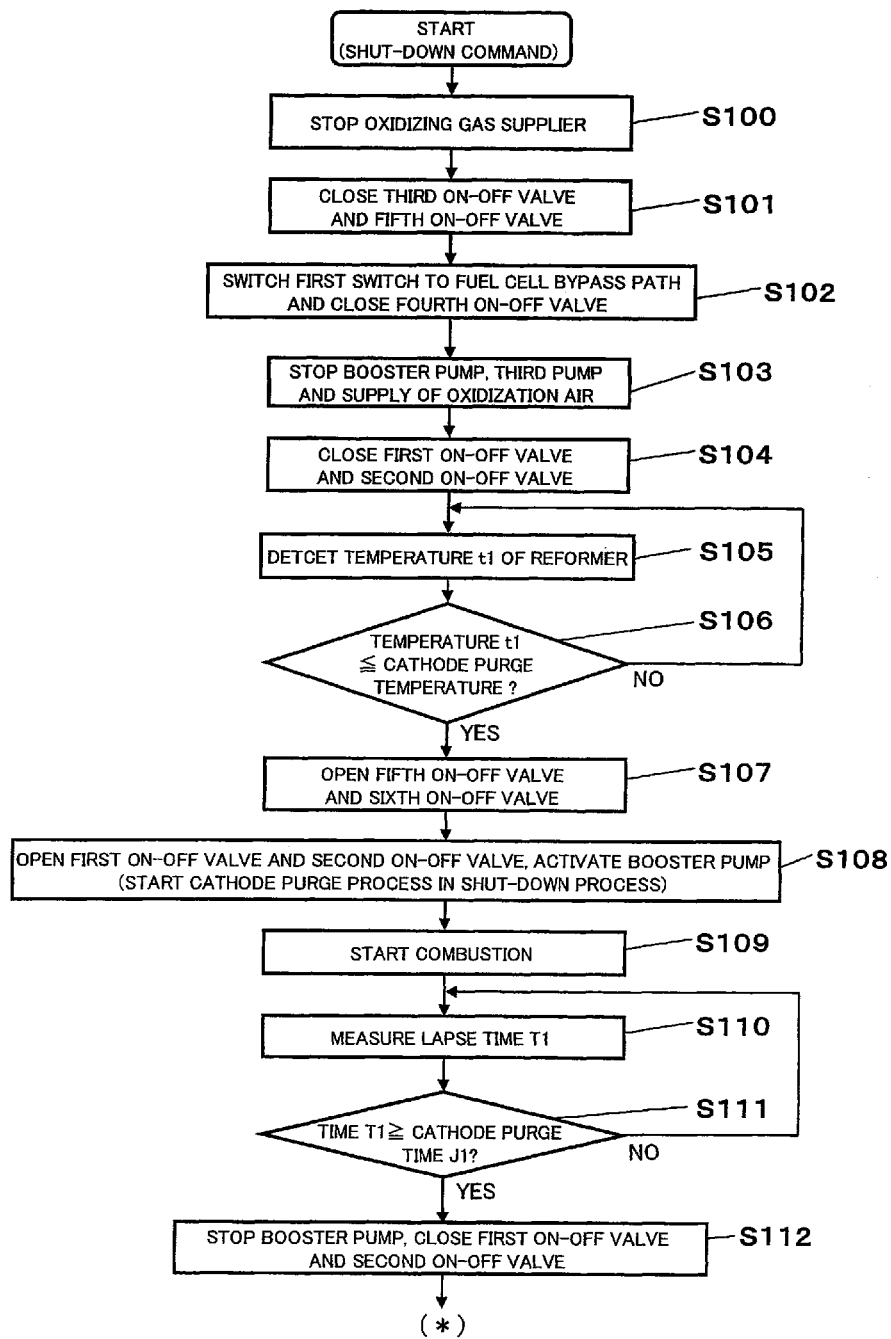
FIG. 4A is a flowchart showing a main operation of a normal shut-down process in a fuel cell system according to Embodiment 2 of the present invention.
Figure 4B:
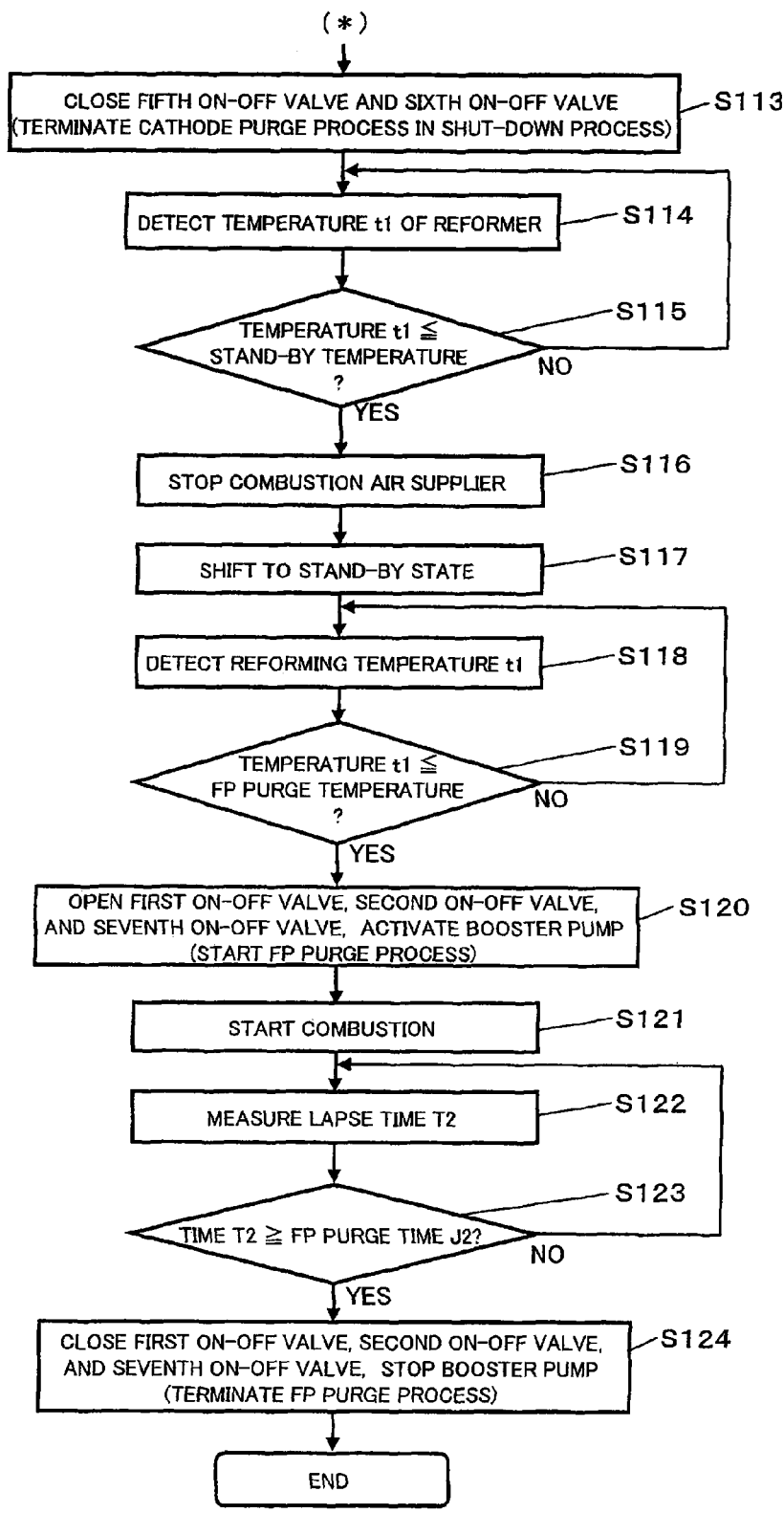
FIG. 4B is a flowchart showing a main operation of the normal shut-down process in the fuel cell system according to Embodiment 2 of the present invention.
Figure 5:
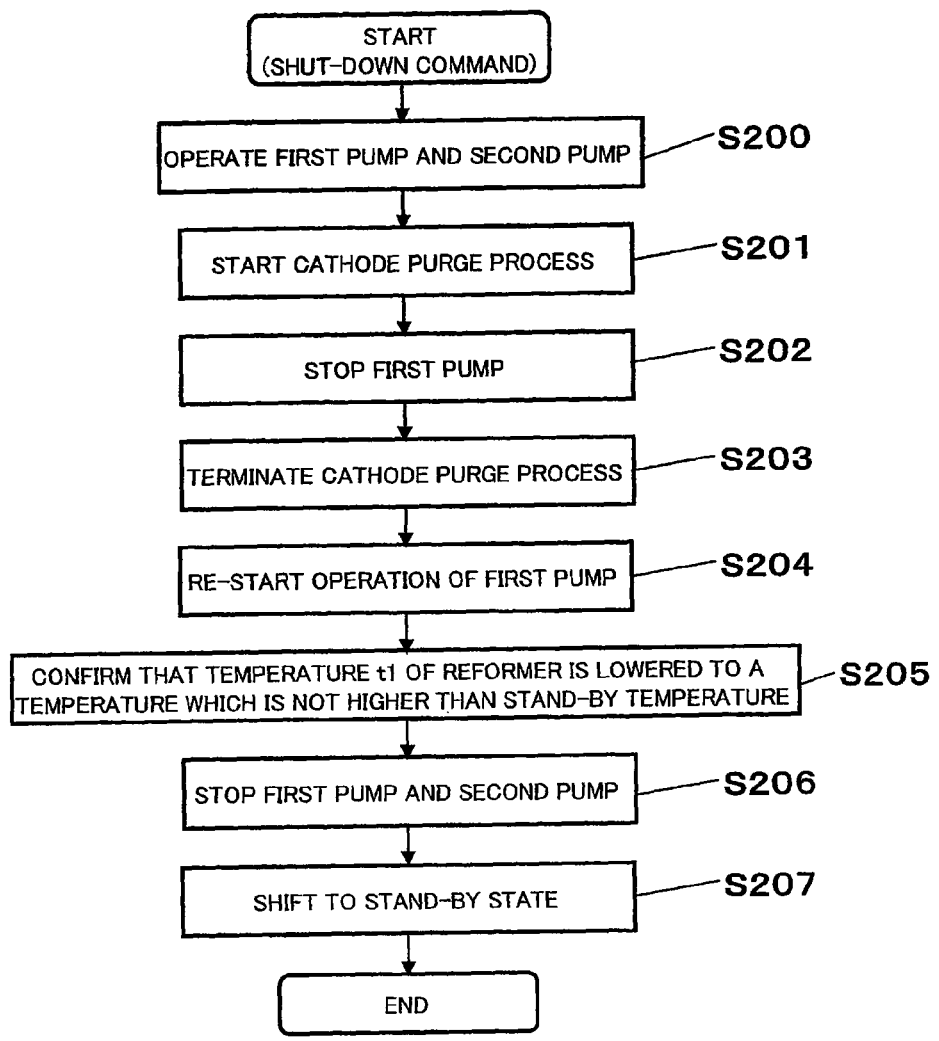
FIG. 5 is a flowchart showing an exhaust heat recovery operation of the fuel cell in the normal shut-down process of the fuel cell system according to Embodiment 2 of the present invention.

Hereinafter, the normal shut-down process (shut-down operation) of the fuel cell system 100 according to Embodiment 2 will be described with reference to FIGS. 4A and 4B and FIG. 5. FIG. 4A is a flowchart showing a main operation of a normal shut-down process in a fuel cell system according to Embodiment 2 of the present invention. FIG. 4B is a flowchart showing a main operation of the normal shut-down process in the fuel cell system according to Embodiment 2 of the present invention. FIG. 5 is a flowchart showing an exhaust heat recovery operation of the fuel cell in the normal shut-down process of the fuel cell system according to Embodiment 2 of the present invention.

As shown in FIG. 4A, initially, the operation of the oxidizing gas supplier 103 is stopped and the supply of the oxidizing gas to the oxidizing gas passage 101b is stopped (step S100). And, the third on-off valve 74 and the fifth on-off valve 76 are closed and the oxidizing gas passage 101b of the fuel cell 101 is disconnected from outside (step S101).

The first switch 73 connects the first port 73a to the second port 73b and disconnects the third port 73c, and the fourth on-off valve 75 is closed (step S102). Thereby, the fuel gas is confined in a passage between the third port 73c of the first switch 73 and the fourth on-off valve 75, i.e., a passage including the second fuel gas supply path 42, the fuel gas passage 101a of the fuel cell 101 and a portion of the off-fuel-gas path 43 extending to the fourth on-off valve 75, so that entry of air or the like from outside into the fuel gas passage 101a is suppressed and degradation of the anode is suppressed.

The booster pump 112a, the third pump 113 and the oxidization air supplier 116 are stopped, and the supply of the material gas, reforming water and oxidization air to the hydrogen generator 102 is stopped (step S103). The first on-off valve 71 and the second on-off valve 72 are closed (step S104).

Thereby, the supply of the material gas, the reforming water and the oxidization air to the hydrogen generator 102 is stopped, and the supply of the fuel gas from the hydrogen generator 102 to the fuel gas passage 101a of the fuel cell 101 is stopped. Concurrently, the supply of the off-gas from the fuel cell 101 to the burner 102a is stopped and combustion in the burner 102a is stopped. The combustion in the burner 102a is stopped in such a manner that after extinguishment of a flame, an operation for exhausting a gas remaining in a combustion space of the burner 102a outside the housing 111 by the air supplied from the combustion air supplier 117 is carried out, thereby terminating a combustion stop process in the burner 102a. Through the above series of operation, the supply of the fuel gas and the supply of the oxidizing gas to the fuel cell 101 are stopped, and therefore power generation is stopped. After the stop of combustion in the burner 102a, the hydrogen generator 102 (reformer 16) is cooled by the air supplied to the combustion air supplier 117, and the temperature of the hydrogen generator 102 decreases with time.

Then, when the temperature detected by the temperature detector (not shown) attached to the reformer (not shown) of the hydrogen generator 102 (step S105) reaches a temperature which is not higher than a cathode purge temperature (Yes in step S106), the fifth on-off valve 76, the sixth on-off valve 77 and the ninth on-off valve 81 are opened (step S107), the first on-off valve 71 and the second on-off valve 72 are opened, and the operation of the booster pump 112a starts (start of a cathode purge process in the shut-down process of the fuel cell system 100) (step S108). The cathode purge temperature is defined as a temperature (e.g., 600 degrees C.) which is lower than a heat resistance temperature of a catalyst used in the reformer in view of addition of a temperature increase in the hydrogen generator 102 in the cathode purge process in the shut-down process. At the start of the cathode purge process of the shut-down process, the material gas and the steam sealed in the inner space just after the shut-down, remain in the interior of the reformer of the hydrogen generator 102. Therefore, there is a small chance of deposition of carbon from a raw material during the cathode purge process in the shut-down process.

Thereby, the material gas (purge gas) is supplied from the material gas supply path 41 to the oxidizing gas passage 101*b* of the fuel cell 101, via the purge gas supply path 49 and then the oxidizing gas supply path 46 (to be precise a portion of the oxidizing gas supply path 46 which is downstream of a joint where the purge gas supply path 49 is joined to the oxidizing gas supply path 46). The oxidizing gas staying in the oxidizing gas passage 101*b* is purged by the purge gas and is supplied to the burner 102*a* via the off-oxidizing-gas path 47 (to be precise, a portion of the oxidizing gas path 47 which is upstream of the fifth on-off valve 76), and the cathode purge gas exhaust passage 50. The oxidizing gas and material gas supplied to the burner 102*a* are combusted in the burner 102*a* (step S109).

Then, a time T1 which lapses from when the cathode purge process in the shut-down process starts is measured (step S110), and when the lapse time T1 reaches a time which is not less than a cathode purge time J1 (Yes in step S111), the booster pump 112*a* is stopped, the first on-off valve 71 and the second on-off valve 72 are closed (step S112), and the fifth on-off valve 76, the sixth on-off valve 77 and the ninth on-off valve 81 are closed (cathode purge process of the shut-down process of the fuel cell system 100 terminates) (step S113). The cathode purge time is defined as a time required to exhaust the oxidizing gas in the oxidizing gas passage 101*b* of the fuel cell 101, at least from the oxidizing gas passage 101*b*.

Thereby, a purge gas is confined in a closed passage defined by the third on-off valve 74, the sixth on-off valve 77, the fifth on-off valve 76 and the ninth on-off valve 81, i.e., a path from a portion of the purge gas supply path 49 which is downstream of the sixth on-off valve 77, a portion of the oxidizing gas supply path 46 which is downstream of the third on-off valve 74, the oxidizing gas passage 101*b*, a portion of the off-oxidizing-gas path 47 extending to the fifth on-off valve 76, and a portion of the cathode purge gas exhaust path 50 extending to the ninth on-off valve 81 (hereinafter referred to as a purge gas seal passage), so that entry of air or the like from outside to the oxidizing gas passage 101*b* is suppressed.

Then, during the above cooling operation after the cathode purge process in the shut-down process of the fuel cell system 100 terminates, the temperature detector attached to the reformer of the hydrogen generator 102 detects a temperature t1 of the reformer again (step S114). When the detected temperature is not higher than a stand-by temperature (e.g., 500 degrees C.) (Yes in step S115), the combustion air supplier 117 stops the supply of the combustion air to the burner 102*a* (step S116). It should be noted that the stand-by temperature is a temperature at which the fuel cell system 100 can shift to a stand-by mode, and is defined as, for example, an upper limit temperature at which no carbon is deposited even if only the material gas is supplied to the hydrogen generator 102.

In the shut-down process of the fuel cell system 100, a predetermined cooling operation (exhaust heat recovery operation) is performed in a cooling system of the fuel cell 101 concurrently with the above series of shut-down process. To be specific, as shown in FIG. 5, after shut-down of the power generation in the fuel cell 101, the first pump 107 and the second pump 108 are operated (step S200), and the hot water exchanges heat with the cooling water in the heat exchanger 106 to recover extra heat held in the fuel cell 101.

When the temperature detected by the temperature detector attached to the reformer reaches a temperature which is not higher than the cathode purge temperature and the cathode purge process in the shut-down process starts (step S201), the controller 110 stops the operation of the first pump 107 (step S202). When the cathode purge process in the shut-down process terminates (step S203), the controller 110 re-starts the operation of the first pump 107 (step 204), confirms whether or not the temperature t1 of the reformer has decreased to the temperature which is not higher than the stand-by temperature in step S115 of FIG. 4B (step S205), and stops the operation of the first pump 107 and the operation of the second pump 108 when the combustion air supplier 117 stops the cooling operation of the hydrogen generator 108 in step S116 of FIG. 4B (step S206).

When the cooling operation for cooling the hydrogen generator 102 to the stand-by temperature and the cooling operation of the fuel cell performed in association with this cooling operation terminate, the fuel cell system 100 shifts to the stand-by mode (step S117 in FIG. 4A and step S207 in FIG. 4B). The stand-by mode refers to a state in which the fuel cell system is awaiting next start of operation of the fuel cell system, and is defined as, for example, a state in which the fuel cell system is ready to perform a next start-up process in response to a start-up command output from the controller 110 when a predetermined start-up request is generated. Examples of the start-up request may include the fact that the power demand of the power load is not lower than the power generation output of the fuel cell system, or that the user operates the key operation section 120*b* of the remote control device 120 to make a power generation request.

In the stand-by mode, the hydrogen generator 102 is naturally cooled because the combustion air supplier 117 is in a stopped state. During this time, the temperature detector attached to the reformer of the hydrogen generator 102 detects the temperature t1 of the reformer again as shown in FIG. 4A (step S118). When the detected temperature t1 reaches a temperature which is not higher than a FP purge temperature (e.g., 300 degrees C.) which is lower than the stand-by temperature (step S119), the first on-off valve 71, the second on-off valve 72, and the seventh on-off valve 78 are opened and the booster pump 112*a* is activated (FP (Fuel processor) purge process for the hydrogen generator 102) (step S120). Thereby, the material gas (purge gas) is supplied from the material gas supplier 112 to the hydrogen generator 102, purges a gas such as steam remaining in reactors such as the reformer provided within the hydrogen generator 102, and exhausts the gas from the hydrogen generator 102 to the burner 102*a*. The gas exhausted to the burner 102*a* is combusted therein (step S121). This FP purge process can suppress the steam from condensing into water which would degrade catalysts such as a reforming catalyst. The second purge temperature is defined as a temperature at which no carbon is deposited from the material gas within the reformer in view of addition of a temperature increase in the reformer, which results from the combustion operation in the burner 102*a* in the FP purge process for the hydrogen generator 102.

A time T2 which lapses from the FP process starts is measured (step S122). When the lapse time T2 reaches a time which is not less than a FP purge time J2 (step S123), the booster pump 112*a* is stopped, and the first on-off valve 71, the second on-off valve 72 and the seventh on-off valve 78 are closed (FP purge process terminates) (step S124). The FP purge time is defined as a time required to purge the steam from at least the hydrogen generator 102.

Thus, in the case where the fuel cell system 100 according to Embodiment 2 shifts to the shut-down operation in a normal state, the fuel cell system 100 is configured to execute a shut-down process (e.g., cathode purge process in the shut-down process of the fuel cell system 100) which protects at least the function of the fuel cell system 100, and quickly shift to the stand-by mode. In addition, the fuel cell system 100 is configured to execute the minimum and necessary cooling operation such as the exhaust heat recovery operation, until the hydrogen generator 102 reaches a temperature condition in which the hydrogen generator 102 can re-start-up (i.e., the temperature of the reformer reaches the temperature which is not higher than the stand-by temperature). Therefore, the fuel cell system 100 can shift to the stand-by mode quickly. Also, in the next start-up process, the temperatures of the components such as the fuel cell 101 are higher than ambient temperature (outside temperature) depending on the time which lapses from when the fuel cell system 100 shifts to the stand-by mode, an energy required to raise the temperature of the fuel cell 101 is reduced, a time required for the start-up process is reduced, and the start-up of the system is further facilitated.

In the shut-down process of the fuel cell system 100 of Embodiment 2, the cooling operation of the hydrogen generator 102 (reformer), the FP purge process, the cathode purge process of the fuel cell 101, and the exhaust heat recovery operation of the fuel cell 101 are performed, but the present invention is not limited to this. For example, at least one of the cooling operation of the hydrogen generator 102 (reformer), the FP purge process, the cathode purge process of the fuel cell 101, and the exhaust heat recovery operation of the fuel cell 101 may be omitted, or otherwise, the cooling operation of the hydrogen generator 102 (reformer) and the exhaust heat recovery operation of the fuel cell 101 may be stopped at timings which are different from the timings in the above described flow.

Next, a step of detecting an abnormality based on the detected values of the detectors 131~140 of the fuel cell system 100 according to Embodiment 2 and the following shut-down process (hereinafter referred to as abnormality detection/shut-down process) will be described.

Initially, in particular, the abnormality which is followed by the shut-down of the operation of the fuel cell system 100, among the abnormalities detected by the abnormality detector in the fuel cell system 100 according to Embodiment 2, will be described with reference to FIG. 6. FIG. 6 is a table showing examples of abnormality which is followed by the shut-down of the operation of the fuel cell system 100 of the present invention.

In the present invention, the abnormality which is followed by the shut-down of the operation of the fuel cell system 100 is defined to include a first abnormality and a second abnormality. In other words, the abnormality which is followed by the shut-down of the operation of the fuel cell system 100 may be defined to include abnormalities other than the first abnormality and the second abnormality.

As used herein, the first abnormality refers to an abnormality in a case where a predetermined shut-down process corresponding to the abnormality detected by each of the detectors 131~140 is performed, and the fuel cell system shifts to the stand-by mode without a maintenance operator's maintenance operation.

As used herein, the second abnormality refers to an abnormality in a case where a predetermined shut-down process corresponding to the abnormality determined by the abnormality determiner 110*a* based on the detected values of the detectors 131~140 is performed, and the fuel cell system cannot shift to the stand-by mode unless the maintenance operator performs the maintenance operation. In other words, the second abnormality refers to an abnormality occurring in a case where, even if the shut-down process terminates after the abnormality is detected by each of the detectors 131~140, the start-up is not permitted, the controller 110 does not output a start-up command irrespective of a start-up request, and therefore, the fuel cell system does not start the start-up process, unless the maintenance operator performs the maintenance operation. As used herein, the maintenance operation refers to an operation in which the maintenance operator comes to a place where the fuel cell system 100 is installed and performs an abnormality restoration operation or repair of the fuel cell system 100.

As shown in FIG. 6, in this embodiment, the first abnormality is a cooling water temperature abnormality and a first pump abnormality. It should be noted that these abnormalities are merely exemplary and a part of these abnormalities may be the first abnormality, or otherwise abnormalities other than these abnormalities may be the first abnormality.

The cooling water temperature abnormality refers to an abnormality in a case where the temperature detector (in this embodiment, temperature detector 137 configured to detect a temperature of cooling water discharged from the downstream end of the cooling water passage 101*c* to the cooling water discharge path 52) detects the temperature of the cooling water supplied from the cooling water supply path 51 to the upstream end of the cooling water passage 101*c* of the fuel cell 101 or the temperature of cooling water discharged from the downstream end of the cooling water passage 101*c* to the cooling water discharge path 52, and the detected temperature is a temperature having increased or decreased excessively.

The first pump abnormality refers to a fact that the first pump 107 is not operating correctly. For example, in a case where trash enters the first pump 107, the first pump 107 is operating with an operation amount lower limit of the first pump 107 or lower but a rotation detector (not shown) configured to detect the operation of the first pump 107 does not output a pulse output associated with the rotation or reciprocation of the pump for a predetermined time, i.e., does not detect the operation of the pump for the predetermined time, the controller 110 outputs a signal for increasing the operation amount of the first pump 107. If a pulse is not output even though this signal is supplied to the first pump 107, the controller 110 determines that there is an abnormality in the first pump 107 and determines it as the abnormality followed by the shut-down of the operation of the fuel cell system 100. The reason why this abnormality is regarded as the first abnormality is that this abnormality is not a fatal abnormality which requires a maintenance operation for replacing the first pump 107 or the like but may possibly be an abnormality which can be restored by performing a predetermined restoration process for trash or the like. It should be noted that if, for example, the same first abnormality is detected several times (e.g., three times)/per week or twice in succession, the controller 110 may determine in some cases that this abnormality is the second abnormality.

As shown in FIG. 6, in this embodiment, the second abnormality includes abnormalities of components (e.g., failure of a cooling water tank water level detector, failure of a condensed water tank water level detector, failure of a flow detector, failure of the temperature detector attached to the cooling water path, failure of a voltage transducer, failure of a ventilation fan), gas leakage abnormalities (e.g., gas leakage abnormality of a fuel gas passage, gas leakage abnormality of an oxidizing gas passage, combustible gas leakage abnormality), and a temperature increase abnormality of the controller. It should be noted that these abnormalities are merely exemplary and a part of these abnormalities may be the second abnormality, or otherwise abnormalities other than these abnormalities may be the second abnormality.

The abnormality with which the failure of the cooling water tank water level detector is assumed is, for example, an abnormality in a case where the water level of the cooling water tank 104 which is detected by the water level detector 136 does not reach a value which is not more than a predetermined threshold after a lapse of an abnormality determination time, even though water is drained from the cooling water tank 104. This abnormality may possibly occur if a float of a float-type water level sensor is fixed at the upper side. Therefore, the controller 110 determines this abnormality is an abnormality with which failure of the water level detector 135 is assumed and determines this abnormality as the second abnormality.

The abnormality with which the failure of the condensed water tank water level detector is assumed is, for example, an abnormality in a case where the water level of the condensed water tank 105A which is detected by the water level detector 135 does not reach a value which is not more than a predetermined threshold after a lapse of an abnormality determination time, even though water is drained from the condensed water tank 105A. This abnormality may possibly occur if a float of a float-type water level sensor is fixed at the upper side. Therefore, the controller 110 determines this abnormality is an abnormality with which failure of the water level detector 136 is assumed and determines this abnormality as the second abnormality.

Examples of the abnormality with which failure of the flow detector is assumed are an abnormality in which the flow rate of the oxidizing gas which is detected by the second flow detector 134 is outside an allowable range (e.g., a predetermined threshold or lower) with respect to the operation amount of the oxidizing gas supplier 103 and an abnormality in which the flow rate detected by the third flow detector 138 is outside an allowable range (e.g., a predetermined threshold or lower) with respect to the operation amount of the first pump 107. This abnormality may possibly occur when the flow detector is clogged with trash. Therefore, the controller 110 determines this abnormality as the abnormality with which failure of the flow detector is assumed and determines this abnormality as second abnormality.

The abnormality with which the failure of the voltage transducer (inverter 118) is assumed, is, for example, an abnormality in a case where the temperature of a control board or the like of the controller 110 which is detected by the temperature detector 139 is outside an allowable range (e.g., predetermined threshold or higher). This abnormality may possibly occur when a short-circuit occurs within a circuit of the voltage transducer. The controller H0 determines this abnormality as the abnormality with which failure of the voltage transducer is assumed and determines this abnormality as the second abnormality.

The abnormality with which the failure of the temperature detector attached to the cooling water path is assumed is, for example, an abnormality in a case where detected values indicate a short-circuit or disconnection, when the temperature detectors 137 and 141 are thermisters. The controller 110 determines this abnormality as the second abnormality.

The gas leakage abnormality of the fuel gas passage is, for example, an abnormality in a case where, in a state where the third port 73c of the first switch 73 and the fourth on-off valve 75 are closed, and the fuel gas is sealed in the second fuel gas supply path 42b, the fuel gas passage 101a, and the off-fuel gas path 43 from when the shut-down process of the fuel cell system 100 has been performed until power generation of the fuel cell system 100 starts, the pressure in the sealed fuel gas path which is detected by the first pressure detector 131 is a predetermined threshold or lower. This abnormality may possibly occur when, for example, the fuel cell 101 is damaged and the fuel gas leaks from the fuel gas passage 101a, or the first switch 73 and/or the fourth on-off valve 75 is/are damaged and cannot seal the fuel gas. In these cases, it is difficult to continue the operation even when the operation of the fuel cell system 100 re-starts after the shut-down of the fuel cell system 100. Therefore, the controller 110 determines this abnormality as the second abnormality.

The gas leakage abnormality of the oxidizing gas passage is, for example, an abnormality in a case where, in a state where the third on-off valve 74 and the fifth on-off valve 76 are closed and the material gas is confined in the purge gas passage from when the shut-down process of the fuel cell system 100 has been performed until power generation of the fuel cell system 100 starts, the pressure in the sealed oxidizing gas path which is detected by the second pressure detector 133 is a value which is not more than a predetermined threshold. This abnormality may possibly occur when, for example, the fuel cell 101 is damaged and the material gas leaks from the oxidizing gas passage 101b, or the third on-off 74 and/or the fifth on-off valve 76 is/are damaged and cannot seal the material gas. In these cases, it is difficult to continue the operation even when the operation of the fuel cell system 100 re-starts after the shut-down of the fuel cell system 100. Therefore, the controller 110 determines this abnormality as the second abnormality.

The combustible gas concentration abnormality refers to an abnormality in a case where the combustible gas sensor 140 detects the combustible gas. For example, the combustible gas concentration abnormality occurs when the combustible gas leaks in the fuel cell system 100 (package 111) and the combustible gas sensor 140 detects the combustible gas. Therefore, the controller 110 determines this abnormality as the second abnormality.

The abnormality with which the failure of the ventilation fan is assumed is, for example, abnormality that after the controller 110 outputs an operation start signal of the ventilation fan 119, a rotation detector (not shown) for detecting the rotation number of the ventilation fan 116 cannot detect the rotation for a predetermined time or longer. This abnormality may possibly occur when the ventilation fan 119 is clogged with trash. The controller 110 determines this abnormality as the failure of the ventilation fan 119 and determines this abnormality as the second abnormality.

The temperature increase abnormality of the controller 110 is, for example, an abnormality that the temperature of the control board or the like of the controller 110 which is detected by the temperature detector 139 is outside an allowable range (e.g., a predetermined threshold or lower). The controller 110 determines this abnormality as the second abnormality.

Figure 7:
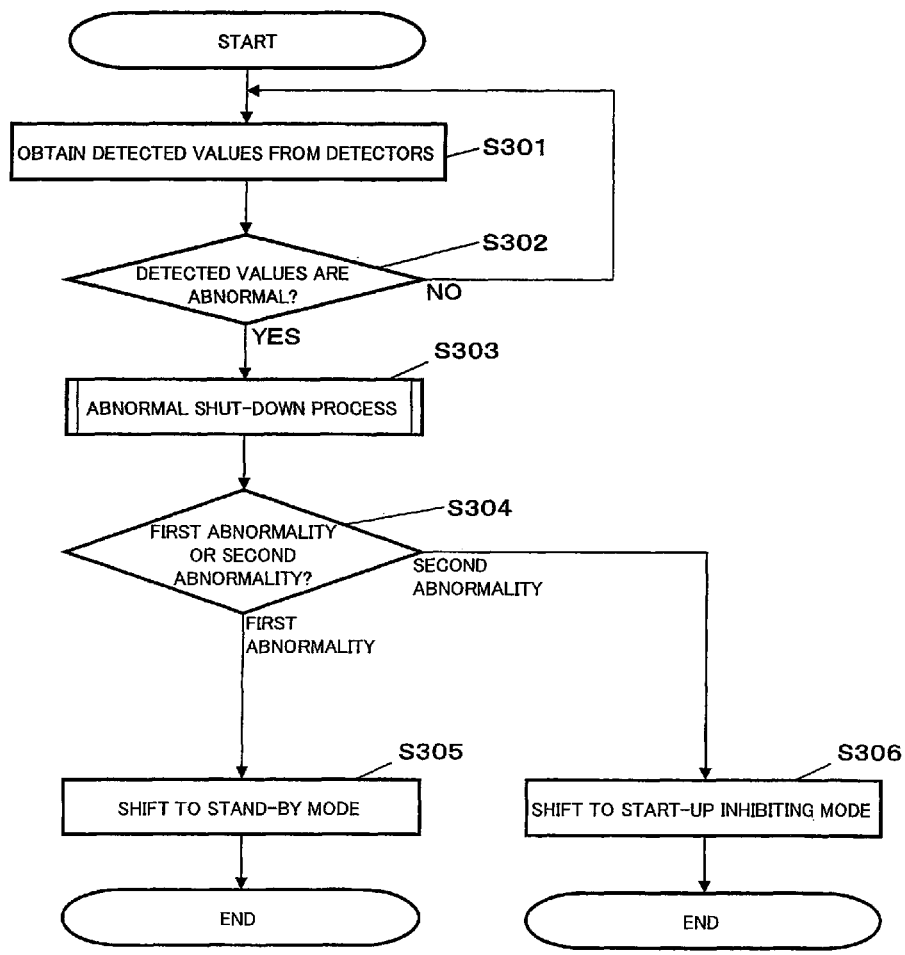
FIG. 7 is a flowchart schematically showing a content of a shut-down process program stored in a memory section of a controller in the fuel cell system of FIG. 2, which is associated with abnormality detection.

For the failure of each detector among the above illustrated abnormalities, the abnormality determiner 110 operates as the abnormality detector of the present invention, while the abnormalities different from the failures of the detectors, the abnormality determiner 110a and the detectors configured to output detected values used to determine the abnormalities operate as the abnormality detector of the present invention Next, the abnormality detection of the fuel cell system 100 of Embodiment 2 and the following abnormal shut-down process will be described with reference to FIG. 7.

FIG. 7 is a flowchart schematically showing a content of a shut-down process program stored in a memory section of the controller 110 in the fuel cell system 100 of FIG. 2, which is associated with the abnormality detection.

Initially, during the power generation operation of the fuel cell system 100, the calculation section of the controller 110 obtains the detected values from the detectors 131~140 (step S301) and determines whether or not the detected values obtained in step S301 are abnormal (step S302). If it is determined that the detected values are not abnormal, the process returns to step S301, and step S301 and step S302 are repeated to monitor the presence/absence of abnormality unless any abnormality is detected. On the other hand, if it is determined that any one of the detected values is abnormal, the process goes to step S303.

In step S303, the shut-down process (hereinafter referred to as abnormal shut-down process) corresponding to the abnormality determined by the abnormality determiner 110*a* is carried out under control of the controller 110. After the shut-down process terminates, the process goes to step S304.

In step S304, if the abnormality determined by the abnormality determiner 110*a* is the first abnormality, the process goes to step S305, whereas if the abnormality determined by the abnormality determiner 110*a* is the second abnormality, the process goes to step S306.

In step S305, the hydrogen generator 102 shifts to the stand-by mode when the abnormal shut-down process terminates, and the program ends. On the other hand, in step S306, the fuel cell system 100 shifts to a start-up inhibiting mode in which the start-up is not permitted even if a start-up request is generated, and the program ends. The same abnormal shut-down process is not performed for each abnormality but a predetermined restoration process corresponding to each abnormality is carried out. It should be noted that the cooling operation common to the respective abnormalities (cooling operation of the hydrogen generator 102, exhaust heat recovery operation of the fuel cell 101, etc) is carried out.

Figure 8:
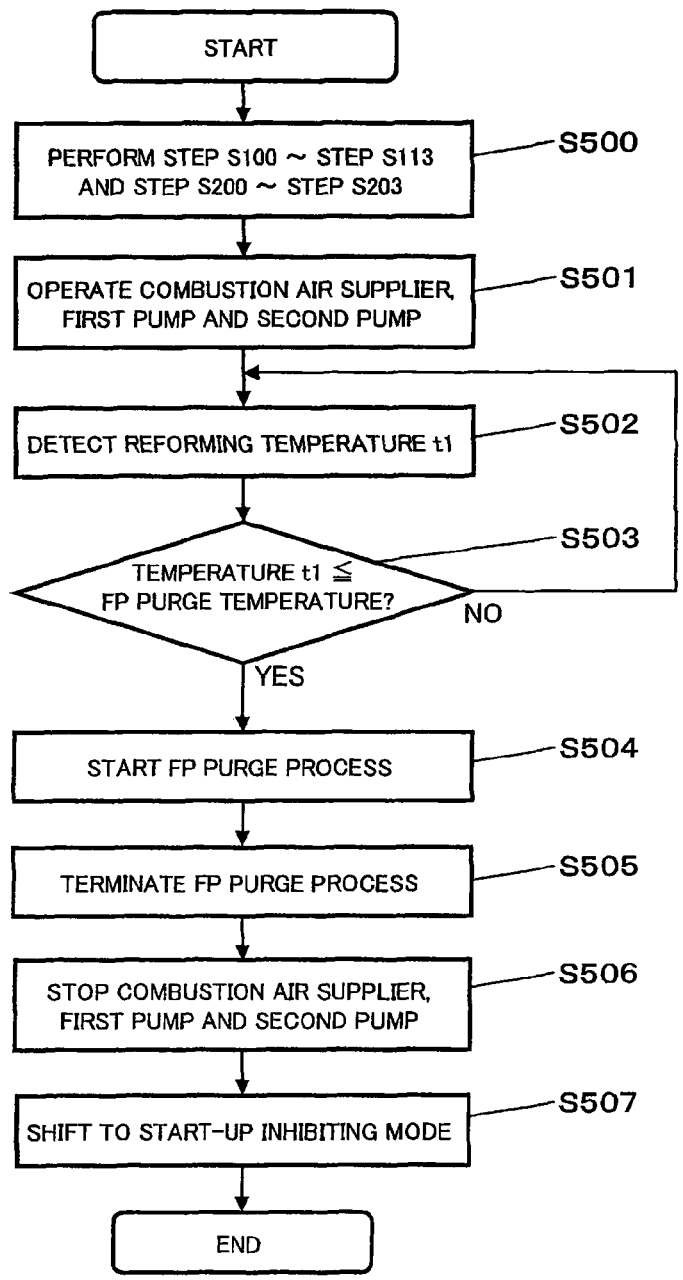
FIG. 8 is a flowchart showing in more detail the abnormal shut-down process in the flowchart of the shut-down process program of FIG. 7, which is associated with abnormality detection.

Now, the abnormal shut-down process in a case where the failure of the temperature detector 137 occurs, which is an example of the abnormality which is followed by the shut-down of the fuel cell system 100, will be described with reference to FIG. 8. FIG. 8 is a flowchart showing in detail the abnormal shut-down process in the flowchart of the shut-down process program of FIG. 7, which is associated with the abnormality detection. Although the failure of the temperature detector 137 belongs to the second abnormality, the following abnormal shut-down process is carried out in such a manner that the exhaust heat recovery operation of the fuel cell 101 and the cooling operation of the hydrogen generator 102 are performed in the same manner when an abnormality which requires the shut-down of the power generation operation of the fuel cell 101 is detected as well as when the second abnormality is detected. In other words, the exhaust heat recovery operation of the fuel cell 101 and the cooling operation of the hydrogen generator 102 are performed in the same manner when the first abnormality is detected.

As shown in FIG. 8, when the detected value of the temperature detector 137 is the value indicating the shot-circuit or disconnection and the abnormality determiner 110*a* determines that this is the abnormality which is followed by the shut-down of the fuel cell system 100, a shut-down operation similar to that in the normal shut-down process is performed until the cathode purge process in the normal shut-down process terminates (stepA100~step S113 in FIG. 4A and step S200~step S203 in FIG. 4B) (step S500). Thereafter, after the temperature t1 of the reformer reaches the temperature which is not higher than the stand-by temperature because of the cooling operation of the hydrogen generator 102 by the combustion air supplier 117, the operation of the combustion air supplier 117, the operation of the first pump 107 and the operation of the second pump 108 continue, and the cooling operation of the hydrogen generator 102 and the exhaust heat recovery operation of the fuel cell 101 continue (step S501).

The temperature t1 of the reformer is detected by the temperature detector attached to the reformer in the above cooling operation (step S502). When the detected temperature t1 of the temperature detector reaches a temperature which is not higher than a FP purge temperature (step S503), a FP purge process similar to that in the normal shut-down process is performed (step S504). That is, step S120~step S124 shown in FIG. 4B are performed. Thereafter, when the FP purge process terminates (step S505), the controller 110 stops the operation of the combustion air supplier 117, the operation of the first pump 107 and the operation of the second pump 108 (stop of the cooling operation of the hydrogen generator 102 and stop of the cooling operation of the fuel cell 101) (step S506), and causes the fuel cell system 100 to shift to the start-up inhibiting mode (step S507). The phrase "the fuel cell system 100 shifts to the start-up inhibiting mode" means that the calculation section of the controller 110 places the fuel cell system 100 in a state where the fuel cell system 100 does not perform the start-up process, even if the user operates the remote control device 120 to start the start-up of the fuel cell system 100. In Embodiment 2, the controller 110 is configured not to permit the fuel cell system 100 to perform the start-up process, even when the user operates the key operation section 120*b* of the remote control device 120 to send a start-up command to the communication section of the controller 110, in the case where each of the detectors 131~140 detects the abnormality which is followed by the shut-down of the fuel cell system 100.

Although in Embodiment 2, the cathode purge process or the FP purge process is performed in the abnormal shut-down process, it is desired that these purge processes are not performed, because the material gas which is the combustible gas may dangerously leaks in the package 111 of the fuel cell system 100 during the purge process, if the abnormality detected by the abnormality determiner 110*a* is a gas leakage abnormality (e.g., gas leakage abnormality of the fuel gas passage, gas leakage abnormality of the oxidizing gas passage, combustible gas leakage abnormality).

Figure 9:
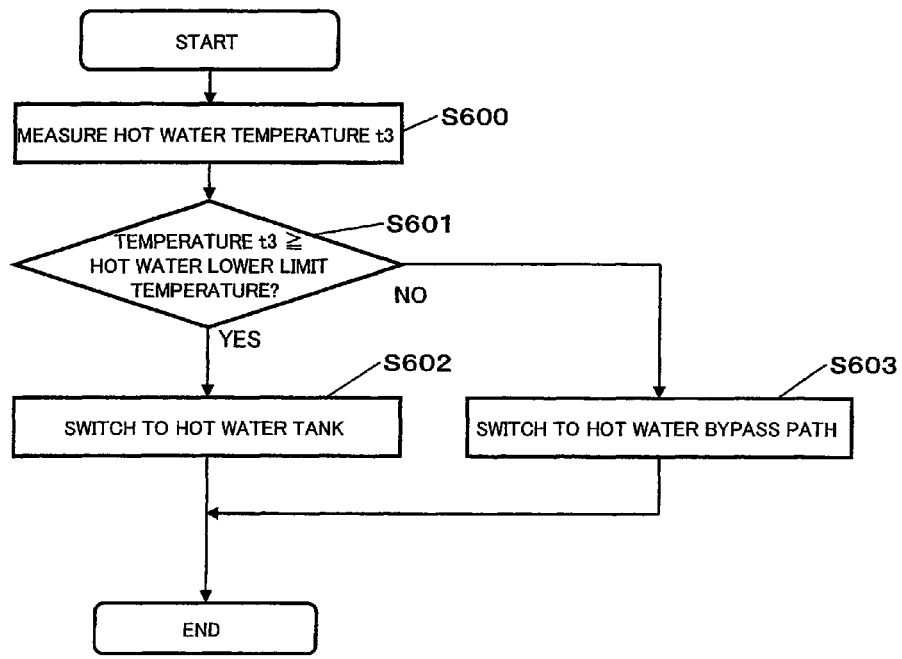
FIG. 9 is a flowchart showing a schematic content of hot water control in the fuel cell system according to Embodiment 2 of the present invention.

In the exhaust heat recovery operation of the fuel cell 101 in the normal shut-down process and the abnormal shut-down process, control for the hot water temperature shown in FIG. 9 is performed concurrently with the exhaust heat recovery operation. FIG. 9 is a flowchart showing a schematic content of the hot water control in the fuel cell system 100 according to Embodiment 2 of the present invention.

The control for the hot water temperature is directed to storing hot water with a hot water lower limit temperature (e.g., 60 degrees C.) or higher in the hot water tank 109. To be specific, as shown in FIG. 9, the temperature detector 141 detects temperature t3 of the hot water which has flowed through the heat exchanger 106 (step S600). If the temperature t3 of the hot water is not lower than the hot water lower limit temperature (Yes in step S601), the controller 110 controls the second heat medium switch 206 so that the hot water flows into the hot water tank 109 (step S602). On the other hand, if the temperature t3 of the hot water is lower than the hot water lower limit temperature (No in step S601), the controller 110 controls the second heat medium switch 206 so that the hot water flows to the hot water bypass path 207 (step S603).

Now, comparison between the abnormal shut-down process and the normal shut-down process will be described. In the abnormal shut-down process, in a time period from when the temperature of the reformer has reached a temperature which is not higher than the stand-by temperature until it reaches a temperature (FP purge temperature or lower), at which the FP purge process can be performed, the combustion air supplier 117 continues the cooling operation of the hydrogen generator 102 and the first pump 107 and the second pump 108 continue the exhaust heat recovery operation of the fuel cell 101, to more quickly cool the hydrogen generator 102 and the fuel cell 101, instead of waiting for the hydrogen generator 102 to be naturally cooled like the normal shut-down process.

For this reason, in the fuel cell system 100 according to Embodiment 2, the abnormal shut-down process is performed in such a manner that the fuel cell 101 and the hydrogen generator 102 are cooled with a higher amount in the abnormal shut-down process than in the normal shut-down process. Therefore, the temperatures of the components within the fuel cell system 100 are more quickly lowered to temperatures at which the maintenance operator will not get burnt, etc, thereby enabling the maintenance operator to start the maintenance operation at an earlier time. On the other hand, in the normal shut-down process which does not require the maintenance operation, the amount of cooling of the fuel cell 101 and the hydrogen generator 102 is suppressed as compared to the forcible shut-down process. Therefore, at next start-up, an energy required to raise the temperatures of the components (e.g., hydrogen generator 102, the fuel cell 101, etc) constituting the system is reduced and a time required for the start-up process is reduced. As a result, the start-up of the fuel cell system 100 is facilitated.

Although in the fuel cell system 100 of Embodiment 2, the cooling operation of the hydrogen generator 102 (reformer 16) and the exhaust heat recovery operation of the fuel cell 101 continue until the FP purge process terminates in the abnormal shut-down process, the present invention is not limited to this example. Any configuration may be employed so long as the hydrogen generator 102 is cooled with a higher amount and the amount of recovery of exhaust heat from the fuel cell 101 is larger in the abnormal shut-down process than in the normal shut-down process.

Although in Embodiment 2, the combustion air supplier 117 performs the cooling operation of the hydrogen generator 102 for a longer time and the first pump 107 and the second pump 108 perform the exhaust heat recovery operation of the fuel cell 101 for a longer time to cool the fuel cell 101 and the hydrogen generator 102 with a higher amount, in the abnormal shut-down process than in the normal shut-down process, the present invention is not limited to this, but at least one of the amount of combustion air supplied from the combustion air supplier 117, and the flow rate of cooling water and the amount of hot water flowing through the heat exchanger 106 may be set larger. To be specific, the operation amount of the combustion air supplier 117 may be set larger than the operation amount in the cooling operation of the hydrogen generator 102 in the normal shut-down process to increase the amount of combustion air supplied from the combustion air supplier 117.

The operation amount of the first pump 107 and the operation amount of the second pump 108 may be set larger than those in the exhaust heat recovery operation of the fuel cell in the normal shut-down process to increase the flow rate of cooling water and the amount of hot water flowing through the heat exchanger 106, but the present invention is not limited to this. For example, when the first flow control unit includes the first pump 107 and the flow control device (e.g., mixing valve 209) for controlling the flow rate of the cooling water which has flowed through the fuel cell 101 and then flows into the heat exchanger bypass path 208 or into the heat exchanger 106, the mixing valve 209 may be controlled to increase the flow rate of cooling water flowing to the heat exchanger 106. In this case, the controller 110 controls the first pump 107 to maintain or increase the operation amount of the first pump 107, as well as the control for the mixing valve 209.

In the fuel cell system 100 of Embodiment 2, the abnormal shut-down process is performed in such a manner that the fuel cell 101 and the hydrogen generator 102 are cooled with a higher amount than in the normal shut-down process, when the abnormality which requires shut-down of the power generation operation of the fuel cell system is detected as well as when the first abnormality is detected or the second abnormality is detected. However, in the abnormal shut-down process performed when the first abnormality which does not require the maintenance operation after the shut-down process terminates is detected, the exhaust heat recovery operation of the fuel cell 101 and the cooling operation of the hydrogen generator 102 which are similar to those in the normal shut-down process may be performed. Thereby, in the abnormal shut-down process performed in the case where the first abnormality is detected, the exhaust heat recovery operation of the fuel cell 101 and the cooling operation of the hydrogen generator 102 for facilitating shifting to the maintenance operation are not performed. Therefore, at next start-up, an energy required to raise the temperature of the components (e.g., hydrogen generator 102, the fuel cell 101, etc) constituting the system is reduced. As a result, the start-up of the fuel cell system 100 is facilitated.

Embodiment 3

Figure 10:
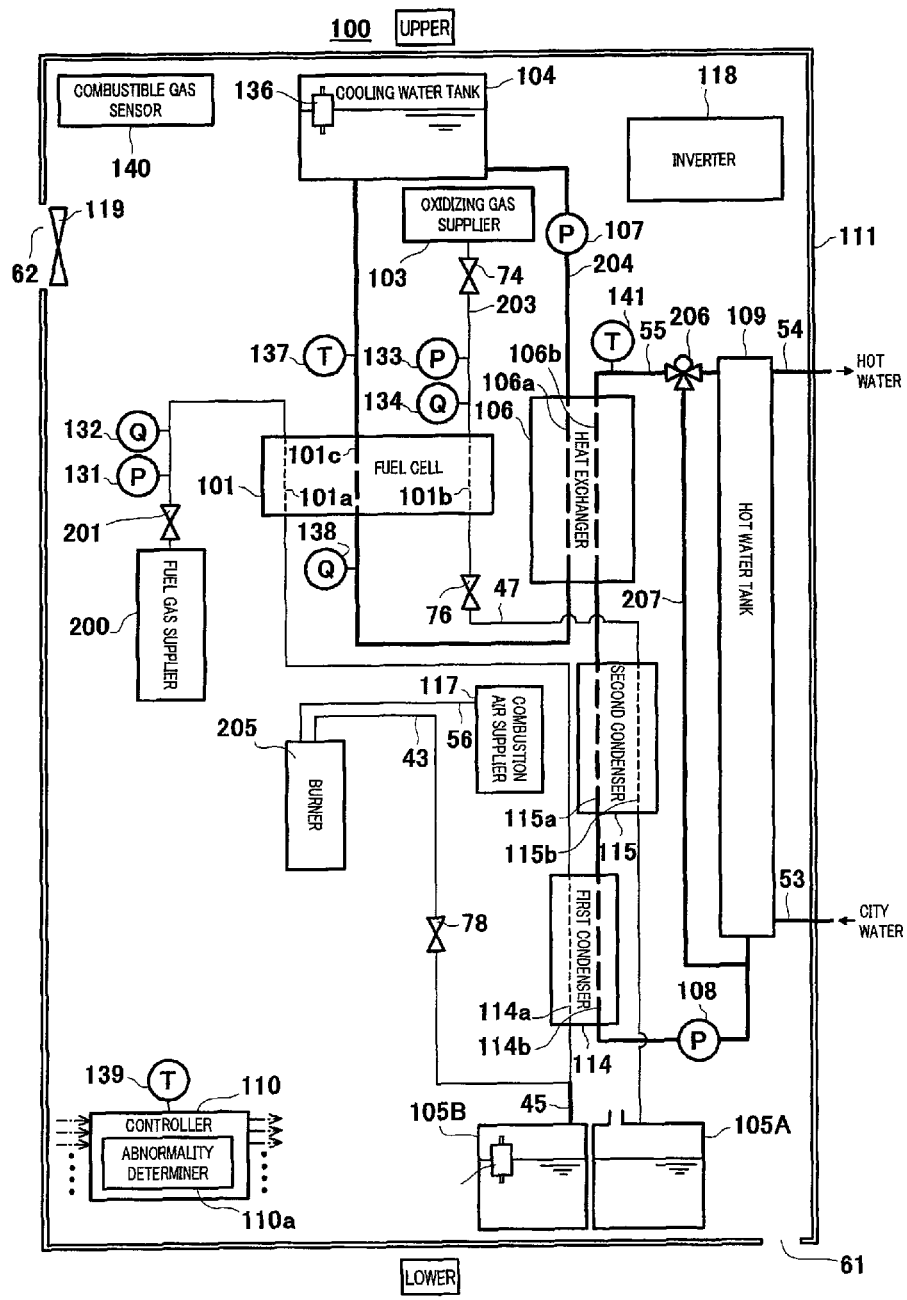
FIG. 10 is a view showing a schematic configuration of a fuel cell system according to Embodiment 3 of the present invention.

FIG. 10 is a view showing a schematic configuration of a fuel cell system according to Embodiment 3 of the present invention.

As shown in FIG. 10, the fuel cell system 100 according to Embodiment 3 of the present invention has a configuration which is basically identical to that of the fuel cell system 100 of Embodiment 2 but is different from the same in that the fuel cell system 100 of Embodiment 3 includes a fuel gas supplier 200 which replaces the hydrogen generator 102, and a burner 205 configured to combust the fuel gas and the oxidizing gas which are exhausted from the anode passage and the cathode passage in the fuel cell 10, respectively. The fuel gas supplier is, for example, a flow control device configured to control the flow rate of the fuel gas supplied from a fuel gas source such as a hydrogen infrastructure or a hydrogen tank. As the fuel gas supplier, a flow control valve, or a configuration having a combination of a booster and the flow control valve may be used.

In the fuel cell system 100 of Embodiment 3, during the normal power generation operation, the fuel cell 101 generates electric power using the fuel gas containing hydrogen supplied from the fuel gas supplier 200 and the oxidizing gas supplied from the oxidizing gas supplier 103. During the power generation operation, the controller 110 operates the first pump 107 and the second pump 108, so that the cooling water flowing in the cooling water path 204 by the operation of the first pump 107 recovers the exhaust heat from the fuel cell 101. Then, the heat recovered by the cooling water is recovered by the hot water circulating in the hot water path 55 by the operation of the second pump 108 via the heat exchanger 106, and is stored as hot water in the hot water tank 109. During the above power generation operation, off course, the eighth on-off valve 201 and the seventh on-off valve 78 which are provided in the fuel gas path 202 in locations which are upstream and downstream of the fuel cell 101, respectively, are opened, and the third on-off valve 74 and the fifth on-off valve 76 which are provided in the oxidizing gas path 203 in locations which are upstream and downstream of the fuel cell 101, respectively, are opened. The heat exchanger 106 is an example of a heat radiator. The heat exchanger 106 may be replaced by a configuration in which the cooling water in the fuel cell is air-cooled like Embodiment 2. In this case, the amount with which the cooling water is cooled may be controlled according to at least one of the flow rate of the cooling water flowing into the heat radiator and the operation amount of the air-cooling fan.

Figure 11:
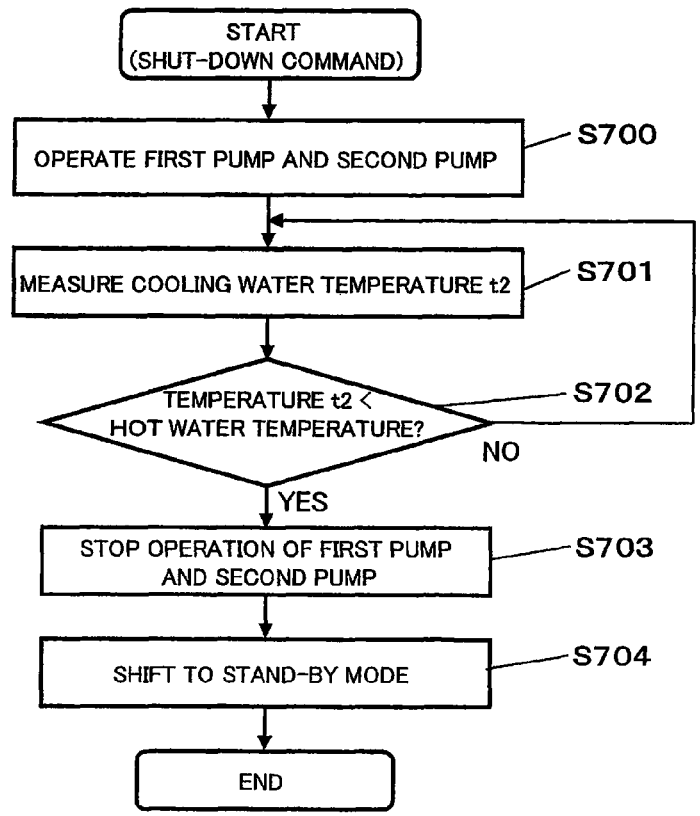
FIG. 11 is a flowchart showing a main operation of a normal shut-down process in a fuel cell system according to Embodiment 3 of the present invention.

Next, the normal shut-down process of the fuel cell system 100 will be described with respect to FIG. 11. FIG. 11 is a flowchart showing a main operation of the normal shut-down process in the fuel cell system according to Embodiment 3 of the present invention.

As shown in FIG. 11, initially, when the controller 110 outputs a shut-down command, the controller 110 stops the supply of the fuel gas and the supply of the oxidizing gas from the fuel gas supplier 200 and from the oxidizing gas supplier 103 to the fuel cell system 100, respectively, and closes the eighth on-off valve 201 and the fifth on-off valve 76 on the fuel gas path 202 and the third on-off valve 74 and the seventh on-off valve on the oxidizing gas path. In addition, the controller 110 stops the operation of the inverter 118 and shuts down the power generation operation of the fuel cell 101.

After the shut-down of power generation in the fuel cell 101, the first pump 107 and the second pump 108 are operated similarly to the power generation operation of the fuel cell system 100 to recover extra heat remaining in the fuel cell 101, thus performing the exhaust heat recovery operation of the fuel cell (step S700). In the exhaust heat recovery operation, similarly to the power generation operation of the fuel cell system 100, the controller 110 controls the operation amount of the second pump 108 based on the detected temperature of the temperature detector 141 so that the temperature detected by the temperature detector 141 reaches a temperature which is not lower than the lower limit temperature (hot water lower limit temperature: e.g., 60 degrees C.) at which the hot water can be stored in the hot water tank 109, thereby controlling the flow rate of the stored hot water.

Then, during the exhaust heat recovery operation, the temperature detector 137 detects the temperature (cooling water temperature t2) of the cooling water flowing in the cooling water path 204, which has flowed through the fuel cell 101 and then flows into the heat exchanger 106 (step S701). When the detected temperature of the temperature detector 137 reaches a temperature lower than the hot water temperature (e.g., 63 degrees C.) which is not lower than the hot water lower limit temperature, the controller 110 stops the operation of the first pump 107 and the operation of the second pump 208, thus terminating shut-down process and allowing the fuel cell system 100 to shift to the stand-by mode. Although in Embodiment 3, the temperature of the cooling water detected by the temperature detector 137 is regarded as the temperature of the fuel cell 101, the present invention is not limited to this, but the temperature detector may directly detect the temperature of the fuel cell 101. In this embodiment, the fuel cell 101 is cooled by controlling the operation amount of the first flow control device (first pump 107) based on the temperature of the cooling water detected by the temperature detector 137. Although in the above flow, the exhaust heat recovery operation of the fuel cell 101 continues until the temperature of the fuel cell 101 reaches a temperature lower than the hot water temperature, the present invention is not limited to this example, but the exhaust heat recovery operation may be omitted.

Figure 12:
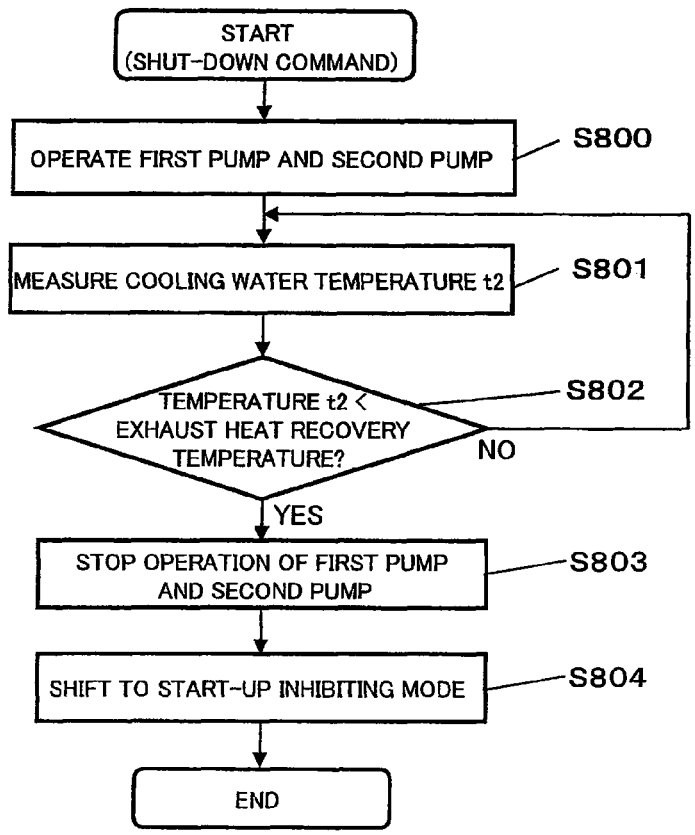
FIG. 12 is a flowchart showing an exemplary abnormal shut-down process in a fuel cell system according to Embodiment 3 of the present invention.

Next, an example of the abnormal shut-down process of the fuel cell system 100 in the case where the abnormality determiner 110a determines there is an abnormality based on the detected values of the detectors 131~140, will be described with reference to FIG. 12. FIG. 12 is a flowchart showing an exemplary abnormal shut-down process in the fuel cell system according to Embodiment 3 of the present invention. The following abnormal shut-down process is configured such that the exhaust heat recovery operation of the fuel cell 101 and the cooling operation of the hydrogen generator 102 are carried out in a case where an abnormality which requires the shut-down of the power generation operation of the fuel cell 101 is detected as well as in the case where the first abnormality and the second abnormality shown in FIG. 6 are detected.

As shown in FIG. 12, initially, when the abnormality determiner 110a determines that a specified abnormality belonging to the abnormality which is followed by the shut-down of the fuel cell system 100 has occurred, the abnormality corresponding each abnormality is performed. In the present example, similarly to the normal shut-down process, the controller 110 outputs a shut-down command and stops the supply of the fuel gas from the fuel gas supplier 200 and the supply of the oxidizing gas from the oxidizing gas supplier 103. In addition, the controller 110 closes the eighth on-off valve 201 and the fifth on-off valve 76 on the fuel gas path 202 and the third on-off valve 74 and the seventh on-off valve 78 on the oxidizing gas path.

After the supply of the fuel gas and the oxidizing gas to the fuel cell 101 are stopped, and the power generation in the fuel cell 101 is shut down as described above, the first pump 107 and the second pump 108 are operated to recover extra heat remaining in the fuel cell 101 to perform the exhaust heat recovery operation of the fuel cell 101 similarly to the normal shut-down process (step S800). Then, the temperature detector 137 detects the temperature of the cooling water in the cooling water path 204, which has flowed through the fuel cell 101 and flows into the heat exchanger 106, during the exhaust heat recovery operation (step S801). When the cooling water temperature t2 reaches a temperature which is lower than a temperature (exhaust heat recovery temperature: e.g., 40 degrees C.) at which heat can be transmitted from the cooling water to the hot water via the heat exchanger 106 (step S802), the controller 110 stops the operation of the first pump 107 and the operation of the second pump 108 (step S803). Thus, the controller 110 terminates the shut-down process and shifts the fuel cell system 100 to the start-up inhibiting mode (step S804).

The exhaust heat recovery temperature is set to a temperature which is lower than the hot water temperature and higher than a city water temperature. The determination conditions used in the steps S701 and S702 may be desired determination conditions so long as they are used to determine whether or not the heat can be transmitted from the cooling water to the hot water via the heat exchanger 106. For example, determination may be made based on whether or not a difference between the temperature detected by the temperature detector 137 and the temperature detected by the temperature detector 141 for detecting the temperature of the hot water flowing into the heat exchanger 106 is not more than predetermined threshold which is larger than 0.

Concurrently with the exhaust heat recovery operation in the normal shut-down process and the abnormal shut-down process, the hot water control (see FIG. 9) described in Embodiment 2 is performed in the same manner so that the hot water with the hot water lower limit temperature or higher is stored in the hot water tank 109. The exhaust heat recovery operation of the fuel cell 101 in the abnormal shut-down process shown in FIG. 12 is exemplary and is not limited to this, so long as the fuel cell 101 is cooled with a higher amount in the abnormal shut-down process than in the normal shut-down process. For example, an embodiment may be employed instead of the exhaust heat recovery operation (see FIG. 8) during the abnormal shut-down process of the fuel cell 101 described in Embodiment 2.

In the fuel cell system according to Embodiment 3, since the exhaust heat recovery operation of the fuel cell 101 continues until the cooling water temperature becomes lower in the abnormal shut-down process than in the normal process, the temperature of the fuel cell 101 and the temperatures of the components (cooling water path 204, heat exchanger 106, etc) through which a fluid flows in the fuel cell 101 can be lowered quickly to those at which the maintenance operator will not get burnt, etc, and shifting to the maintenance operation is facilitated. On the other hand, in the normal shut-down process which does not require the maintenance operation, the fuel cell 101 and the hydrogen generator 102 are cooled with a lower amount than in the abnormal shut-down process. Therefore, at next start-up, an energy required to raise the temperature of the fuel cell 101 is reduced and a time required for the start-up process is reduced. As a result, the start-up of the fuel cell system 100 is facilitated.

In the fuel cell system 100 of Embodiment 3, like the fuel cell system 100 according to Embodiment 2, the abnormal shut-down process is performed in such a manner that the fuel cell 101 and the hydrogen generator 102 are cooled with a higher amount than in the normal shut-down process, when the abnormality which requires shut-down of the power generation operation of the fuel cell system is detected as well as when the first abnormality is detected or the second abnormality is detected. However, in the abnormal shut-down process performed when the first abnormality which does not require the maintenance operation after the shut-down process terminates is detected, the exhaust heat recovery operation of the fuel cell 101 and the cooling operation of the hydrogen generator 102 which are similar to those in the normal shut-down process may be performed. Thereby, in the abnormal shut-down process performed in the case where the first abnormality is detected, the exhaust heat recovery operation of the fuel cell 101 and the cooling operation of the hydrogen generator 102 for facilitating shifting to the maintenance operation are not performed. Therefore, at next start-up, an energy required to raise the temperature of the components (e.g., hydrogen generator 102, the fuel cell 101, etc) constituting the system is reduced. As a result, the start-up of the fuel cell system 100 is facilitated.

Embodiment 4

The fuel cell system 100 according to Embodiment 4 of the present invention has a configuration which is basically identical to that of the fuel cell system 100 of Embodiment 3 but is different from the same in that the controller 110 controls the flow rate of cooling water flowing through the heat exchanger 106 based on the temperature of the fuel cell 101 during the power generation operation, as a new feature. To be specific, as the new feature, the controller 110 controls the flow rate of cooling water flowing through the heat exchanger 106 based on the temperature detected by the temperature detector 137 attached to the cooling water path (in this embodiment, cooling water discharge path 52) so that the temperature detected by the temperature detector 137 reaches a predetermined temperature lower than the temperature of the cooling water which has flowed through the fuel cell 101, during the power generation operation. The flow rate of cooling water is controlled according to the operation amount of the first pump 107 when the first flow control device is the first pump 107. Alternatively, the first flow control device may include the first pump 107 and the flow control device (e.g., mixing valve 209) for controlling the flow rate of the cooling water which has flowed through the fuel cell 101 and then flows into the heat exchanger bypass path 208 or into the heat exchanger 106, and the flow rate of cooling water may be controlled according to the operation amount of the first pump 107 and the operation amount of the flow control device.

The fuel cell system 100 of Embodiment 4 has a feature that the flow rate of cooling water is larger than the flow rate of cooling water in the abnormal shut-down process than during the power generation amount. To be specific, the fuel cell system 100 of Embodiment 4 is different from the fuel cell system 100 of Embodiment 3 in that the controller 110 causes the operation amount of the first pump 107 to reach a predetermined operation amount larger than the operation amount of the first pump 107 during the power generation operation of the fuel cell system 100 (hereinafter referred to as forcible cooling operation) and the controller 110 controls the second heat medium switch 206 so that the hot water which has flowed through the heat exchanger 106 flows into the hot water bypass path during the forcible cooling operation. Hereinafter, the abnormal shut-down process of the fuel cell system 100 of Embodiment 4 will be described with reference to FIG. 13.

Figure 13:
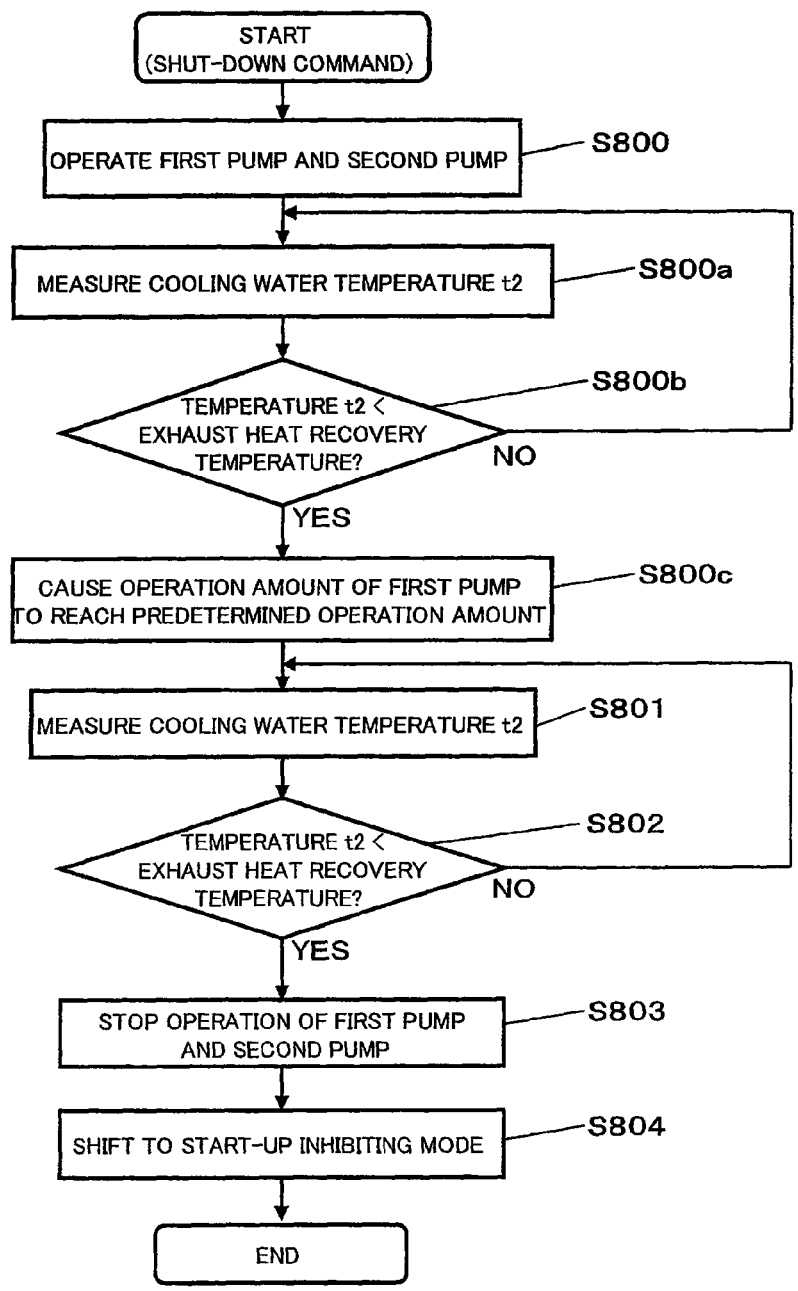
FIG. 13 is a flowchart showing an exemplary abnormal shut-down process in a fuel cell system according to Embodiment 4 of the present invention.

FIG. 13 is a flowchart showing an exemplary abnormal shut-down process in the fuel cell system 100 according to Embodiment 4 of the present invention.

As shown in FIG. 13, in the abnormal shut-down process of the fuel cell system 100 of Embodiment 4, the first pump 107 and the second pump 108 are operated to continue the exhaust heat recovery operation of the fuel cell 101, after the shut-down of the power generation of the fuel cell 101 (step S800). In the exhaust heat recovery operation, the operation amount of the first pump 107 is controlled so that the temperature detected by the temperature detector 137 reaches the above predetermined temperature like during the power generation operation. In other words, step S800 is a first cooling step in which the operation amount of the first flow control device (first pump) 107 is controlled in view of the temperature of the fuel cell 101. It should be noted that the temperature of the cooling water detected by the temperature detector 137 is regarded as the temperature of the fuel cell 101.

Thereafter, when the temperature detected by the temperature detector 137 reaches a temperature that is lower than the hot water temperature (e.g., 63 degrees C.) which is not lower than the above hot water lower limit temperature (Yes in step S800b), the controller 110 shifts to the forcible cooling operation of controlling the first flow control device so that the flow rate of cooling water flowing through the heat exchanger 106 reaches a value which is not less than a predetermined value regardless of the temperature detected by the temperature detector 137. For example, it is desirable to control the first flow control device so that the flow rate of cooling water during the forcible cooling operation reaches a value larger than an average flow rate of cooling water during the power generation operation. To be specific, the controller 110 causes the operation amount of the first pump 107 to reach a predetermined operation amount which is larger than the average operation amount of the first pump 107 during the power generation operation (step S800c). Step S800c is a second cooling step for causing the operation amount of the first flow control device (first pump) 107 to be larger than a predetermined value regardless of the temperature of the fuel cell 101.

The average flow rate during the power generation operation is a value obtained by dividing a total of a product of the flow rate detected by the third flow detector 138 and detection intervals during the power generation operation by a power generation operation time. If the path 208 bypassing the heat exchanger is provided as shown in FIG. 3, the flow rate of cooling water flowing through the heat exchanger 106 is calculated based on the flow rate detected by the third flow detector 138 and the opening degree of the mixing valve 209 at the detection of the flow rate, and the average flow rate is calculated by dividing a total of a product of the calculated value and the detection intervals during the power generation operation by a power generation operation time. The average operation amount during the power generation operation is, for example, a value obtained by dividing a total of a product of the operation amount according to a command output from the controller 110 to the first pump 107 and command intervals during the power generation operation by a power generation operation time.

In Step S801 and the following steps, the above forcible cooling operation continues until the temperature detected by the temperature detector 137 reaches a temperature lower than the exhaust heat recovery temperature, like the abnormal shut-down process of the fuel cell system 100 of Embodiment 3. This makes it possible to facilitate the exhaust heat recovery operation of the fuel cell 101 as compared to a case where the forcible cooling operation is not performed in the exhaust heat recovery operation in the abnormal shut-down process. Although the temperature detected by the temperature detector 137 is used in step S800 to determine whether or not to perform the exhaust heat recovery operation similar to that in the normal power generation operation, other condition may be used to determine whether or not to continue the exhaust heat recovery operation. For example, a timer may measure a time of the exhaust heat recovery operation of the fuel cell 101 which lapses from the start of the abnormal shut-down process, and shifting to the forcible cooling operation may take place when the lapse time reaches a time which is not less than a predetermined time J3.

On the other hand, in the forcible cooling operation, the controller 110 controls the second heat medium switch 206 so that the hot water flows into the hot water bypass path 207. The reason is as follows. By increasing the flow rate of cooling water flowing through the heat exchanger 106, the fuel cell 101 is cooled at a higher pace and hence the temperature of cooling water flowing through the cooling water path becomes lower. This easily causes the temperature of the hot water which has flowed through the heat exchanger 106 to be lower than the hot water lower limit temperature. Therefore, the controller 110 controls the second heat medium switch 206 to prevent the hot water with a temperature lower than the hot water lower limit temperature from being supplied to the hot water tank 109. The forcible cooling operation is meant to include the control for switching to the hot water tank 109 appropriately as well as the control for switching to the hot water bypass path 207. For example, the forcible cooling operation is meant to include the control for switching to the hot water tank 109 when the temperature of the hot water which has flowed through the heat exchanger 106 is higher than the hot water lower limit temperature.

When the cooling water path has the bypass path 208 shown in FIG. 3, the controller 110 may cause the opening degree of the mixing valve 209 toward the heat exchanger 106 to be larger than the average opening degree of the mixing valve 209 during the power generation operation. Alternatively, the controller 110 may start the forcible cooling operation (step S800c) upon the start of the abnormal shut-down process without performing the exhaust heat recovery operation (step S800~S800b) similar to that during the power generation operation. In this case, the controller 110 forcibly causes the operation amount of the first flow control device (first pump) 107 to be larger than a predetermined value regardless of the temperature of the fuel cell 101, in the abnormal shut-down process. In the fuel cell system 100 of Embodiment 4, as in the fuel cell system 100 of Embodiment 3, the controller 110 cools the fuel cell 101 by controlling the operation amount of the first flow control device (first pump 107) based on the temperature of the cooling water which is detected by the temperature detector 137 in the normal shut-down process. Therefore, in Embodiment 4, similarly to the normal shut-down process, the controller 110 cools the fuel cell 101 by controlling the operation amount of the first flow control device (first pump 107) based on the temperature of the cooling water which is detected by the temperature detector 137, while in the abnormal shut-down process, the controller 110 forcibly causes the operation amount of the first flow control device (first pump) 107 to be larger than the predetermined value regardless of the temperature (temperature of the cooling water detected by the temperature detector 137) of the fuel cell 101.

In the fuel cell system 100 of Embodiment 4, the exhaust heat recovery operation (see FIG. 5) of the fuel cell 101 described in Embodiment 2 may be replaced by the exhaust heat recovery operation of the fuel cell 101 shown in FIG. 1. The average opening degree during the power generation operation is a value obtained by dividing a total of a product of the opening degree according to a command output from the controller 110 to the first pump 107 and command intervals during the power generation operation by a power generation operation time.

In the fuel cell system 100 of Embodiment 4 configured as described above, the first flow control device is controlled so that the flow rate of the cooling water flowing through the heat exchanger 106 reaches a predetermined flow rate larger than the average flow rate during the power generation so that the temperature of the fuel cell 101 and the temperatures of the components (e.g., cooling water path 204, heat exchanger 106, etc) through which the fluid flows in the fuel cell 101 are more quickly lowered to temperatures at which the maintenance operator will not get burnt, etc. Thereby, shifting to the maintenance operation.

Although the fuel cell system 100 of Embodiment 4 has a configuration which is basically identical to that of the fuel cell system 100 of Embodiment 3, and its operation (operation such as the power generation operation of the fuel cell system 100) is different from that of the fuel cell system 100 of Embodiment 3, the present invention is not limited to this, but the fuel cell system 100 of Embodiment 4 may have configuration which is basically identical to that of the fuel cell system 100 of Embodiment 2 and its operation may be as described above.

Embodiment 5

Figure 14:
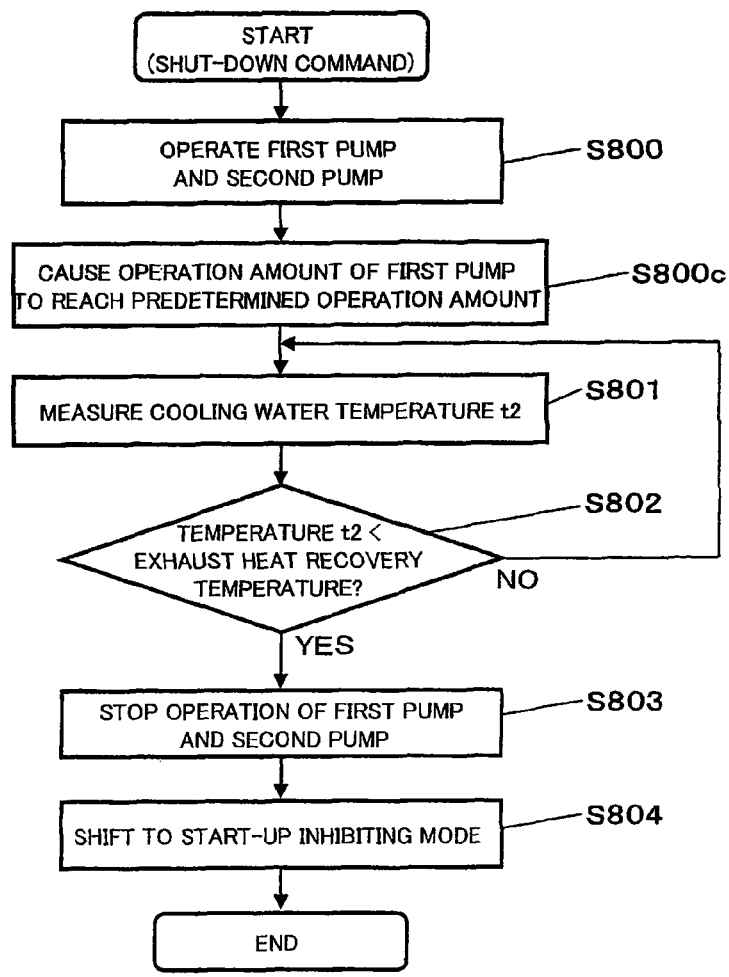
FIG. 14 is a flowchart showing an exemplary abnormal shut-down process in a fuel cell system according to Embodiment 5 of the present invention.

FIG. 14 is a flowchart showing an exemplary abnormal shut-down process in a fuel cell system 100 according to Embodiment 5 of the present invention.

The fuel cell system 100 according to Embodiment 5 of the present invention has a configuration which is basically identical to that of the fuel cell system 100 of Embodiment 2 but is different from the same in abnormal shut-down process as shown in FIG. 14.

To be specific, in the abnormal shut-down process of the fuel cell system 100 of Embodiment 5, the first pump 107 and the second pump 108 are operated to execute the exhaust heat recovery operation of the fuel cell 101, after the shut-down of the power generation of the fuel cell 101 (step S800). In the exhaust heat recovery operation, the operation amount of the first pump 107 is controlled so that the temperature detected by the temperature detector 137 reaches the predetermined temperature in the same manner that the power generation operation is performed. In other words, step S800 is a first cooling step in which the operation amount of the first flow control device (first pump) 107 is controlled in view of the temperature of the fuel cell 101. It should be noted that the temperature of the cooling water detected by the temperature detector 137 is regarded as the temperature of the fuel cell 101.

Thereafter, until the time of start of the cathode purge process, the exhaust heat recovery operation continues. After the cathode purge process terminates, the controller 110 shifts to the forcible cooling operation in which the first flow control device is controlled so that the flow rate of the cooling water flowing through the heat exchanger 106 reaches a value which is not less than a predetermined value regardless of the temperature detected by the temperature detector 137. For example it is desirable to control the first flow control device so that the flow rate of the cooling water during the forcible cooling operation reaches a value larger than the average flow rate during the power generation operation. To be specific, the controller 110 causes the operation amount of the first pump 107 to reach a predetermined operation amount larger than the average operation amount during the power generation operation (step S800c). That is, step S800c is a second cooling step of causing the operation amount of the first flow control device (first pump) 107 to be larger than the predetermined value regardless of the temperature of the fuel cell 101.

As a result, the fuel cell 101 is cooled with a higher amount than in a case where the forcible cooling operation is not performed in the exhaust heat recovery operation in the abnormal shut-down process, thereby facilitating the exhaust heat recovery operation of the fuel cell 101.

In Step S801 and the following steps, the above forcible cooling operation continues until the FP purge process terminates, similarly to the abnormal shut-down process of the fuel cell system 100 of Embodiment 2.

In the fuel cell system 100 of Embodiment 5 configured as described above, the temperature of the fuel cell 101 and the temperatures of the components (e.g., cooling water path 204, heat exchanger 106, etc) through which the fluid flows in the fuel cell 101 are more quickly lowered to temperatures at which the operator will not get burnt, etc., than in the fuel cell system 100 of Embodiment 4, facilitating shifting to the maintenance operation.

Although the fuel cell system 100 of Embodiment 5 has a configuration which is basically identical to that of the fuel cell system 100 of Embodiment 2, and its operation (operation such as the power generation operation of the fuel cell system 100) is different from that of the fuel cell system 100 of Embodiment 2, the present invention is not limited to this, but the fuel cell system 100 of Embodiment 5 may have a configuration which is basically identical to that of the fuel cell system 100 of Embodiment 3 and its operation may be as described above.

Embodiment 6

A fuel cell system according to Embodiment 6 of the present invention is configured to perform a pressure compensation operation for supplying a gas to reactant gas paths in the fuel cell sealed, a pressure in the reactant gas path having decreased, after the shut-down of the power generation of the fuel cell. For example, the controller sets the number of times of the pressure compensation operation more in the abnormal shut-down process than in the normal shut-down process.

In the shut-down process, the fuel cell system 100 is typically configured to close the inlets and the outlets of the gas passages (fuel gas passage 101a, oxidizing gas passage 101b) of the fuel cell 101 to perform the seal operation of closing the gas passages. However, when the shut-down process is performed, the pressure in the gas passages decreases and an excessively negative pressure is generated with a decrease in the temperatures of the components constituting the fuel cell system 100, which may possibly damage constituents such as electrolyte. To avoid this, the fuel cell system 100 of Embodiment 6 of the present invention is configured to perform the pressure compensation process for supplying the gas to the gas passages (fuel gas passage 101a, oxidizing gas passage 101b) when the pressure in the gas passages is not higher than a predetermined pressure threshold P1 which is higher than a negative pressure resistance limit value of the fuel cell 101.

The fuel cell system 100 of Embodiment 6 is configured to set the rate of the cooling per unit time higher in the exhaust heat recovery operation of the fuel cell 101 in the abnormal shut-down process than in the exhaust heat recovery operation of the fuel cell 101 in the normal shut-down process. For this reason, the temperature of the fuel cell 101 and the pressure in the fuel cell 101 decrease at a higher pace in the abnormal shut-down process than in the normal shut-down process. Therefore, the fuel cell system 100 of Embodiment 6 is configured to set the number of times of the pressure compensation process more in the abnormal shut-down process than in the normal shut-down process. Hereinafter, this will be described in detail.

The fuel cell system 100 according to Embodiment 6 has a configuration which is basically identical to that of the fuel cell system 100 of Embodiment 3 shown in FIG. 10. In the normal shut-down process, the exhaust heat recovery operation of the fuel cell 101 is performed similarly to the exhaust heat recovery operation in Embodiment 3, and further the pressure compensation process is performed. The pressure compensation process will be described later.

The exhaust heat recovery operation of the fuel cell 101 in the fuel cell system 100 of Embodiment 6 is identical to the exhaust heat recovery operation (see FIG. 11) in the fuel cell system 100 of Embodiment 3. But, the controller 110 controls the operation amount of the first pump 107 in the exhaust heat recovery operation so that the flow rate of the cooling water flowing through the heat exchanger 106 reaches a predetermined temperature lower than the temperature of the cooling water which has flowed through the fuel cell 101.

Figure 15:
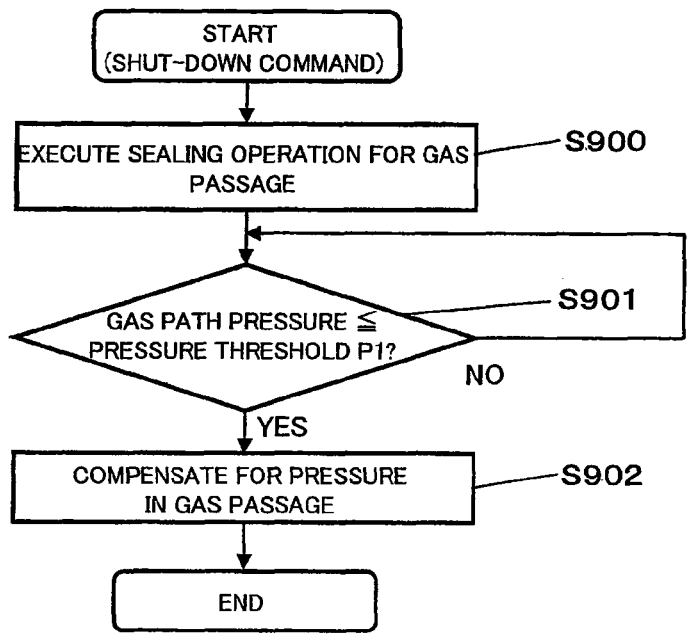
FIG. 15 is a flowchart showing an exemplary pressure compensation process performed in a fuel cell system according to Embodiment 6 of the present invention.

Next, the pressure compensation process of the fuel cell system 100 of Embodiment 6 will be described in detail with reference to FIG. 15. FIG. 15 is a flowchart showing an example of the pressure compensation process performed in the fuel cell system 100 according to Embodiment 6 of the present invention.

As shown in FIG. 15, after the shut-down process starts, the gas passages (fuel gas passage 101a and oxidizing gas passage 101b) of the fuel cell 101 are sealed (step S900). Then, the value of pressure in the gas passage in the fuel cell 101 is detected, and when this pressure value is not more than the predetermined threshold P1 (Yes in step S901), the gas is supplied to the gas passages to compensate for the pressure (step S902). Then, the value of pressure in the fuel cell 101 is detected again, and when this pressure value is not less than an atmospheric pressure, the supply of the gas to the gas passages stops and the gas passages are disconnected from outside air. Thus, the pressure compensation process terminates.

To be specific, the sealing operation is performed by closing the eighth on-off valve 201 and the seventh on-off valve 78 provided at the inlet and the outlet of the fuel gas passage 101a, respectively (step S900). Then, when the pressure value detected by the first pressure detector 131 is not more than the predetermined pressure threshold P1 (e.g., −5 kPa with respect to an atmospheric pressure) (Yes in step S901), the eighth on-off valve 201 is opened with the seventh on-off valve 78 closed, and the fuel gas supplier 200 is controlled to supply the gas (step S902). Then, the controller 110 obtains the pressure value detected by the first pressure detector 131. When the obtained pressure value reaches a value which is not less than the atmospheric pressure, the controller 110 stops the supply of the gas from the fuel gas supplier 200 to the fuel gas passage 101a and closes the eighth on-off valve 201. Thus, the pressure compensation operation terminates.

Likewise, the sealing operation is performed by closing the third on-off valve 70 and the fifth on-off valve 76 provided at the inlet and the outlet of the oxidizing gas passage 101b, respectively (step S900). Then, when the pressure value detected by the second pressure detector 133 is not more than the predetermined pressure threshold P1 (e.g., −5 kPa with respect to an atmospheric pressure) (Yes in step S901), the third on-off valve 74 is opened with the fifth on-off valve 76 closed, and outside air is introduced into the oxidizing gas passage 101b to perform pressure compensation for the oxidizing gas passage 101b (step S902). Then, the controller 110 obtains the pressure value detected by the second pressure detector 133. When the obtained pressure value reaches a value which is substantially equal to the atmospheric pressure, the controller 110 closes the third on-off valve 74. Thus, the pressure compensation operation terminates.

Then, the controller 110 performs step S901 on a regular basis (e.g., every 30 sec) after the pressure compensation operation has been performed, and performs the pressure compensation process as necessary when the value of the pressure in the gas passages has decreased to a level at which the pressure compensation is required.

Although it is determined whether or not to perform the pressure compensation process using the pressure detectors (first pressure detector 131, second pressure detector 133) for directly detecting the pressures in the gas passages, the above pressure compensation may be performed based on the temperature detected by the temperature detector (e.g., temperature detector 143, etc) in the gas passage associated with this pressure and a lapse time after the start of the shut-down process which is measured by the timer and is associated with above pressure.

Next, the abnormal shut-down process of the fuel cell system 100 of Embodiment 6 will be described. The abnormal shut-down process is performed along the flow (see FIG. 1) similar to the flow of the exhaust heat recovery operation of the fuel cell 101 in the fuel cell system 100 of Embodiment 3, but the flow rate of the cooling water flowing through the heat exchanger 106 is controlled to be set higher in the abnormal shut-down process than in the normal shut-down process. To be specific, like the fuel cell system 100 of Embodiment 4, the controller 110 of the fuel cell system 100 of Embodiment 6 performs the forcible cooling operation in such a manner that the controller 110 controls the first flow control device so that the flow rate of the cooling water flowing through the heat exchanger 106 reaches a value which is not less than a predetermined value, regardless of the temperature detected by the temperature detector 137. In this case, for example, the controller 110 desirably controls the first flow control device so that the flow rate of the cooling water during the forcible cooling operation is larger than the average flow rate during the power generation operation. To be specific, the controller 110 causes the operation amount of the first pump 107 to reach a predetermined operation amount larger than the average operation amount during the power generation operation. The average flow rate and the average operation amount during the power generation operation may be the calculated values exemplarily described in Embodiment 4.

Since the controller 110 performs the exhaust heat recovery operation such that the fuel cell 101 is cooled at a higher pace in the abnormal shut-down process than in the normal shut-down process as described above, the temperature of the fuel cell 101 is lowered more quickly in the abnormal shut-down process than in the normal shut-down process and the pressure in the gas passage is lowered more frequently to a level at which the pressure compensation is required, in the abnormal shut-down process than in the normal shut-down process Since the above pressure compensation operation is performed more frequently in the abnormal shut-down process of the fuel cell system 100 of Embodiment 6 than in the normal shut-down process, generation of an excessively negative pressure within the gas passages of the fuel cell 101 is suppressed. As a result, the fuel cell 101 is protected.

Although the fuel cell system 100 of Embodiment 6 has a configuration which is basically identical to that of the fuel cell system 100 of Embodiment 3, and its operation (operation such as the power generation operation of the fuel cell system 100) is different from that of the fuel cell system 100 of Embodiment 3, the present invention is not limited to this, but the fuel cell system 100 of Embodiment 6 may have a configuration which is basically identical to that of the fuel cell system 100 of Embodiment 2 and its operation may be as described above.

Embodiment 7

A fuel cell system according to Embodiment 7 of the present invention includes a hydrogen generator including a reformer configured to generate a hydrogen-containing gas through a reforming reaction using a raw material, a combustor configured to heat the reformer, and a combustion air supplier configured to supply combustion air to the combustor. For example, the controller is configured to control the first flow control device so that the fuel cell is cooled with a higher amount than in the normal shut-down process, and control the combustion air supplier so that the reformer is cooled with an amount equal to the amount of the cooling in the normal shut-down process, in an abnormal shut-down process performed after the abnormality detector detects an abnormality which is associated with the fuel cell and is other than an abnormality associated with the hydrogen generator.

As used herein, "abnormality associated with hydrogen generator" refers to abnormalities associated with components constituting the hydrogen generator. For example, there are an abnormality of a material gas flow rate, a temperature abnormality of the reformer, a combustion abnormality of a burner, etc.

As used herein, "abnormality which is associated with the fuel cell and is other than the abnormality associated with hydrogen generator" refers to abnormalities of the components associated with the power generation operation of the fuel cell other than the hydrogen generator. For example, there are a cooling water temperature abnormality, an oxidizing gas flow rate abnormality, a water level abnormality of a cooling water tank, a water level abnormality of a condensed water tank, etc.

The fuel cell system 100 according to Embodiment 7 of the present invention has a configuration which is basically identical to that of the fuel cell system 100 of Embodiment 2 but is different from the same in the shut-down process after detecting the abnormality based on the values detected by the detectors 131~140. To be specific, the controller 110 performs the exhaust heat recovery operation of the fuel cell 101 like the exhaust heat recovery operation in the abnormal shut-down process of the fuel cell system 100 of Embodiment 2 but performs the cooling operation of the hydrogen generator 102 like the cooling operation in the normal shut-down process. Hereinafter, this will be described with reference to FIG. 16.

Figure 16:
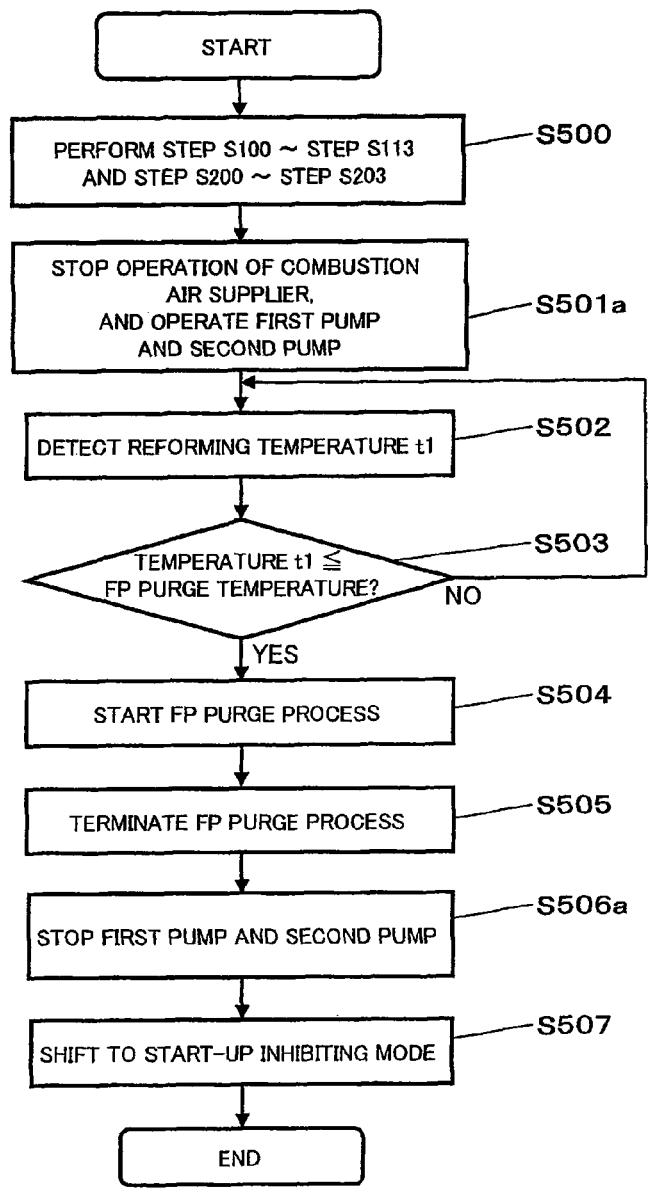
FIG. 16 is a flowchart showing an abnormal shut-down process in a fuel cell system according to Embodiment 7 of the present invention.

FIG. 16 is a flowchart showing the abnormal shut-down process in the fuel cell system 100 according to Embodiment 7.

As shown in FIG. 16, when the abnormality determiner 110a determines that there is an abnormality which is followed by the shut-down of the fuel cell system 100, the shut-down operation similar to that in the normal shut-down process is performed until the cathode purge process in the normal shut-down process terminates (step S100~step S113 in FIG. 4A and step S200~step S203 in FIG. 4B) (step S501). Thereafter, when the temperature t1 of the reformer reaches a temperature which is not higher than the stand-by temperature because of the cooling operation of the hydrogen generator 102 by the combustion air supplier 117, the operation of the combustion air supplier 117 is stopped and the cooling operation of the hydrogen generator 102 is stopped. On the other hand, the operation of the first pump 107 and the operation of the second pump 108 continue, and the exhaust heat recovery operation of the fuel cell 101 is performed (step S501a).

The temperature detector attached to the reformer detects the temperature t1 of the reformer in the above cooling operation (step S502). When the temperature t1 detected by the temperature detector reaches a temperature which is not higher than a second purge temperature (step S503), the FP purge process similar to that in the normal shut-down process is performed (step S504). That is, step S120~step S124 shown in FIG. 4B are performed. Then, when the FP purge process terminates (step S505), the controller 110 stops the operation of the first pump 107 and the operation of the second pump 108 (step S506a) and shifts the fuel cell system 100 to the start-up inhibiting mode (step S507).

In accordance with the fuel cell system 100 of Embodiment 7, the abnormal shut-down process is performed in such a manner that the fuel cell 10 is cooled with a higher amount in the abnormal shut-down process than in the normal shut-down process. Therefore, the temperatures of the components within the fuel cell system 100 for which the maintenance operation should be performed, are more quickly lowered to temperatures at which the operator will not get burnt, etc, thereby enabling the operator to start the maintenance operation at an earlier time. On the other hand, the hydrogen generator 102 is cooled in such a manner that when the temperature t1 of the reformer reaches a temperature which is not higher than the stand-by temperature, the operation of the combustion air supplier 117 stops and the hydrogen generator 102 including the reformer is naturally cooled, similarly to the normal shut-down process. Since the combustion air supplier 117 is controlled to allow the reformer to be cooled with an amount equal to the amount of the cooling in the normal shut-down process, the amount of the cooling of the hydrogen generator 102 which does not require the maintenance operation is suppressed. Therefore, at next start-up, an energy required to raise the temperature of the hydrogen generator 102 is reduced and a time required for the start-up process is reduced. As a result, the start-up of the fuel cell system 100 is facilitated.

On the other hand, in the normal shut-down process which does not require the maintenance operation, advantages similar to those of the fuel cell system 100 of Embodiment 2 are achieved.

Although the fuel cell system 100 of Embodiment 7 has a configuration which is basically identical to that of the fuel cell system 100 of Embodiment 2, and its operation (operation such as the power generation operation of the fuel cell system 100) is different from that of the fuel cell system 100 of Embodiment 2, the present invention is not limited to this, but the fuel cell system 100 of Embodiment 7 may have a configuration which is basically identical to that of the fuel cell system 100 of Embodiment 3 and its operation may be as described above.

Embodiment 8

A fuel cell system according to Embodiment 8 of the present invention includes a hydrogen generator including a reformer configured to generate a hydrogen-containing gas through a reforming reaction using a raw material, a combustor configured to heat the reformer, and a combustion air supplier configured to supply combustion air to the combustor. For example, the controller is configured to control the combustion air supplier so that the reformer is cooled with a higher amount than in the normal shut-down process, and control the first flow control device such that the fuel cell is cooled with an amount equal to the amount of the cooling in the normal shut-down process, in a case where the abnormality detector detects an abnormality associated with the hydrogen generator.

As used herein "abnormality associated with hydrogen generator" refers to abnormalities associated with components constituting the hydrogen generator. For example, there are an abnormality of a material gas flow rate, a temperature abnormality of the reformer, a combustion abnormality of the burner, etc.

The fuel cell system 100 of Embodiment 8 of the present invention is different from the fuel cell system 100 of Embodiment 2 in the shut-down step after detecting the abnormality based on the detected values of the detector 131~145 and the following abnormality detection/shut-down process. To be specific, the fuel cell system 100 of Embodiment 8 is different from the fuel cell system 100 of Embodiment 2 in the abnormal shut-down process in a case where the abnormality associated with the hydrogen generator 102 is detected.

Now, the configuration of the hydrogen generator 102 will be described with reference to FIG. 17.

Figure 17:
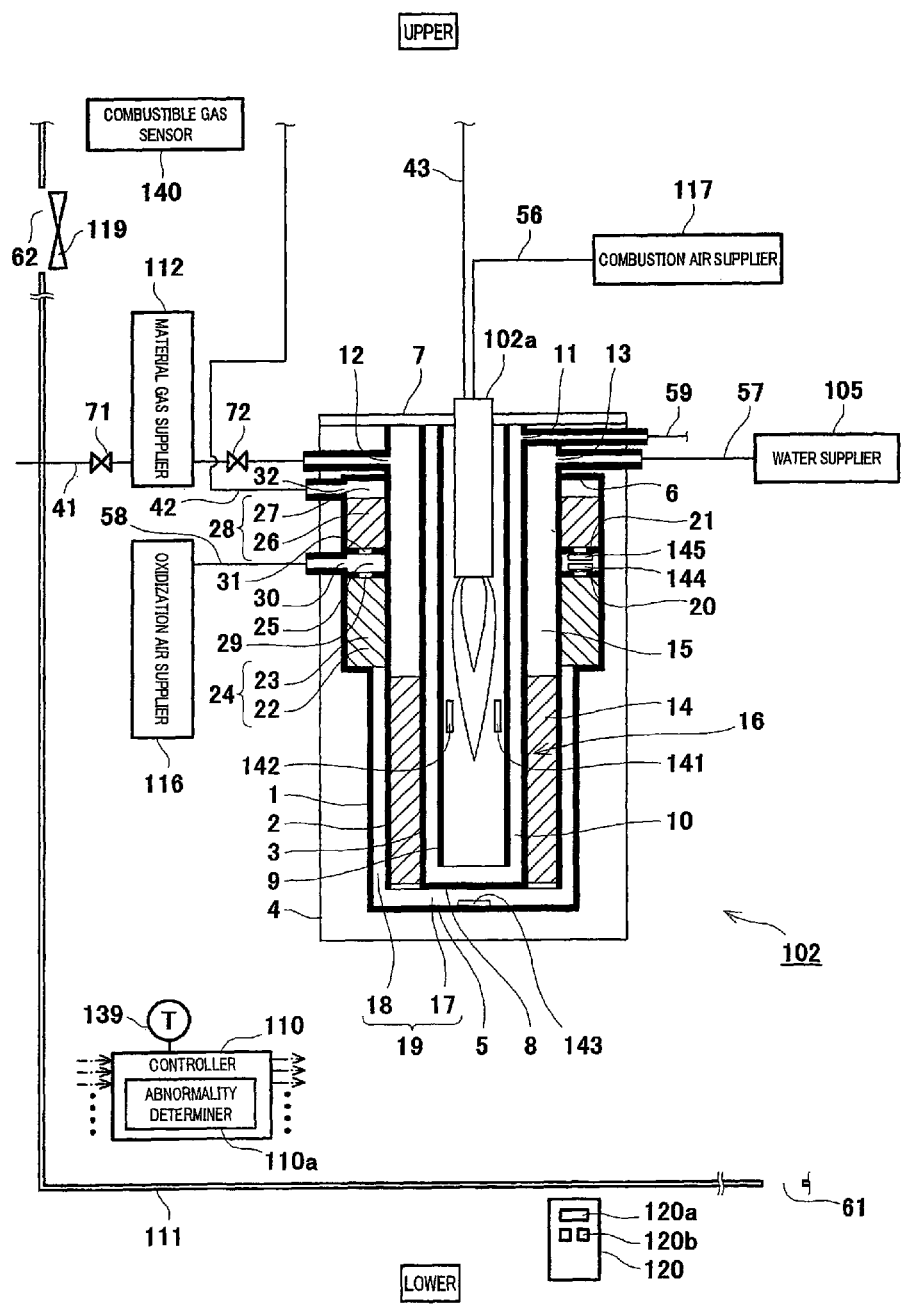
FIG. 17 is a schematic view showing in detail a configuration of a hydrogen generator in the fuel cell system of FIG. 2.
Figure 20:
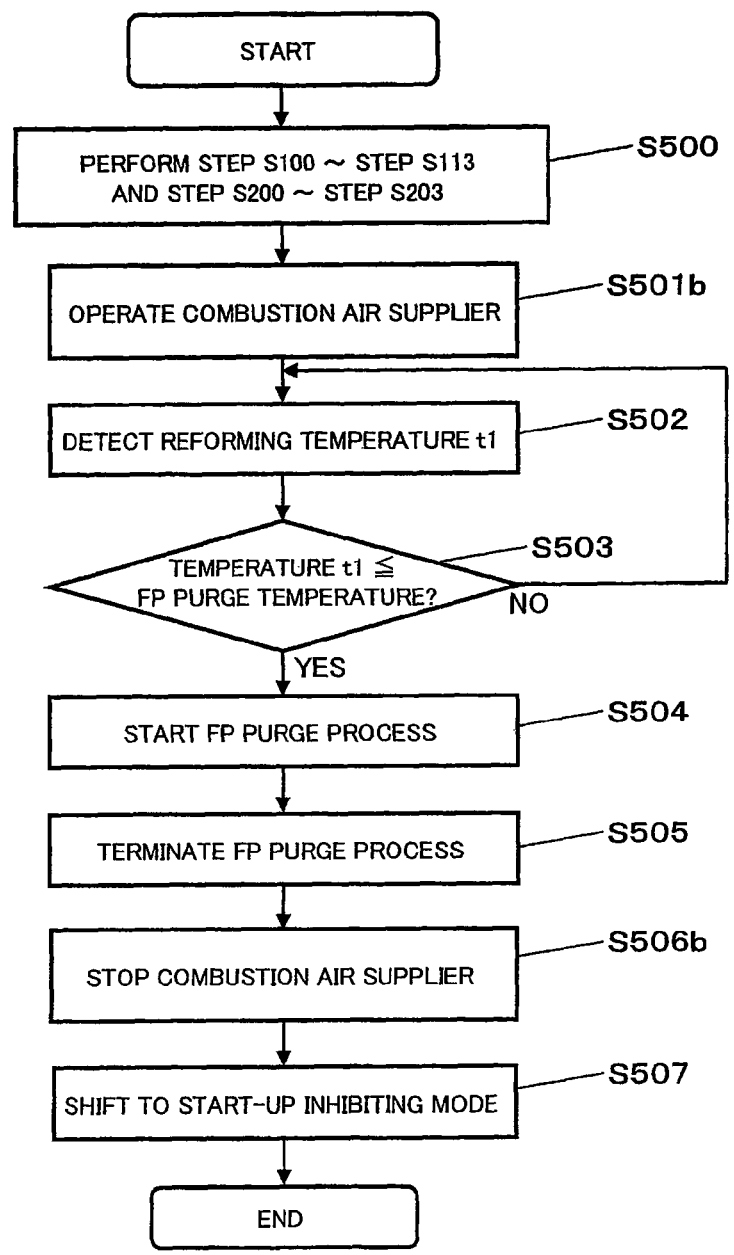
FIG. 20 is a flowchart showing in detail an abnormal shut-down process associated with the hydrogen generator in the flowchart of the abnormal shut-down process program shown in FIG. 19.

FIG. 17 is a schematic view showing in detail the configuration of the hydrogen generator 102 in the fuel cell system 100 of FIG. 2. In FIG. 20, the upper and lower sides of the fuel cell system 100 are upper and lower sides in this Figure.

As shown in FIG. 17, the hydrogen generator 102 of the fuel cell system 100 of Embodiment 8 has a cylindrical shape and includes a container 1, an outer tube 2 and an inner tube 3, which have a common center axis. The container 1 is formed by a stepped cylinder in which its upper portion is a large-diameter portion and its lower portion is a small-diameter portion which is smaller in diameter than the large-diameter portion. The lower end of the container 1 is closed by a bottom plate 5, while the upper end thereof is connected to the outer tube 2 via an annular plate member 6. A heat insulating member 4 is provided outside the container 1 to cover the container 1.

The upper end of the outer tube 2 and the upper end of the inner tube 3 are closed by a lid member 7. On the other hand, the lower end of the outer tube 2 is opened and the lower end of the inner tube 3 is closed by an inner tube bottom plate 8. A cylindrical radiation tube 9 is provided inside the inner tube 3.

The upper end of the radiation tube 9 is closed by the lid member 7, while the lower end thereof is opened. A tubular space formed between the radiation tube 9 and the inner tube 3 forms a combustion exhaust gas passage 10. A combustion exhaust gas outlet 11 is provided in the vicinity of the downstream end of the combustion exhaust gas passage 10 (upper portion of the inner tube 3). The upstream end of the combustion exhaust gas path 59 is connected to the combustion exhaust gas outlet 11, while the downstream end thereof is opened outside the package 111.

A burner (combustor) 102a is provided inside the radiation tube 9 to penetrate the lid member 7 and extend downward. Inside the radiation tube 9, an ignition detector 141 and a CO sensor 142 are provided. The ignition detector 141 is configured to detect whether or not ignition has occurred in the burner 102a and output a detection signal to the controller 110. The CO sensor 142 is configured to detect a concentration of carbon monoxide contained in a combustion exhaust gas from the burner 102a and output a detection signal to the controller 110. A flame rod is used as the ignition detector 141, while a CO concentration sensor is used as the CO sensor 142.

The downstream end of the combustion air supply path 56 is connected to the burner 102a, while the upstream end thereof is connected to the combustion air supplier 117. As the combustion air supplier 117, for example, fans such as a blower and a sirocco fan may be used.

A material gas supply inlet 12 is provided at the upper portion of the outer tube 2. The downstream end of the material gas supply path 41 is connected to the material gas supply inlet 12. As the material gas, a city gas containing methane as a major component is used. The upstream end of the material gas supply path 41 is connected to a pipe (not shown) of the city gas. The material gas supply path 41 is provided with the first on-off valve (sealing device) 71, the material gas supplier 112, and the second on-off valve (sealing device) 72 in this order from its upstream side. The first on-off valve 71 and the second on-off valve 72 are configured to permit/inhibit the flow of the material gas through the material gas supply path 41, and may be, for example, an electromagnetic valve. The material gas supplier 112 is a device configured to control the flow rate of the material gas supplied to the hydrogen generator 102, and may be constituted by, for example, a combination of the booster pump 112a and the flow control valve 112b, or a single flow control valve (see FIG. 2).

A water supply inlet 13 is provided at the upper portion of the outer tube 2. The downstream end of a reforming water supply path 57 is connected to the water supply inlet 13. The water supplier 105 is connected to the upstream end of the reforming water supply path 57. The water supplier 105 is configured to supply reforming water to the reforming water supply path 57 and control the flow rate of the reforming water flowing through the reforming water supply path 57.

A reforming catalyst accommodating space is formed in the lower portion of the tubular space between the outer tube 2 and the inner tube 3. A reforming catalyst layer 14 filled with a reforming catalyst is formed in the reforming catalyst accommodating space. A preheater 15 is formed above the reforming catalyst accommodating space to preheat the material gas and the reforming water. The reformer 16 is composed of the reforming catalyst accommodating space, the reforming catalyst layer 14 and the preheater 15. In the reformer 16, the preheater 15 preheats the material gas (methane) supplied from the material gas supplier 112 and the reforming water supplied from the water supplier 105, by utilizing heat transmission of the combustion exhaust gas generated in the burner 102a, and the reforming catalyst layer 14 causes the material gas and reforming water preheated to go through the steam reforming reaction, generating a hydrogen-containing gas.

A space is formed between the bottom plate 5 and the inner tube bottom plate 8 and forms a buffer space 17. A temperature detector 143 is attached to the center portion of the bottom plate 5 in the buffer space 17.

The temperature detector 143 is configured to detect the temperature of the hydrogen-containing gas which has flowed through the reformer 16 and output the detected temperature to the controller 110 as the temperature of the reformer 16. Although in this embodiment, the temperature detector 143 is provided below the downstream end of the reformer 16 and is configured to detect the temperature of the hydrogen-containing gas which has flowed through the reformer 16, the present invention is not limited to this. The temperature detector 143 may be provided inside the reforming catalyst layer 14 of the reformer 16 and detect the temperature of the hydrogen-containing gas flowing through the reforming catalyst layer 14 of the reformer 16.

A tubular space 18 is formed between the container 1 and the outer tube 2 and is connected to the buffer space 17. A hydrogen-containing gas passage 19 is constituted by the space 18 and the buffer space 17. Thus, a hydrogen-containing gas which has flowed through the reformer 16 outflows through the downstream end of the reforming catalyst layer 14 to the buffer space 17, contacts the bottom wall of the bottom plate 5, is inverted and then flows through a hydrogen-containing gas passage 19.

A pair of separating plates 20 and 21 are provided in the tubular space between the large-diameter portion of the container 1 and the outer tube 2 above the hydrogen-containing gas passage 19 such that the separating plates 20 and 21 are axially spaced a predetermined distance apart from each other. The pair of separating plates 20 and 21 separate the tubular space into a shift catalyst accommodating space 22, an air mixing section 25 and an oxidization catalyst accommodating space 26.

A shift catalyst layer 23 filled with a shift catalyst is formed inside the shift catalyst accommodating space 22. A shift converter 24 is composed of the shift catalyst accommodating space 22 and the shift catalyst layer 23. The separating plate 20 is provided with a plurality of through-holes 2 for connecting the shift converter 24 to the air mixing section 25. The through-holes 29 constitute an outlet 29 of the shift converter 24. Thereby, the hydrogen-containing gas which has flowed through the hydrogen-containing gas passage 19 flows into the shift converter 24. While the hydrogen-containing gas is flowing through the shift catalyst layer 23, a shift reaction occurs between carbon monoxide in the hydrogen-containing gas and water to generate carbon dioxide and hydrogen, thereby reducing carbon monoxide. The hydrogen-containing gas, carbon monoxide of which has been reduced, outflows through the outlet 29 of the shift converter 24 into the air mixing section 25.

The container 1 forming the air mixing section 25 is provided with an air supply inlet 30 through which air for oxidization reaction of carbon monoxide is supplied. The downstream end of the oxidization air supply path 58 is connected to the air supply inlet 30, while the upstream end thereof is connected to the oxidization air supplier 16. In this configuration, the hydrogen-containing gas which has outflowed through the outlet 29 of the shift converter 24 into the air mixing section 25 is mixed with the air supplied from the oxidization air supplier 116.

A temperature detector 144 is provided in the air mixing section 25 above the outlet 29 of the shift converter 24. The temperature detector 144 is configured to detect the temperature of the hydrogen-containing gas which has flowed through the shift converter 24 and output the detected temperature to the controller 110 as the temperature of the shift converter 24. Although in this embodiment, the temperature detector 144 is provided above the outlet 29 of the shift converter 24 and is configured to detect the temperature of the hydrogen-containing gas which has flowed through the shift converter 24, the present invention is not limited to this. The temperature detector 144 may be provided inside the shift catalyst layer 23 of the shift converter 24 to detect the temperature of the hydrogen-containing gas flowing through the shift catalyst layer 23 of the shift converter 24.

An oxidization catalyst layer 27 filled with the oxidization catalyst is formed inside the oxidization catalyst accommodating space 26. A purifier 28 is composed of the oxidization catalyst accommodating space 26 and the oxidization catalyst layer 27. The separating plate 21 is provided with a plurality of through-holes 31 for allowing communication between the air mixing section 25 to the purifier 28. The through-holes 31 constitute an inlet 31 of the purifier 28. A temperature detector 145 is provided in the air mixing section 25 below the inlet 31 of the purifier 28. The temperature detector 145 detects the temperature of a mixture gas of the hydrogen-containing gas and air flowing into the purifier 28 and output the detected temperature to the controller 110 as the temperature of the purifier 28. Although in this embodiment, the temperature detector 145 is provided below the inlet 31 of the purifier 28 and is configured to detect the temperature of the fuel gas before flowing through the purifier 28, the present invention is not limited to this. The temperature detector 145 may be provided inside the oxidization catalyst layer 27 of the purifier 28 and may be configured to detect the temperature of the fuel gas flowing through the oxidization catalyst layer 27 of the purifier 28.

A fuel gas outlet 32 is provided at the upper portion of the container 1 forming the oxidization catalyst accommodating space 26. The upstream end of the fuel gas supply path 42 is connected to the fuel gas outlet 32, while the downstream end thereof is connected to the fuel cell 101 (see FIG. 2).

Thereby, the hydrogen-containing gas which has been mixed with air in the air mixing section 25 flows into the purifier 28 through the through-holes 31 (inlet 31 of the purifier 28) of the separating plate 21, carbon monoxide in the hydrogen-containing gas reacts with oxygen in air while flowing through the oxidization catalyst layer 27, to generate the fuel gas, a carbon monoxide of which has been reduced to several ppm. The generated fuel gas flows to the fuel gas supply path 42 through the fuel gas outlet 32 and is supplied to the fuel cell 101.

Although the hydrogen generator 102 of this embodiment is provided with the shift converter 24 and the purifier 28, the shift converter 24 and the purifier 28 may be omitted if it is not necessary to further reduce carbon monoxide contained in the hydrogen-containing gas generated in the reformer 16. For example, if the fuel cell 101 is a device (e.g., solid oxide fuel cell) which is poisoned less easily by carbon monoxide, the above configuration may be used.

Next, a step of detecting the abnormality based on the values detected by the detectors 131~145 in the fuel cell system 100 of Embodiment 8 and the following abnormal detection/shut-down process will be described.

Firstly, the abnormality associated with the hydrogen generator 102, among the abnormalities detected by the abnormality detector in the fuel cell system 100 of Embodiment 8 will be described with reference to FIG. 18. FIG. 18 is a table showing examples associated with the hydrogen generator 102 of the present invention. When the abnormality detector detects the abnormality associated with the hydrogen generator 102, the shut-down process of the operation of the fuel cell system 100 starts.

As shown in FIG. 18, a burner flame extinguishment abnormality is determined as the first abnormality. This abnormality is merely exemplary and abnormalities other than this abnormality may be determined as the first abnormality.

The burner flame extinguishment abnormality means that an ignition detector 141 does not detect the ignition of the burner 102a during a hydrogen generation operation after a hydrogen generation reaction in the hydrogen generator 102 starts. Therefore, this abnormality does not include an ignition abnormality at the start of the combustion in the burner 102a in the start-up process of the hydrogen generator 102, but refers to a flame extinguishment abnormality occurring during the start-up process and during the supply of the fuel gas to the hydrogen utilizing device 101 after the burner 102 stably performs the combustion, the temperature of the hydrogen generator 102 rises and the hydrogen generator 102 shifts to the steam reforming reaction.

If the same first abnormality is detected several times (e.g., three times) per week or twice in succession after the re-start-up, for example, this abnormality is determined as the second abnormality and the shut-down process corresponding to this abnormality is performed.

As shown in FIG. 18, in this embodiment, as the second abnormality, there are failures of components (e.g., failure of temperature detector, failure of CO sensor, and failure of combustion air supplier), gas leakage abnormalities (e.g., combustible gas leakage abnormality), detected temperature abnormalities of the temperature detectors (e.g., excess increase and excess decrease in the reforming temperature). These abnormalities are merely exemplarily and a part of these abnormalities may be determined as the second abnormality or abnormalities other than these abnormalities may be determined as the second abnormality.

The abnormality with which the failure of the temperature detector is assumed is, for example, abnormality in which in a case where the temperature detectors 143~145 are thermisters, the detected values indicate a short-circuit or disconnection. In this embodiment, this abnormality is determined as the second abnormality and the shut-down process corresponding to this abnormality is performed.

The abnormality with which the failure of the CO sensor is assumed, is, for example, an abnormality in which in a case where the CO sensor 142 is a contact combustion sensor, the value detected by this sensor indicates disconnection of an electric resistance. In this embodiment, this abnormality is determined as the abnormality which is followed by the shut-down of the operation of the hydrogen generator 102.

The abnormality with which the failure of the combustion air supplier is assumed is, for example, an abnormality in which the number of rotations of the combustion air supplier 117 is outside an allowable range with respect to the operation amount of the combustion air supplier 117 commanded by the controller 110 (e.g., the rotation number does not reach a target rotation number for a predetermined time or longer even though the operation amount is set larger with respect to a set operation amount corresponding to the target rotation number). This abnormality may possibly occur when a desired rotation number corresponding to a command value of the operation amount cannot be obtained because of degradation of a motor. Therefore, this abnormality is determined as the abnormality with which the failure of the combustion air supplier is assumed and as the second abnormality in this embodiment.

The combustible gas leakage abnormality refers to an abnormality in which the combustible gas sensor 140 detects a combustible gas. For example, this abnormality may occur when a combustible gas (material gas, fuel gas, and other gases) leaks into the package 111 and the combustible gas sensor 140 detects the combustible gas. In this embodiment, this abnormality is determined as the second abnormality.

For the failure of each abnormality detector, among the illustrated abnormalities, the abnormality determiner 110a operates as an abnormality detector of the present invention, while for abnormalities different from the failures of the detectors, the abnormality determiner 110a and a detector for outputting a detected value used to determine whether or not there is an abnormality, operate as the abnormality detector of the present invention.

Next, the abnormality detection in the fuel cell system 100 of Embodiment 8 and the following shut-down process (abnormal detection/shut-down process) will be described.

Figure 19:
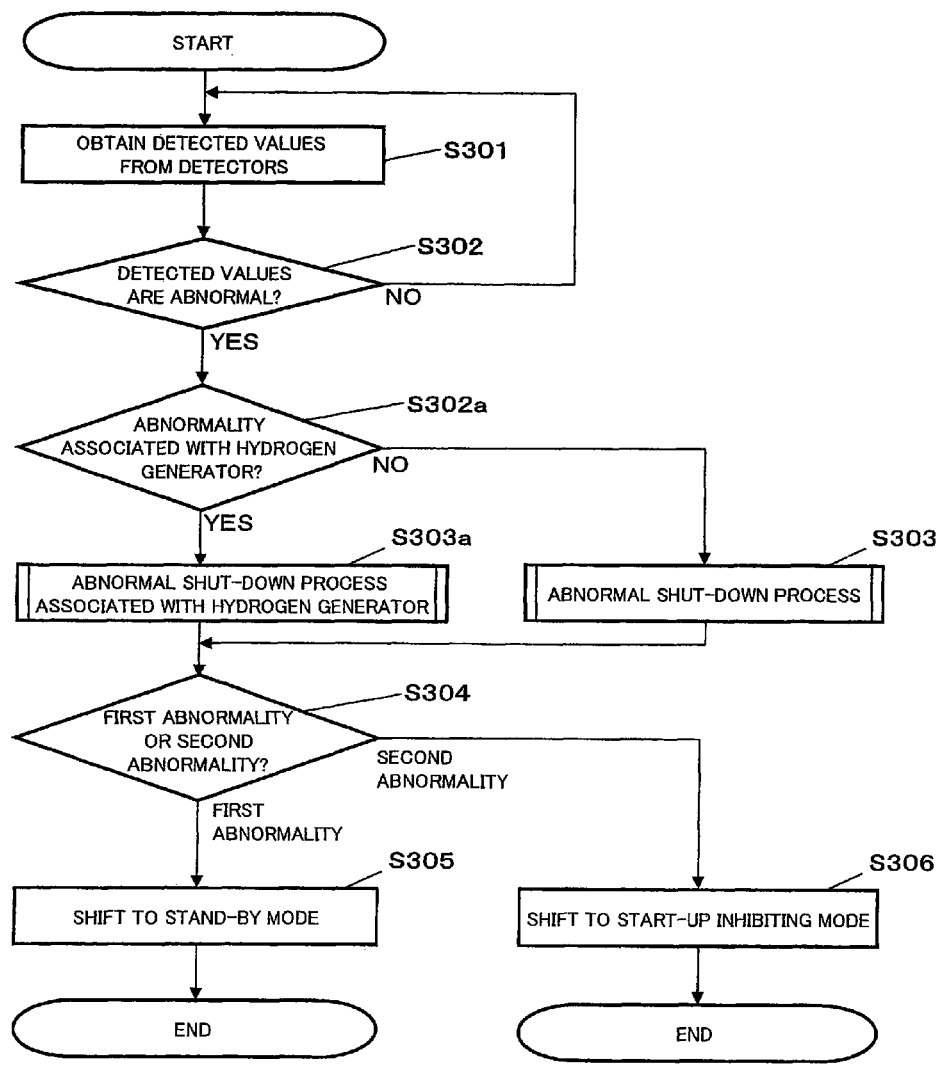
FIG. 19 is a flowchart schematically showing a content of the shut-down process program stored in the memory section of the controller in the fuel cell system of FIG. 2, which is associated with abnormality detection.

FIG. 19 is a flowchart schematically showing a content of the shut-down process program stored in the memory section of the controller 110 in the fuel cell system 100 of FIG. 2, which is associated with the abnormality detection.

As shown in FIG. 19, similarly to the fuel cell system 100 of Embodiment 2, during the power generation operation of the fuel cell system 100, the calculation section of the controller 110 obtains the values detected by the detectors 131~145 (step S301) and determines whether or not the values detected in step S301 are abnormal (step S302). If it is determined that these detected values are not abnormal, the process returns to step S301, and step S301 and step S302 are repeated to monitor the presence/absence of abnormality unless any abnormality is detected. On the other hand, if it is determined that any one of these detected values is abnormal, the process goes to step S302a.

In step S302a, the controller 110 determines whether or not the abnormality determined by the abnormality determiner 110a in step S302 is the abnormality associated with the hydrogen generator 102. If it is determined that this abnormality is the abnormality associated with the hydrogen generator 102, the process goes to step S303a, whereas if it is determined that this abnormality is not the abnormality associated with the hydrogen generator 102, the process goes to step S303.

In step S303a, the abnormal shut-down process associated with the hydrogen generator is performed. When this shut-down process terminates, the process goes to step S304. On the other hand, in step S303, like the fuel cell system 100 of Embodiment 2, the shut-down process (abnormal shut-down process) corresponding to the abnormality determined by the abnormality determiner 110 is performed under the control of the controller 110. When this shut-down process terminates, the process goes to step S304.

If the abnormality determined by the abnormality determiner 110a is the first abnormality in step S304, the process goes to step S305, whereas if the abnormality determined by the abnormality determiner 110a is the second abnormality in step S304, the process goes to step S306.

In step S305, when the abnormal shut-down process terminates, the hydrogen generator 102 shifts to the stand-by mode and the program ends. On the other hand, in step S306, the fuel cell system 100 shifts to the start-up inhibiting mode in which the fuel cell system 100 is not permitted to start-up, regardless of a start-up request generated, and this program ends. The same abnormal shut-down process is not performed for each abnormality but a predetermined restoration process is performed for each abnormality.

Now, the abnormal shut-down process in the case of a failure of the temperature detector 143, which is an example of the abnormality associated with the hydrogen generator 102 will be described. FIG. 20 is a flowchart showing in detail an abnormal shut-down process associated with the hydrogen generator 102 in the flowchart of the abnormal shut-down process program shown in FIG. 19. Although the failure of the temperature detector 137 belongs to the second abnormality associated with the hydrogen generator 102, the following abnormal shut-down process is configured such that the cooling operation of the hydrogen generator 102 is performed in the same manner when the abnormality associated with the hydrogen generator 102 is detected as well as when the second abnormality associated with the hydrogen generator 102 is detected. In other words, when the first abnormality associated with the hydrogen generator 102 is detected, the cooling operation of the hydrogen generator 102 is also performed in the same manner.

As shown in FIG. 20, when the value detected by the temperature detector 137 indicates a short-circuit or disconnection, and the abnormality determiner 110a determines this is an abnormality associated with the hydrogen generator 102, the controller 110 performs the shut-down operation similar to that in the normal shut-down process until the cathode purge process in the normal shut-down process terminates (step S100~step S113 in FIG. 4A) (step S500). Thereafter, the controller 110 causes the combustion air supplier 117 to operate to perform the cooling operation of the hydrogen generator 102, after the temperature t1 of the reformer 16 reaches a temperature which is not higher than the stand-by temperature because of the cooling operation of the hydrogen generator 102 by the combustion air supplier 117 (step S501b).

The controller 110 causes the temperature detector attached to the reformer to detect the temperature t1 of the reformer in the cooling operation (step S502), and when the temperature t1 detected by the temperature detector reaches a temperature which is not higher than the FP purge temperature (step S503), the FP purge process similar to that in the normal shut-down process is performed (step S504). In other words, step S120~step S124 shown in FIG. 4B are performed.

Thereafter, when the FP purge process terminates (step S505), the controller 110 stops the operation of the combustion air supplier 117 (step S506b), and shifts the fuel cell system 100 to the start-up inhibiting mode (step S507).

The controller 110 performs the exhaust heat recovery operation of the fuel cell 101 similarly to the exhaust heat recovery operation in the normal shut-down process. That is, the exhaust heat recovery operation shown in FIG. 5 is performed.

As should be appreciated, the fuel cell system 100 of Embodiment 8 achieves the same advantages as those of the fuel cell system 100 of Embodiment 2 in the normal shut-down process and when the abnormality of the components of the fuel cell system 100 which is not associated with the hydrogen generator 102 occurs.

In the fuel cell system 100 of Embodiment 8, when the abnormality associated with the hydrogen generator 102 occurs, the abnormal shut-down process is performed in such a manner that the hydrogen generator 102 is cooled with a higher amount than in the normal shut-down process. Therefore, the temperature of the hydrogen generator 102 which requires the maintenance operation is more quickly lowered to a temperature at which the maintenance operator will not get burnt, etc, enabling the maintenance operator to start the maintenance operation at an earlier time. On the other hand, the amount of the cooling of the fuel cell 101 which does not require the maintenance operation is suppressed. Therefore, at next start-up, an energy required to raise the temperature of the fuel cell 101 is reduced and a time required for the start-up process is reduced. As a result, the start-up of the fuel cell system 100 is facilitated.

Although in Embodiment 8, the abnormal shut-down process similar to that in the fuel cell system 100 of Embodiment 2 is performed when the abnormality of the components of the fuel cell system 100 which is not associated with the hydrogen generator 102 occurs, the present invention is not limited to this, but the abnormal shut-down process similar to that in the fuel cell system 100 of Embodiment 7 may be performed.

In the cooling operation of the hydrogen generator 102 in the abnormal shut-down process, the amount of combustion air supplied to the burner 102a is desirably controlled to be more than the amount of combustion air supplied to the burner 102a during a rated operation of the hydrogen generator 102. To be specific, in the cooling operation of the hydrogen generator 102 in the abnormal shut-down process associated with the hydrogen generator 102, the controller 110 causes the operation amount to be larger than the operation amount during the rated operation of the hydrogen generator 102. This makes it possible to quickly lower the temperature of the hydrogen generator 102, thereby facilitating shifting to the maintenance operation. As defined herein, the rated operation of the hydrogen generator 102 refers to an operation in which the hydrogen generator 102 is supplying hydrogen with a maximum possible amount stably during a hydrogen supply operation of the hydrogen generator 102.

Embodiment 9

In a fuel cell system according to Embodiment 9 of the present invention, for example, the controller is configured to control the first flow control device such that that the fuel cell is cooled with a higher amount in the abnormal shut-down process performed after the abnormality detector detects the second abnormality which requires a maintenance operation than in the abnormal shut-down process performed after the abnormality detector detects the first abnormality which does not require the maintenance operation.

Figure 21:
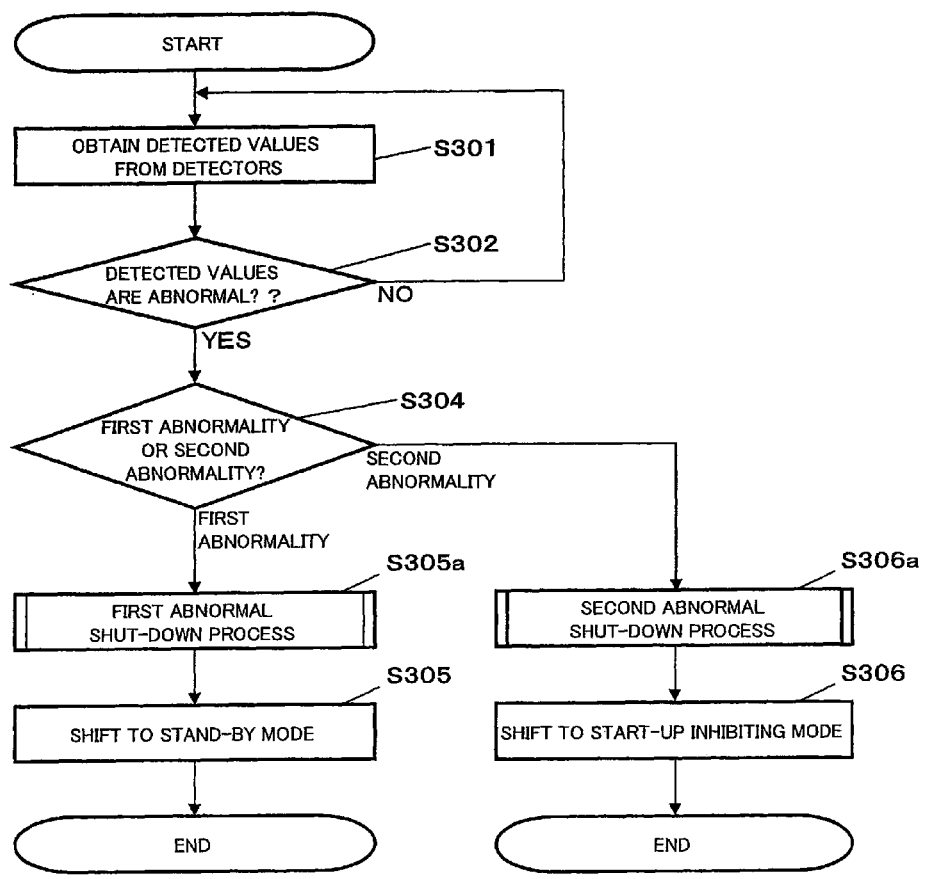
FIG. 21 is a flowchart schematically showing a content of an abnormality detection/shut-down process program stored in a memory section of a controller in a fuel cell system according to Embodiment 9 of the present invention.

FIG. 21 is a flowchart schematically showing a content of an abnormality detection/shut-down process program stored in a memory section of the controller 110 in the fuel cell system 100 according to Embodiment 9 of the present invention.

Initially, during the power generation operation of the fuel cell system 100, the calculation section of the controller 110 obtains the detected values from the detectors 131~140 (step S301) and determines whether or not the detected values obtained in step S301 are abnormal (step S302). If it is determined that these detected values are not abnormal, the process returns to step S301, and step S301 and step S302 are repeated to monitor the presence/absence of abnormality, unless any abnormality is detected On the other hand, if it is determined that any one of these detected values is abnormal, the process goes to step S304.

If the abnormality determined by the abnormality determiner 110a is the first abnormality in step S304, the process goes to step S305a, whereas if the abnormality determined by the abnormality determiner 110a is the second abnormality, the process goes to step S306a.

In step S305a, the first abnormal shut-down process corresponding to each abnormality determined by the abnormality determiner 110a is performed under control of the controller 110. When this shut-down process terminates, the fuel cell system 100 shifts to the stand-by mode (step S305). The same first abnormal shut-down process is not performed for each abnormality but a predetermined restoration process is carried out for each abnormality. It should be noted that the cooling operation common to the respective abnormalities (cooling operation of the hydrogen generator, exhaust heat recovery operation of the fuel cell, etc) are carried out.

In step S306a, the second abnormal shut-down process corresponding to each abnormality determined by the abnormality determiner 110a is performed under control of the controller 110. When this shut-down process terminates, the fuel cell system 100 shifts to the start-up inhibiting mode in which the start-up is not permitted even if a start-up request is generated (step S306). The same second abnormal shut-down process is not performed for each abnormality but a predetermined restoration process is carried out for each abnormality. It should be noted that the cooling operation common to the respective abnormalities (cooling operation of the hydrogen generator, exhaust heat recovery operation of the fuel cell, etc) is carried out.

Figure 22:
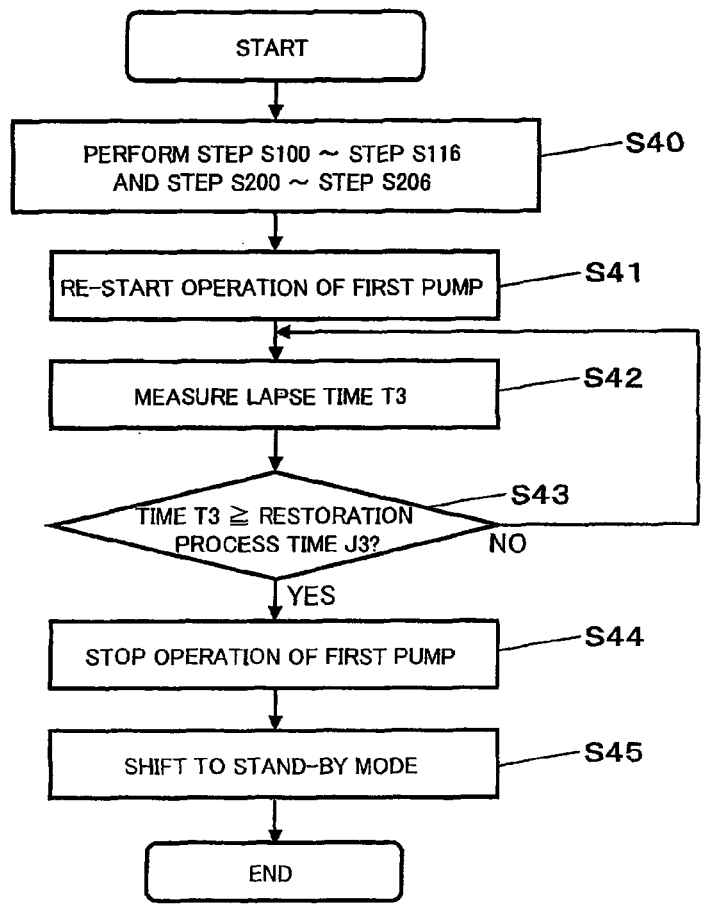
FIG. 22 is a flowchart showing in detail a first abnormal shut-down process in the flowchart of the abnormality detection/shut-down process program shown in FIG. 21.

Now, the first abnormal shut-down process in the case of the cooling water pump abnormality which is an example of the first abnormality, will be described with reference to FIG. 22. FIG. 22 is a flowchart showing in detail the first abnormal shut-down process in the flowchart of the abnormality detection/shut-down process program shown in FIG. 21.

As shown in FIG. 22, when the abnormality determiner 110a determines that the first abnormality occurs based on the value detected by a rotation detector (not shown) of the first pump 107, the controller 110 performs the shut-down operation similar to that in the normal shut-down process until the fuel cell system 100 shifts to the stand-by mode of the normal shut-down process, i.e., until the temperature t1 of the reformer reaches a temperature which is not higher than the stand-by temperature and the operation of the first pump 107 and the operation of the second pump 108 are stopped (step S100~step S116 in FIG. 4A and step S200~step S206 in FIG. 4B).

Thereafter, the restoration process corresponding to the cooling water pump abnormality starts. Initially, the operation of the first pump 107 re-starts (step S41). In this case, the controller 110 causes the operation amount of the first pump 107 to be larger than the operation amount of the first pump in the case where the fuel cell system 100 is performing a power generation operation generating maximum electric power. Then, a time T3 which lapses after the operation of the first pump 107 re-starts is measured (step S42). When the lapse time T3 reaches a time which is not less than a restoration process time J3 (Yes in step S43), the controller 110 stops the operation of the first pump 107 and terminates the abnormality restoration process (step S44). When the abnormality restoration process terminates, the controller 110 shifts the fuel cell system 100 to the stand-by mode (see step S305 in FIG. 21). The restoration process time J3 is defined as an execution time of the restoration process after which trash clogging the first pump 107 can be presumed as discarded from the first pump 107 when the abnormality occurs in the first pump 107 due to the trash.

The controller 110 is configured to permit the start-up process of the fuel cell system 100 when the user operates the key operation section 120b of the remote control device 120 to send a start-up request signal to the communication section of the controller 110, in the case where each of the detectors 131~140 detects the first abnormality.

On the other hand, the second abnormal shut-down process in the fuel cell system 100 according to Embodiment 9 is similar to the abnormal shut-down process in the fuel cell system 100 according to Embodiment 2. To be specific, the controller 110 performs the abnormal shut-down process shown in FIG. 8. In the second abnormal shut-down process in the fuel cell system 100 of Embodiment 9, similarly to the abnormal shut-down process of the fuel cell system 100 of Embodiment 2, the cooling operation of the hydrogen generator 102 and the exhaust heat recovery operation of the fuel cell 101 are performed. In addition, the control for the hot water temperature shown in FIG. 9 is performed concurrently with the exhaust heat recovery operation of the fuel cell 101.

Now, comparison between the second abnormal shut-down process and the first abnormal shut-down process will be made. In the second abnormal shut-down process, instead of waiting for the hydrogen generator 102 to be naturally cooled like the first abnormal shut-down process in a period from when the temperature of the reformer reaches a temperature which is not higher than the stand-by temperature until the temperature of the reformer reaches a FP purge process temperature (temperature which is not higher than the FP purge temperature), the combustion air supplier 117 performs the cooling operation of the hydrogen generator 102 and the first pump 107 and the second pump 108 perform the exhaust heat recovery operation of the fuel cell 101 to more quickly cool the hydrogen generator 102 and the fuel cell 101.

In the fuel cell system 100 of Embodiment 9 configured as described above, the fuel cell 101 and the hydrogen generator 102 are cooled with a higher amount in the second abnormal shut-down process than in the first abnormal shut-down process so that the temperatures of the components in the fuel cell system 100 are more quickly lowered to the temperatures at which the maintenance operator will not get burnt, etc, thereby facilitating shifting to the maintenance operation.

On the other hand, since the fuel cell 101 and the hydrogen generator 102 are cooled with a lower amount in the first abnormal shut-down process than in the second abnormal shut-down process, the temperatures of the components (e.g., reformer) constituting the fuel cell system 100 are higher than ambient temperature (outside air temperature), depending on the time which lapses from when the fuel cell system 100 shifts to the stand-by mode. Therefore, an energy required to raise the temperature of the fuel cell system 100 is reduced, and a time required for the start-up process is reduced. As a result, the start-up of the fuel cell system 100 is facilitated.

Although in Embodiment 9, the fuel cell 101 and the hydrogen generator 102 are cooled with a higher amount by causing the combustion air supplier 117 to cool the hydrogen generator 102 for a longer time and by causing the first pump 107 and the second pump 108 to recover the exhaust heat from the fuel cell 101 for a longer time in the second abnormal shut-down process than in the first abnormal shut-down process, the present invention is not limited to this. Alternatively, the fuel cell 101 and the hydrogen generator 102 may be cooled with a higher amount by causing the operation amounts of the combustion air supplier 117, the first pump 107 and the second pump 108 to be larger.

Although in Embodiment 9, the controller 110 is configured to perform the start-up process after a next start-up request (start-up request signal generated by the user using the remote control device 120) is generated, after the fuel cell system 100 shifts to the stand-by mode in the case where the first abnormality is detected, the present invention is no limited to this. Alternatively, the controller 110 may be configured to automatically shift to a next start-up process without awaiting a next start-up request after the fuel cell system 100 shifts to the stand-by mode of FIG. 21

Embodiment 10

A fuel cell system 100 according to Embodiment 10 of the present invention has a configuration which is basically identical to that of the fuel cell system of Embodiment 3 but is configured to detect the abnormality in the fuel cell system 100 and execute the following abnormality detection/shut-down process similarly to those of the fuel cell system 100 of Embodiment 9. Hereinafter, a process different from the abnormal shut-down process of the fuel cell system 100 of Embodiment 9 will be described.

Figure 23:
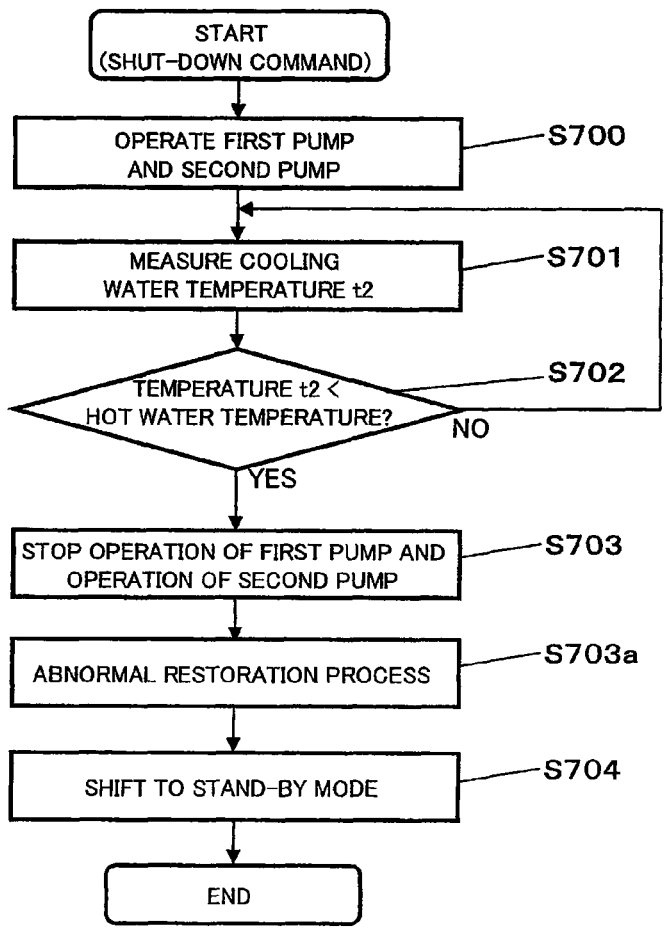
FIG. 23 is a flowchart showing an exemplary first abnormal shut-down process in a fuel cell system according to Embodiment 10 of the present invention.

FIG. 23 is a flowchart showing an exemplary first abnormal shut-down process in the fuel cell system according to Embodiment 10 of the present invention.

Initially, when the abnormality determiner 110a determines that a specified abnormality belonging to the first abnormality has occurred, the first abnormal shut-down process corresponding to the abnormality is performed. In this example, the controller 110 outputs a shut-down command and stops the supply of the fuel gas from the fuel gas supplier 200 and the supply of the oxidizing gas from the oxidizing gas supplier 103, similarly to the normal shut-down process. Further, the controller 110 closes the eighth on-off valve 201 and the fifth on-off valve 76 on the fuel gas path 202, and closes the third on-off valve 74 and the seventh on-off valve 78 on the oxidizing gas path.

After the exhaust heat recovery operation similar to that in the normal shut-down process is performed, the first pump 107 and the second pump 108 are stopped (step S700~S703). A hot water temperature in step S702 is an example of the first threshold used to determine whether or not to stop the cooling operation of the fuel cell 101. After a predetermined abnormality restoration process corresponding to each abnormality determined by the abnormality determiner 110a is performed (step S703a), the fuel cell system shifts to the stand-by mode (step S704). In the abnormality restoration process, the exhaust heat recovery operation (step S700~S703) and the abnormality restoration process (step S703a) are not necessarily performed, but may be omitted depending on the content of the abnormality.

In the fuel cell system 100 of Embodiment 10, the first abnormal shut-down process performed when the abnormality detector detects the first abnormality which does not require the maintenance operation is performed similarly to the normal shut-down process of the fuel cell system 100 of Embodiment 3, while the second abnormal shut-down process performed when the abnormality detector detects the second abnormality which requires the maintenance operation is performed similarly to the abnormal shut-down process of the fuel cell system 100 of Embodiment 3.

Since the fuel cell 101 is cooled with a higher amount in the second abnormal shut-down process than in the first abnormal shut-down process in the fuel cell system of Embodiment 10, the temperature of the fuel cell 101 and the temperatures of the components (e.g., fuel cell 101, cooling water path 104, heat exchanger 106, etc) through which the fluid flows in the fuel cell 101 are more quickly lowered to temperatures at which the maintenance operator will not get burnt, etc, thereby facilitating shifting to the maintenance operation.

On the other hand, since the fuel cell 101 is cooled with a lower amount in the first abnormal shut-down process than in the second abnormal shut-down process, the temperatures of the components (e.g., fuel cell 101) constituting the fuel cell system 100 are higher than ambient temperature (outside air temperature) depending on the time which lapses from when the fuel cell system 100 shifts to the stand-by mode. Therefore, an energy required to raise the temperature of the fuel cell 101 is reduced, and a time required for the start-up process is reduced. As a result, the start-up of the system is facilitated.

Embodiment 11

A fuel cell system 100 of Embodiment 11 of the present invention has a feature that the controller 110 controls the first flow control device in the abnormal shut-down process so that the flow rate of the cooling water flowing through the heat exchanger 106 is higher in the abnormal shut-down process (second abnormal shut-down process) associated with the second abnormality than in the abnormal shut-down process (first abnormal shut-down process) associated with the first abnormality. To be specific, the fuel cell system 100 of Embodiment 11 is different from the fuel cell system 100 of Embodiment 10 in that in the second abnormal shut-down process, the controller 110 causes the operation amount of the first pump 107 to reach a predetermined operation amount larger than the operation amount of the first pump 107 during the power generation operation of the fuel cell system 100 (hereinafter referred to as a forcible cooling operation), and controls the second heat medium switch 206 so that the hot water which has flowed through the heat exchanger 106 flows into the hot water bypass path, during the forcible cooling operation.

In the fuel cell system 100 of Embodiment 11, the normal shut-down process and the first abnormal shut-down process are performed similarly to those in the fuel cell system 100 of Embodiment 10, while the forcible cooling operation (flow shown in FIG. 13) is performed in the second abnormal shut-down process like the fuel cell system 100 of Embodiment 4. Thus, during the exhaust heat recovery operation in the abnormal shut-down process, the exhaust heat recovery operation of the fuel cell 101 is facilitated in the second abnormal shut-down process than in the first abnormal shut-down process which does not execute the forcible cooling operation.

During the forcible cooling operation in the second abnormal shut-down process, also, the controller 110 controls the second heat medium switch 206 to cause the hot water to flow into the hot water bypass path 207 like the fuel cell system 100 of Embodiment 4.

When the cooling water path has the bypass path 208 as shown in FIG. 3, the controller 110 may cause the opening degree of the mixing valve 209 toward the heat exchanger 106 to be larger than the average opening degree during the power generation operation, in the above forcible cooling operation.

Alternatively, the controller 110 may start the forcible cooling operation (step S800c) upon the start of the second abnormal shut-down process without the exhaust heat recovery operation (step S800~step S800c) similar to that during the power generation operation. In this case, the controller 110 forcibly causes the operation amount of the first flow control device (first pump) 107 to be larger than a predetermined value regardless of the temperature of the fuel cell 101, in the second abnormal shut-down process.

In the fuel cell system 100 of Embodiment 11, in the normal shut-down process and the first abnormal shut-down process, the controller 110 cools the fuel cell 101 by controlling the operation amount of the first flow control device (first pump 107) based on the temperature of the cooling water detected by the temperature detector 137, similarly to the normal shut-down process of the fuel cell system 100 of Embodiment 3. Therefore, in Embodiment 11, in the normal shut-down process and the first abnormal shut-down process, the controller 110 cools the fuel cell 101 by controlling the operation amount of the first flow control device (first pump 107) based on the temperature of the cooling water detected by the temperature detector 137, while in the second abnormal shut-down process, the controller 110 forcibly causes the operation amount of the first flow control device (first pump) 107 to be larger than a predetermined value regardless of the temperature (temperature of the cooling water detected by the temperature detector 137) of the fuel cell 101.

In the fuel cell system 100 of Embodiment 11 configured as described above, the first flow control device is controlled so that the flow rate of the cooling water flowing through the heat exchanger 106 reaches a predetermined flow rate larger than the average flow rate of the cooling water during the power generation operation. Therefore, the temperature of the fuel cell 101 and the temperature of the components (e.g., cooling water path 204, heat exchanger 106, etc) through which the fluid flows in the fuel cell 101 are more quickly lowered to temperatures at which the maintenance operator will not get burnt, etc, thereby facilitating shifting to the maintenance operation.

Embodiment 12

The fuel cell system 100 according to Embodiment 12 of the present invention has a configuration which is basically identical to that of the fuel cell system 100 of Embodiment 9 but is different from the same in that the forcible cooling operation similar to that in the abnormal shut-down process of the fuel cell system 100 of Embodiment 5 is performed.

As shown in FIG. 14, in step S800, the controller 110 performs a first cooling step of controlling the operation amount of the first pump 107 so that the temperature detected by the temperature detector 137 reaches the above predetermined temperature, similarly to the power generation operation. After the cathode purge process terminates, the controller 110 performs a second cooling step of controlling the flow rate of the cooling water flowing through the heat exchanger 106 by causing the operation amount of the first pump 107 to reach a predetermined operation amount larger than the average operation amount during the power generation amount, irrespective of the temperature detected by the temperature detector 137 (step 800c).

Thereby, during the exhaust heat recovery operation in the abnormal shut-down process, the fuel cell 101 is cooled with a higher amount in the second abnormal shut-down process than in the first abnormal shut-down process which does not perform the forcible cooling operation, thereby facilitating the exhaust heat recovery operation for the fuel cell 101.

In the fuel cell system 100 of Embodiment 12 configured as described above, the temperature of the fuel cell 101 and the temperatures of the components (e.g., cooling water path 204, heat exchanger 106, etc) through which the fluid flows in the fuel cell 101 are more quickly lowered to temperatures at which the maintenance operator will not get burnt, etc, thereby facilitating shifting to the maintenance operation, as compared to the fuel cell system 100 according to Embodiment 9.

Embodiment 13

A fuel cell system according to Embodiment 13 of the present invention is configured to perform a pressure compensation operation for supplying a gas to reactant gas paths in a sealed fuel cell, a pressure in the reactant gas paths having decreased, after the shut-down of power generation of the fuel cell. For example, the controller is configured to set the number of the pressure compensation operation more in the abnormal shut-down process associated with the second abnormality than in the abnormal shut-down process associated with the first abnormality.

The fuel cell system 100 according to Embodiment 13 of the present invention has a configuration which is basically identical to that of the fuel cell system 100 of Embodiment 9 but is different from the same in that the pressure compensation process is performed like the fuel cell system 100 of Embodiment 6. In addition, in the fuel cell system 100 of Embodiment 13, like the fuel cell system 100 of Embodiment 9, the cooling rate of the fuel cell 101 per unit time is set higher in the second abnormal shut-down process than in the first shut-down process in the exhaust heat recovery operation of the fuel cell 101 in the abnormal shut-down process. For this reason, the temperature of the fuel cell 101 is lowered at a higher pace and the pressure in the fuel cell 101 is decreased at a higher pace in the second abnormal shut-down process than in the first abnormal shut-down process. Therefore, the number of times of the pressure compensation process is set more in the second abnormal shut-down process than in the first abnormal shut-down process. Thereby, generation of an excessively negative pressure within the gas passages of the fuel cell 101 is suppressed, and as a result, the fuel cell 101 is protected.

Embodiment 14

In a fuel cell system of Embodiment 14 of the present invention, for example, in the abnormal shut-down process performed when the abnormality detector detects the first abnormality which does not require a maintenance operation, is associated with the fuel cell and is other than the abnormality associated with the hydrogen generator, the controller controls the combustion air supplier and the first control flow device such that the reformer and the fuel cell are cooled, with an amount equal to the amount of the cooling in the normal shut-down process, while in the abnormal shut-down process performed when the abnormality detector detects the second abnormality which requires the maintenance operation, is associated with the fuel cell and is other than the abnormality associated with the hydrogen generator, the controller controls the first flow control device such that the fuel cell is cooled with a higher amount than in the normal shut-down process and controls the combustion air supplier so that the reformer is cooled with an amount equal to the amount of the cooling in the normal shut-down process.

The phrase "first abnormality which does not require a maintenance operation, is associated with the fuel cell and is other than the abnormality associated with the hydrogen generator" refers to an abnormality which does not require a maintenance operation, among the abnormalities of the components associated with the power generation operation of the fuel cell, except for the hydrogen generator. For example, this abnormality is a temperature abnormality of the cooling water. The phrase "second abnormality which requires the maintenance operation, is associated with the fuel cell and is other than the abnormality associated with the hydrogen generator" refers to an abnormality which requires the maintenance operation, among the abnormalities of the components which are associated with the power generation operation of the fuel cell, except for the hydrogen generator. For example, there are water level abnormalities of the cooling water tank and the condensed water tank, a failure of a cooling water temperature detector, an oxidizing gas leakage abnormality, etc.

The fuel cell system 100 according to Embodiment 14 of the present invention has a configuration which is basically identical to that of the fuel cell system 100 of Embodiment 9 but is different from the same in the shut-down process performed after the abnormality is detected based on the values detected by the detectors 131~140. To be specific, the controller 110 performs the first abnormal shut-down process similarly to the above described first abnormal shut-down process of the fuel cell system 100 of Embodiment 9. The controller 110 performs the exhaust heat recovery operation of fuel cell 101 in the second abnormal shut-down process, similarly to the exhaust heat recovery operation in the second abnormal shut-down process of the fuel cell system 100 of Embodiment 9, and performs the cooling operation of the hydrogen generator 102 similarly to the cooling operation in the normal shut-down process. That is, the fuel cell system 100 of Embodiment 14 performs the second abnormal shut-down process (flow shown in FIG. 16) similarly to the abnormal shut-down process of the fuel cell system 100 of Embodiment 7.

In the fuel cell system 100 of Embodiment 14 configured as described above, the fuel cell 101 is cooled with a higher amount in the second abnormal shut-down process than in the normal shut-down process (and first abnormal shut-down process). Therefore, the temperatures of the components within the fuel cell system 100 for which the maintenance operation should be performed, are more quickly lowered to temperatures at which the maintenance operator will not get burnt, etc, thereby enabling the maintenance operator to start the maintenance operation at an earlier time. Regarding the hydrogen generator 102, the operation of the combustion air supplier 17 is stopped when the temperature t1 of the reformer reaches a temperature which is not higher than the stand-by temperature and the hydrogen generator 102 including the reformer is naturally cooled, similarly to the normal shut-down process. In other words, the combustion air supplier 117 is controlled so that the reformer is cooled with an amount equal to the of the cooling in the normal shut-down process, to suppress the amount of the cooling of the hydrogen generator 102 which does not require the maintenance operation. Therefore, at next start-up, an energy required to raise the temperature of the hydrogen generator 102 is reduced and a time required for the start-up process is reduced. As a result, the start-up of the fuel cell system 100 is facilitated.

Regarding the normal shut-down process and the first abnormal shut-down process which do not require the maintenance operation, the fuel cell system 100 of Embodiment 14 provides the same advantages as those achieved by the fuel cell system 100 of Embodiment 9.

Although the fuel cell system 100 of Embodiment 14 has a configuration which is basically identical to that of the fuel cell system 100 of Embodiment 9, and its operation (operation such as the power generation operation of the fuel cell system 100) is different from the same, the present invention is not limited to this. Alternatively, the fuel cell system 100 of Embodiment 14 may have a configuration which is basically identical to that of the fuel cell system 100 of Embodiment 10 and its operation may be as described above.

Embodiment 15

In a fuel cell system of Embodiment 15 of the present invention, for example, the controller is configured to control the combustion air supplier and the first flow control device such that the reformer and the fuel cell are cooled with an amount equal to the amount of the cooling in the normal shut-down process, in an abnormal shut-down process after the abnormality detector detects the first abnormality which does not require a maintenance operation and is associated with the hydrogen generator, and control the first flow control device such that the reformer is cooled with a higher amount than in the normal shut-down process and the fuel cell is cooled with an amount equal to the of the cooling in the normal shut-down process, in an abnormal shut-down process performed after the abnormality detector detects the second abnormality which requires a maintenance operation and is associated with the hydrogen generator.

The phrase "first abnormality which does not require a maintenance operation and is associated with the hydrogen generator" refers to an abnormality which does not require the maintenance operation, among abnormalities associated with components constituting the hydrogen generator. For example, there is a flame extinguishment abnormality of the burner. The phrase "second abnormality which requires a maintenance operation and is associated with the hydrogen generator" refers to an abnormality which requires the maintenance operation, among abnormalities associated with components constituting the hydrogen generator. For example, there are failures of components (failure of temperature detector, failure of CO sensor, etc), gas leakage abnormality, etc.

Figure 24:
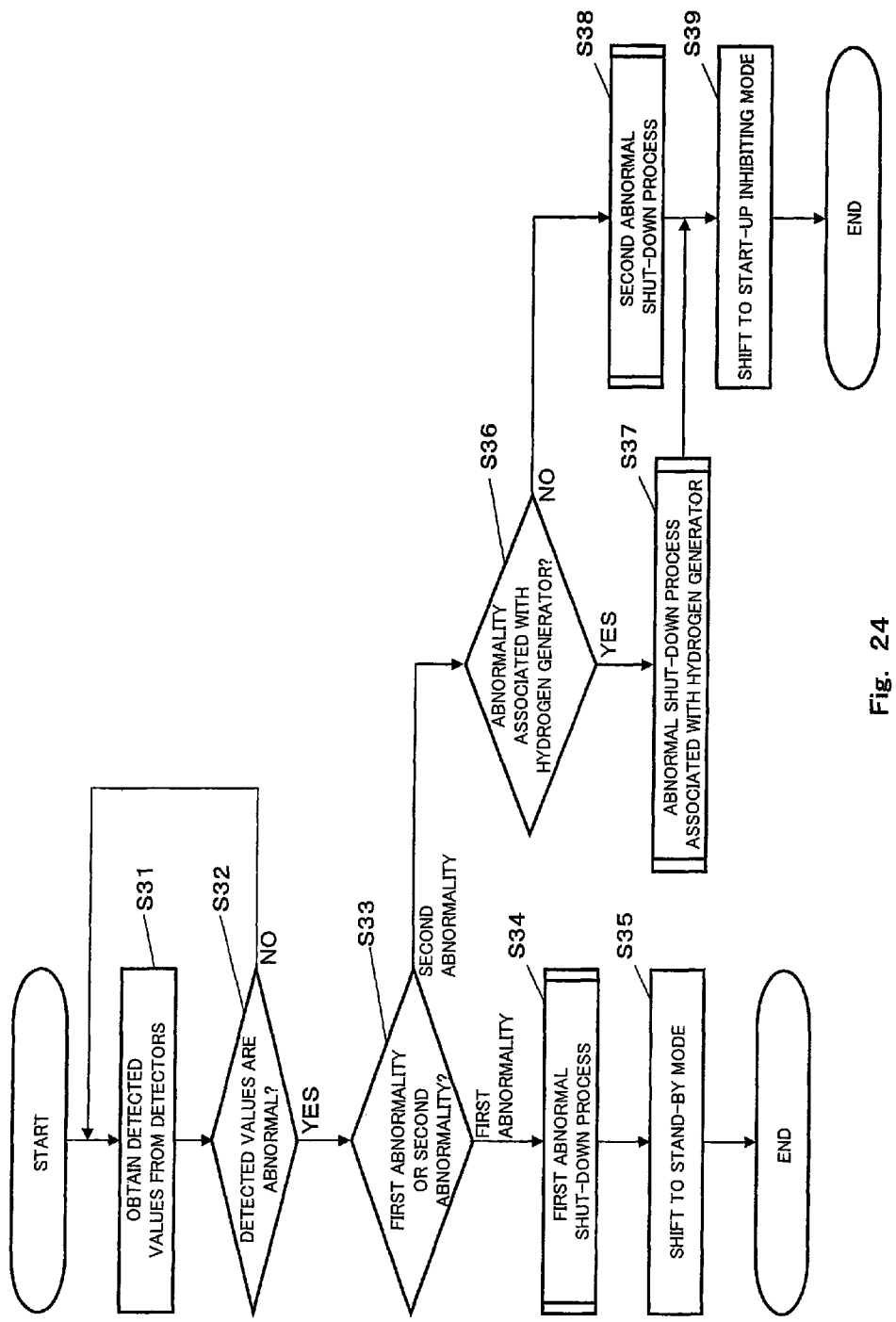
FIG. 24 is a flowchart schematically showing a content of the shut-down process program stored in a memory section of a controller in a fuel cell system according to Embodiment 15 of the present invention, which is associated with abnormality detection.

FIG. 24 is a flowchart schematically showing a content of the shut-down process program stored in the memory section of the controller 110 in a fuel cell system 100 according to Embodiment 15 of the present invention, which is associated with the abnormality detection.

The fuel cell system 100 according to Embodiment 15 of the present invention has a configuration which is basically identical to that of the fuel cell system 100 of Embodiment 9, but is different from the same in a step of shut-down after an abnormality is detected based on the values detected by the detector 131~145 and the following abnormal detection/shut-down process.

To be specific, as shown in FIG. 24, during the power generation operation of the fuel cell system 100, the calculation section of the controller 110 obtains the values detected by the detector 131~145 like the fuel cell system of Embodiment 9 (step S31), and determines whether or not the values detected in step S31 are abnormal (step S32). If it is determined that the detected values are not abnormal, the process returns to step S31, and step S31 and step S32 are repeated to monitor presence/absence of abnormality unless any abnormality is detected. On the other hand, if it is determined that any one of the detected values is abnormal, the process goes to step S33.

If the abnormality determined as the abnormality by the abnormality determiner 110*a* is the first abnormality in step S33, the process goes to step S34, whereas if the abnormality determined as the abnormality by the abnormality determiner 110*a* is the second abnormality in step S33, the process goes to step S36.

In step S34, the first abnormal shut-down process corresponding to each abnormality determined by the abnormality determiner 110*a* is performed under control of the controller 110. When this shut-down process terminates, the fuel cell system 100 shifts to the stand-by mode (step S35). The same first abnormal shut-down process is not performed for each abnormality but a predetermined restoration process corresponding to each abnormality is performed, like the fuel cell system 100 of Embodiment 9. It should be noted that the cooling operation common to the respective abnormalities (cooling operation of the hydrogen generator, exhaust heat recovery operation of the fuel cell, etc) is carried out.

In step S36, the controller 110 determines whether or not the abnormality is associated with the hydrogen generator 102. If it is determined that the abnormality is associated with the hydrogen generator 102, the process goes to step S37, whereas if it is determined that the abnormality is not associated with the hydrogen generator 102, the process goes to step S38.

In step S37, the abnormal shut-down process associated with the hydrogen generator is performed like the fuel cell system 100 of Embodiment 8. When this shut-down process terminates, the fuel cell system 100 shifts to the start-up inhibiting mode in which the fuel cell system 100 is not permitted to start-up even when a start-up request is generated (step S39).

In step S38, the second abnormal shut-down process corresponding to each abnormality determined by the abnormality determiner 110*a* is performed under control of the controller 110, like the fuel cell system 100 of Embodiment 9. When this shut-down process terminates, the fuel cell system 100 shifts to the start-up inhibiting mode in which the fuel cell system 100 is not permitted to start-up even when a start-up request is generated (step S39). The same second abnormal shut-down process is not performed for each abnormality but a predetermined restoration process corresponding to each abnormality is performed. It should be noted that the cooling operation common to the respective abnormalities (cooling operation of the hydrogen generator, exhaust heat recovery operation of the fuel cell, etc) is carried out.

Thus, the fuel cell system 100 of Embodiment 15 provides the same advantages as those of the fuel cell system 100 of Embodiment 9 when the normal shut-down process is performed and the first abnormality occurs.

In the fuel cell system 100 of Embodiment 15, when the second abnormality which is associated with the hydrogen generator 102 occurs, the first pump 107 is controlled so that the hydrogen generator 102 including the reformer 16 (see FIG. 17) is cooled with a higher amount in the abnormal shut-down process associated with the hydrogen generator 102 than in the normal shut-down process. Therefore, the temperature of the hydrogen generator 102 which requires a maintenance operation is more quickly lowered to a temperature at which the maintenance operator will not get burnt, etc thereby enabling the maintenance operator to start the maintenance operation at an earlier time. On the other hand, the amount of the cooling of the fuel cell 101 which does not require the maintenance operation is suppressed. Therefore, at next start-up, an energy required to raise the temperature of the fuel cell 101 is reduced and a time required for the start-up process is reduced. As a result, the start-up of the fuel cell system 100 is facilitated.

Furthermore, in the fuel cell system 100 of Embodiment 15, when the second abnormality which is not associated with the hydrogen generator 102, i.e., the abnormality of the component in the fuel cell system 100 except for the hydrogen generator 102, occurs, the fuel cell 101 and the hydrogen generator 102 are cooled with a higher amount in the second abnormal shut-down process than in the first abnormal shut-down process. Therefore, the temperatures of the components within the fuel cell system 100 are more quickly lowered to temperatures at which the maintenance operator will not get burnt, etc, thereby facilitating shifting to the maintenance operation.

Although in Embodiment 15, when the second abnormality which is associated with the components in the fuel cell system 100 and is not associated with the hydrogen generator 102, the second abnormal shut-down process similar to that in the fuel cell system 100 of Embodiment 9 is performed, the present invention is not limited to this. Alternatively, the abnormal shut-down process similar to that in the fuel cell system 100 of Embodiment 7 may be performed, i.e., the combustion air supplier 117 may be controlled so that the reformer 16 is cooled with a higher amount than in the normal shut-down process and the first pump 107 may be controlled so that the fuel cell 101 is cooled with an amount equal to the amount of the cooling in the normal shut-down process.

In the above embodiments, for example, at least any one of the cooling operation of the hydrogen generator (reformer), the FP purge process, the cathode purge process of the fuel cell, and the exhaust heat recovery operation of the fuel cell may be omitted, or otherwise, the cooling operation of the hydrogen generator (reformer) and the exhaust heat recovery operation of the fuel cell may stop at timings different from the timings in the above flow. Although in the above embodiments, the cooling operation of the hydrogen generator 102 (reformer 16) and/or the exhaust heat recovery operation of the fuel cell 101 continue until the FP purge process terminates in the abnormal shut-down process, the present invention is not limited to this. Any other configuration may be used so long as the hydrogen generator 102 is cooled with a higher amount and the amount of exhaust heat recovered from the fuel cell 101 is set more in the abnormal shut-down process than in the normal shut-down process.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

In the fuel cell system of the present invention, since the fuel cell is cooled with a higher amount than in a normal shut-down process when an abnormality occurs in the fuel cell system, the temperature of fuel cell is lowered more quickly, and shifting to a maintenance operation is facilitated.

DESCRIPTION OF REFERENCE NUMERALS 41 material gas supply path
42 fuel gas supply path
42a first fuel gas supply path
42b second fuel gas supply path
43 off-fuel-gas path
44 fuel cell bypass path
45 first condensed water path
46 oxidizing gas supply path
47 off-oxidizing-gas path
49 purge gas supply path
50 cathode purge gas exhaust path
51 cooling water supply path
52 cooling water discharge path
53 water supply passage
54 hot water supply passage
55 hot water path
56 combustion air supply path
57 reforming water supply path
58 oxidization air supply path
61 air inlet
62 air outlet
71 first on-off valve
72 second on-off valve
73 first switch
73a first port
73b second port
73c third port
74 third on-off valve
75 fourth on-off valve
76 fifth on-off valve
77 sixth on-off valve
78 seventh on-off valve
100 fuel cell system
101 fuel cell
101a fuel gas passage
101b oxidizing gas passage
101c cooling water passage
102 hydrogen generator
102a burner
103 oxidizing gas supplier
104 cooling water tank
105A first condensed water tank
105B second condensed water tank
106 heat exchanger (heat radiator)
107 first pump (first flow control device)
108 second pump (second output device)
109 hot water tank (heat accumulator)
110 controller
110a abnormality determiner
111 package
112 material gas supplier
112a booster pump
112b flow control valve
113 third pump
114 first condenser
114a primary passage
114b secondary passage
115 second condenser
115a primary passage
115b secondary passage
116 oxidization air supplier
117 combustion air supplier 118 inverter
119 ventilation fan
120 remote control device (operation device)
120a display section
120b key operation section
131 first pressure detector
132 first flow detector
133 second pressure detector
134 second flow detector
135 water level detector
136 water level detector
137 temperature detector
138 third flow detector
139 temperature detector
140 combustible gas sensor
141 temperature detector
200 fuel gas supplier
201 eighth on-off valve
202 fuel gas path
203 oxidizing gas path
204 cooling water path
205 burner
206 second heat medium switch
207 hot water bypass path (second heat medium bypass path)

The invention claimed is:

1. A fuel cell system comprising:
a fuel cell;
a first heat medium path through which a first heat medium for cooling the fuel cell flows;
a first flow control device configured to flow the first heat medium in the first heat medium path;
an abnormality detector configured to detect an abnormality; and
a controller configured to control the first flow control device in an abnormal shut-down process to flow the first heat medium in the first heat medium path until a temperature of the fuel cell after shut-down of power generation reaches a first temperature lower than a second temperature of the fuel cell which is reached in a normal shut-down process,
wherein the normal shut-down process is different from the abnormal shut-down process performed after the abnormality detector detects the abnormality.

2. The fuel cell system according to claim 1,
wherein the controller is further configured to control at least one of an operation time and an operation amount of the first flow control device in order for the temperature of the fuel cell to reach the first temperature in the abnormal shut-down process.

3. The fuel cell system according to claim 1,
wherein the controller is further configured to permit the fuel cell system to re-start an operation under a higher-temperature condition of the fuel cell, after the normal shut-down process than the abnormal shut-down process.

4. The fuel cell system according to claim 1,
wherein the controller is further configured to increase an operation amount of the first flow control device to be larger than an average operation amount during a power generation operation, regardless of a temperature of the fuel cell, in the abnormal shut-down process.

5. The fuel cell system according to claim 4,
wherein the controller is further configured to cool the fuel cell by controlling the operation amount of the first flow control device based on the temperature of the fuel cell in the normal shut-down process, and wherein the controller is further configured to increase the operation amount of the first flow control device to be larger than an average operation amount during a power generation operation, regardless of the temperature of the fuel cell, in the abnormal shut-down process.

6. The fuel cell system according to claim 4,
wherein the controller is further configured to perform a first cooling step of controlling the operation amount of the first flow control device based on the temperature of the fuel cell and a second cooling step of increasing the operation amount of the first flow control device to be larger than the average operation amount during a power generation operation, regardless of the temperature of the fuel cell, in the abnormal shut-down process.

7. The fuel cell system according to claim 1, further comprising:
a hydrogen generator further configured to supply a hydrogen-containing gas supplied to the fuel cell, using a raw material,
wherein the controller is further configured to continue a cooling operation of the fuel cell in the abnormal shut-down process at least until a material purge process of the hydrogen generator terminates.

8. The fuel cell system according to claim 1,
wherein the fuel cell system is further configured to perform a pressure compensation operation for supplying a gas to a reactant gas path in the fuel cell sealed, a pressure in the reactant gas path having been decreased, after the shut-down of the power generation of the fuel cell, and
wherein the controller is further configured to set a number of times of the pressure compensation operation more in the abnormal shut-down process than in the normal shut-down process.

9. The fuel cell system according to claim 1, further comprising:
a heat accumulator further configured to store a second heat medium for recovering exhaust heat from the fuel cell;
a second heat medium path through which the second heat medium flows; and
a bypass path through which the second heat medium which has recovered the exhaust heat from the fuel cell flows so as to bypass the heat accumulator,
wherein the controller is further configured to switch to the bypass path through which the second heat medium flows so as to bypass the heat accumulator, in a cooling operation of the fuel cell in the abnormal shut-down process.

10. The fuel cell system according to claim 1, wherein the controller is further configured to perform the abnormal shut-down process when the abnormality detector detects a component failure or a gas leakage abnormality.

11. The fuel cell system according to claim 1, wherein:
the abnormal shut-down process includes a first abnormal shut-down process performed in response to a detection of a first abnormality which does not require a maintenance operation by a user to re-start an operation of the fuel cell system, and a second abnormal shut-down process performed in response to a detection of a second abnormality which requires the maintenance operation, and
the controller is further configured to control the first flow control device in the second abnormal shut-down process to flow the first heat medium until the temperature of the fuel cell reaches a third temperature lower than a fourth temperature which is reached in the first abnormal shut-down process.

12. The fuel cell system according to claim 11, wherein the controller is further configured to permit the fuel cell system to re-start the operation under a higher-temperature condition of the fuel cell in the first abnormal shut-down process than in the second abnormal shut-down process.

13. The fuel cell system according to claim 11,
wherein the controller is further configured to increase the operation amount of the first flow control device to be larger than an average operation amount during a power generation operation, regardless of a temperature of the fuel cell, in the second abnormal shut-down process.

14. The fuel cell system according to claim 13,
wherein the controller is further configured to cool the fuel cell by controlling the operation amount of the first flow control device based on a temperature of the fuel cell in the first abnormal shut-down process, and
wherein the controller is further configured to increase the operation amount of the first flow control device to be larger than the average operation amount during a power generation operation, regardless of the temperature of the fuel cell, in the second abnormal shut-down process.

15. The fuel cell system according to claim 13,
wherein the controller is further configured to perform, in the second abnormal shut-down process, a first cooling step of controlling the operation amount of the first flow control device based on the temperature of the fuel cell, and a second cooling step of increasing the operation amount of the first flow control device to be larger than the average operation amount during a power generation operation, regardless of the temperature of the fuel cell.

16. The fuel cell system according to claim 11, further comprising:
a hydrogen generator further configured to generate a hydrogen-containing gas supplied to the fuel cell, using a raw material,
wherein the controller is further configured to continue a cooling operation of the fuel cell in the second abnormal shut-down process at least until a material purge process of the hydrogen generator terminates.

17. The fuel cell system according to claim 11,
wherein the fuel cell system is further configured to perform a pressure compensation operation for supplying a gas to a reactant gas path in the fuel cell sealed, a pressure in the reactant gas path having been decreased, after the shut-down of the power generation of the fuel cell, and
wherein the controller is further configured to set a number of times of the pressure compensation operation more in the second abnormal shut-down process than in the first abnormal shut-down process.

18. The fuel cell system according to claim 11, further comprising:
a heat accumulator configured to store a second heat medium for recovering exhaust heat from the fuel cell;
a second heat medium path through which the second heat medium flows; and
a bypass path through which the second heat medium which has recovered the exhaust heat from the fuel cell flows so as to bypass the heat accumulator,
wherein the controller is further configured to switch to the bypass path through which the second heat medium flows so as to bypass the heat accumulator, in a cooling operation of the fuel cell in the second abnormal shut-down process.

19. The fuel cell system according to claim 11,
wherein the first abnormality is at least one of a temperature abnormality of the first heat medium and an abnormality of the first flow control device.

20. The fuel cell system according to claim 11,
wherein the second abnormality is one or more of a component failure, a gas leakage abnormality and an excessive temperature increase abnormality of the controller.

21. The fuel cell system according to claim 1, further comprising:
a hydrogen generator including a reformer configured to generate a hydrogen-containing gas through a reforming reaction using a raw material, a combustor further configured to heat the reformer, and a combustion air supplier further configured to supply combustion air to the combustor, wherein
the controller is further configured to control the first flow control device in the abnormal shut-down process to flow the first heat medium until the temperature of the fuel cell reaches the first temperature and control the combustion air supplier in order for the reformer to be cooled with an amount equal to an amount of cooling in the normal shut-down process, in an abnormal shut-down process performed after the abnormality detector detects an abnormality which is associated with the fuel cell and is other than an abnormality associated with the hydrogen generator.

22. The fuel cell system according to claim 21,
wherein the controller is further configured to control the combustion air supplier and the first flow control device in order for the reformer and the fuel cell to be cooled with an amount equal to an amount of cooling in the normal shut-down process, in an abnormal shut-down process performed after the abnormality detector detects a first abnormality which does not require a maintenance operation by a user to re-start an operation of the fuel cell system, is associated with the fuel cell system and is other than the abnormality associated with the hydrogen generator, and
wherein the controller is further configured to control the first flow control device in order for the temperature of the fuel cell to reach the first temperature and control the combustion air supplier in order for the reformer to be cooled with the amount equal to amount of cooling in the normal shut-down process, in an abnormal shut-down process performed after the abnormality detector detects a second abnormality which requires the maintenance operation, is associated with the fuel cell system and is other than the abnormality associated with the hydrogen generator.

23. The fuel cell system according to claim 1 or 21, further comprising:
a hydrogen generator including a reformer configured to generate a hydrogen-containing gas through a reforming reaction using a raw material,
a combustor configured to heat the reformer, and
a combustion air supplier configured to supply combustion air to the combustor,
wherein the controller is further configured to control the combustion air supplier in order for the reformer to be cooled with a higher amount than in the normal shut-down process and control the first flow control device in order for the temperature of the fuel cell to reach the second temperature, when the abnormality detector detects the abnormality associated with the hydrogen generator.

24. The fuel cell system according to claim 23,
wherein the controller is further configured to control the combustion air supplier and the first flow control device in order for the reformer to be cooled with an amount equal to an amount of cooling in the normal shut-down process and the temperature of the fuel cell reaches the second temperature, in an abnormal shut-down process performed after the abnormality detector detects a first abnormality which does not require a maintenance operation by a user to re-start an operation of the fuel cell system and is associated with the hydrogen generator, and
wherein the controller is further configured to control the first flow control device in order for the reformer to be cooled with a higher amount than in the normal shut-down process and control the first flow control device in order for the temperature of the fuel cell to reach the second temperature, in an abnormal shut-down process performed after the abnormality detector detects a second abnormality which requires the maintenance operation and is associated with the hydrogen generator.

25. The fuel cell system according to claim 1,
wherein the controller is further configured to control the first flow control device in order for the temperature of the fuel cell after shut-down of power generation to reach the first temperature in an abnormal shut-down process performed after the abnormality detector detects a device failure, a gas leakage abnormality, or a temperature increase abnormality of the controller.

26. The fuel cell system according to claim 25,
wherein the first heat medium is cooling water,
the fuel cell system further comprising:
a cooling water tank for storing the cooling water; and
a cooling water tank water level detector for detecting a level of the cooling water stored in the cooling water tank, and
wherein the device failure is a failure of the cooling water tank water level detector.

27. The fuel cell system according to claim 25, further comprising:
a condensed water tank for storing condensed water generated by condensation of steam contained in an off-fuel-gas and/or an off-oxidizing-gas which is exhausted from the fuel cell; and
a condensed water tank water level detector for detecting a level of the condensed water stored in the condensed water tank,
wherein the device failure is a failure of the condensed water tank water level detector.

28. The fuel cell system according to claim 25, further comprising:
a first flow detector for detecting a flow rate of the fuel gas flowing through a fuel gas supply path,
wherein the device failure is a failure of the first flow detector.

29. The fuel cell system according to claim 25, further comprising:
a second flow detector for detecting a flow rate of the oxidizing gas flowing through an oxidizing gas supply path,
wherein the device failure is a failure of the second flow detector.

30. The fuel cell system according to claim 25, further comprising:
a third flow detector for detecting a flow rate of the first heat medium flowing through the first medium path,
wherein the device failure is a failure of the third flow detector.

31. The fuel cell system according to claim 25, further comprising:
a temperature detector for detecting a temperature of the first heat medium flowing through the first heat medium path,
wherein the device failure is a failure of the temperature detector.

32. The fuel cell system according to claim 25, further comprising:
a voltage transducer for supplying electricity generated in the fuel cell to a power load,
wherein the device failure is a failure of the voltage transducer.

33. The fuel cell system according to claim 25, further comprising:
a package in which the fuel cell is accommodated; and
a ventilation fan disposed inside of the package,
wherein the device failure is a failure of the ventilation fan.

34. The fuel cell system according to claim 25, further comprising:
a fuel gas path through which the fuel gas flows,
wherein the gas leakage abnormality is a pressure abnormality in the fuel gas path.

35. The fuel cell system according to claim 25, further comprising:
an oxidizing gas path through which the oxidizing gas flows,
wherein the gas leakage abnormality is a pressure abnormality in the oxidizing gas path.

36. The fuel cell system according to claim 25, further comprising:
a package in which the fuel cell is accommodated,
wherein the gas leakage abnormality is an abnormality of a concentration of a combustible gas.

37. The fuel cell system according to claim 1, wherein the controller is further configured to control the first flow control device in order for a temperature of the fuel cell at an end of cooling the fuel cell by the first heat medium in the abnormal shut-down process to become lower than a temperature of the fuel cell at an end of cooling the fuel cell by the first heat medium in the normal shut-down process.

38. The fuel cell system according to claim 1, wherein:
the controller includes a processor and a memory storing a program, and
the program, when executed by the processor, causes the controller to control the first flow control device in the abnormal shut-down process to flow the first heat medium in the first heat medium path until the temperature of the fuel cell after shut-down of power generation reaches the first temperature lower than the second temperature of the fuel cell which is reached in the normal shut-down process.

39. The fuel cell system according to claim 1, wherein the abnormality is one of a gas leakage abnormality, and a temperature increase abnormality of the controller.

* * * * *